Aug. 22, 1967 J. K. A. OLSSON ET AL 3,337,847

COMMUNICATION SYSTEM FOR CONNECTING SUBSCRIBERS TO A MULTIPLEX MESSAGE SYNTHESIZING SYSTEM

Filed Sept. 17, 1963 25 Sheets-Sheet 1

INVENTORS

JÖNS KURT ALVAR OLSSON
ANDERS KARLBY BERGMANN

BY Brown Jackson Boettcher & Dienner

ATTYS.

Aug. 22, 1967 J. K. A. OLSSON ET AL 3,337,847

COMMUNICATION SYSTEM FOR CONNECTING SUBSCRIBERS TO A MULTIPLEX MESSAGE SYNTHESIZING SYSTEM

Filed Sept. 17, 1963 25 Sheets-Sheet 2

*INVENTORS*

JÖNS KURT ALVAR OLSSON
ANDERS KARLBY BERGMANN
BY Brown Jackson Boettcher & Dienner
ATTYS.

INVENTORS

JÖNS KURT ALVAR OLSSON
ANDERS KARLBY BERGMANN
BY Brown, Jackson, Boettcher & Dienner
ATTYS.

TRANSLATOR EQUIPMENT (TE)

*INVENTORS*
JÖNS KURT ALVAR OLSSON
ANDERS KARLBY BERGMANN
BY Brown Jackson Boettcher & Dienner
ATTYS.

INVENTORS
JÖNS KURT ALVAR OLSSON
ANDERS KARLBY BERGMANN
BY Brown Jackson Boettcher & Dienner
ATTYS.

Aug. 22, 1967 J. K. A. OLSSON ET AL 3,337,847

COMMUNICATION SYSTEM FOR CONNECTING SUBSCRIBERS TO A MULTIPLEX MESSAGE SYNTHESIZING SYSTEM

Filed Sept. 17, 1963 25 Sheets-Sheet 6

INVENTORS

JÖNS KURT ALVAR OLSSON
ANDERS KARLBY BERGMANN

BY Brown, Jackson, Boettcher & Dienner
ATTYS.

INVENTORS
JÖNS KURT ALVAR OLSSON
ANDERS KARLBY BERGMANN
BY Brown Jackson Boettcher & Dienner
ATTYS.

INVENTORS

JÖNS KURT ALVAR OLSSON
ANDERS KARLBY BERGMANN
BY Brown, Jackson, Boettcher & Dienner
ATTYS.

INVENTORS

JÖNS KURT ALVAR OLSSON
ANDERS KARLBY BERGMAN
BY Brown, Jackson, Boettcher & Dienner
ATTYS.

Aug. 22, 1967 J. K. A. OLSSON ET AL 3,337,847
COMMUNICATION SYSTEM FOR CONNECTING SUBSCRIBERS
TO A MULTIPLEX MESSAGE SYNTHESIZING SYSTEM
Filed Sept. 17, 1963 25 Sheets-Sheet 10

INVENTORS
JÖNS KURT ALVAR OLSSON
ANDERS KARLBY BERGMANN
BY Brown, Jackson, Boettcher & Dienner
ATTYS.

INVENTORS

JÖNS KURT ALVAR OLSSON
ANDERS KARLBY BERGMANN
BY Brown, Jackson, Boettcher & Dienner
ATTYS.

Aug. 22, 1967

J. K. A. OLSSON ET AL 3,337,847

COMMUNICATION SYSTEM FOR CONNECTING SUBSCRIBERS TO A MULTIPLEX MESSAGE SYNTHESIZING SYSTEM

Filed Sept. 17, 1963

25 Sheets-Sheet 12

MEMORY CONTROL CIRCUIT 132

(ONE PER 8 HIGHWAYS)

INVENTORS

JÖNS KURT ALVAR OLSSON

ANDERS KARLBY BERGMANN

BY Brown, Jackson, Boettcher & Dienner

ATTYS.

Aug. 22, 1967 J. K. A. OLSSON ET AL 3,337,847
COMMUNICATION SYSTEM FOR CONNECTING SUBSCRIBERS TO A MULTIPLEX MESSAGE SYNTHESIZING SYSTEM
Filed Sept. 17, 1963 25 Sheets-Sheet 13

INVENTORS
JÖNS KURT ALVAR OLSSON
ANDERS KARLBY BERGMANN
BY Brown Jackson Boettcher & Dienner
ATTYS.

*INVENTORS*
JÖNS KURT ALVAR OLSSON
ANDERS KARLBY BERGMANN
BY Brown, Jackson, Boettcher & Dienner
ATTYS.

Aug. 22, 1967 J. K. A. OLSSON ET AL 3,337,847

COMMUNICATION SYSTEM FOR CONNECTING SUBSCRIBERS TO A MULTIPLEX MESSAGE SYNTHESIZING SYSTEM

Filed Sept. 17, 1963 25 Sheets-Sheet 15

INVENTORS

JÖNS KURT ALVAR OLSSON
ANDERS KARLBY BERGMANN
BY Brown, Jackson, Boettcher & Dienner
ATTYS.

*INVENTORS*

JÖNS KURT ALVAR OLSSON
ANDERS KARLBY BERGMANN
BY Brown, Jackson, Boettcher & Dienner
ATTYS.

Aug. 22, 1967 J. K. A. OLSSON ET AL 3,337,847

COMMUNICATION SYSTEM FOR CONNECTING SUBSCRIBERS TO A MULTIPLEX MESSAGE SYNTHESIZING SYSTEM

Filed Sept. 17, 1963 25 Sheets-Sheet 17

INVENTORS

JÖNS KURT ALVAR OLSSON

ANDERS KARLBY BERGMANN

BY Brown, Jackson, Boettcher & Dienner

ATTYS.

INVENTORS
JÖNS KURT ALVAR OLSSON
ANDERS KARLBY BERGMANN
BY Brown, Jackson, Boettcher & Dienner
ATTYS.

INVENTORS

JÖNS KURT ALVAR OLSSON
ANDERS KARLBY BERGMANN
BY Brown Jackson Boettcher & Dienner
ATTYS.

INVENTORS
JÖNS KURT ALVAR OLSSON
ANDERS KARLBY BERGMANN
BY Bown Jackson Boettcher & Dienner
ATTYS.

INVENTORS
JÖNS KURT ALVAR OLSSON
ANDERS KARLBY BERGMANN
BY Brown, Jackson, Boettcher & Dienner
ATTYS.

INVENTORS
JÖNS KURT ALVAR OLSSON
ANDERS KARLBY BERGMANN
BY Berry, Jackson, Bulkley & Dunner
ATTYS.

INVENTORS

JÖNS KURT ALVAR OLSSON
ANDERS KARLBY BERGMANN
BY Brown, Jackson, Boettcher & Dienner
ATTYS.

INVENTORS
JÖNS KURT ALVAR OLSSON
ANDERS KARLBY BERGMANN
BY Brown, Jackson, Boettcher & Dienner
ATTYS.

INVENTORS
JÖNS KURT ALVAR OLSSON
ANDERS KARLBY BERGMANN
BY Brown, Jackson, Boettcher & Dienner
ATTYS.

United States Patent Office 3,337,847
Patented Aug. 22, 1967

3,337,847

COMMUNICATION SYSTEM FOR CONNECTING SUBSCRIBERS TO A MULTIPLEX MESSAGE SYNTHESIZING SYSTEM

Jöns Kurt Alvar Olsson, Tullinge, Sweden, and Anders K. Bergmann, Mexico City, Mexico, assignors to North Electric Company, Galion, Ohio, a corporation of Ohio

Filed Sept. 17, 1963, Ser. No. 309,482
27 Claims. (Cl. 340—152)

Figure 1:
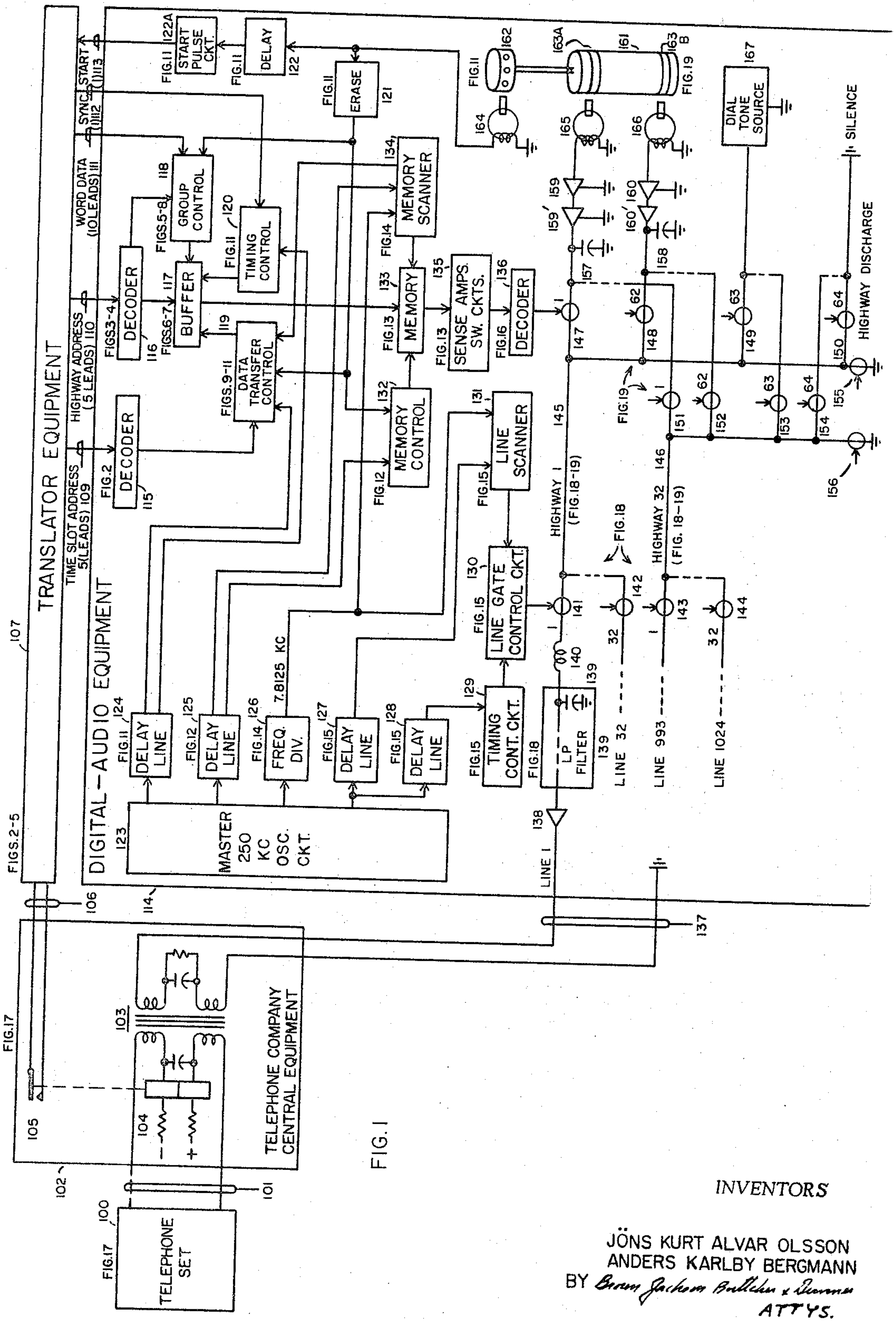

The present invention relates to communication systems and more particularly to a system in which a calling subscriber dials a number to receive a predetermined variable message from a storage device.

Stock quotation systems exist in which a number of brokers associated with a stock exchange, each has a panel in his office containing visual indicators for providing information relating to each of a plurality of stocks. An attendant or operator at the stock exchange sets up the changes in the information on associated equipment which are reported automatically over a communication panel to the panels in the various subscribing brokers' offices. The particular stocks reported are determined by plugboard means which enable selection of certain particular stocks out of a larger group of stocks, and by means of the plugboard means different sets of stocks may be selected for automatic reporting. In that a broker typically may require facilities for ascertaining the status of one hundred stocks, and each stock reported requires separate indicating apparatus, the service is expensive.

In another known form of stock quotation system, the broker is connected on a direct wire of the telephone company central equipment to the stock exchange, and by dialing a two digit code, his call is routed to a particular stock exchange post of a plurality of posts at which information relating to a group of stocks (one hundred, for example) is available. An attendant answers when free, and upon orally ascertaining from the broker the particular stock quotation which is desired, looks to the stock quotation board and verbally relays to the calling broker certain limited information relative to such stock. The time delay which occurs in such system during busy periods is a serious limitation to such arrangement, and the system has a further shortcoming in its vulnerability to human error.

It is an object of the present invention to provide a fully automatic stock quotation system of a more reliable nature.

It is another object of the present invention to provide a stock quotation system or such type which is "non-blocking" in its operation. That is, a system which permits a plurality of different subscribers to simultaneously obtain the desired information without blocking each other, the information simultaneously obtained by the plurality of subscribers being for the same or different ones of the stock.

Another object of the invention is the provision of a stock quotation system which only requires a conventional telephone instrument at the broker's office, connected by a telephone line over associated telephone company central office equipment to the stock exchange which provides for fully automatic non-blocking reporting in a more reliable manner, and of importance, provides for a more complete report of the status of the stock.

These objects are basically achieved by a system in which the calling broker has a telephone set which completes a calling line loop to land a call in an associated central telephone office responsive to removal of his receiver. Associated equipment operates as the call lands, and signals automatic equipment at the stock exchange, which in turn transmits dial tone to the broker. Each stock has a plural digit identification number, and the broker now dials the identification number of the stock for which information is desired. As a result thereof, the stock exchange equipment automatically synthesizes a message from a constantly rotating drum containing a fixed repertory of "words" which are magnetically recorded thereon. The resultant message is projected to the calling broker over a switching system which connects the calling broker's lines with the rotating drum word recordings, the switching system being particularly novel in its use of time division multiplex techniques.

Figure 20:
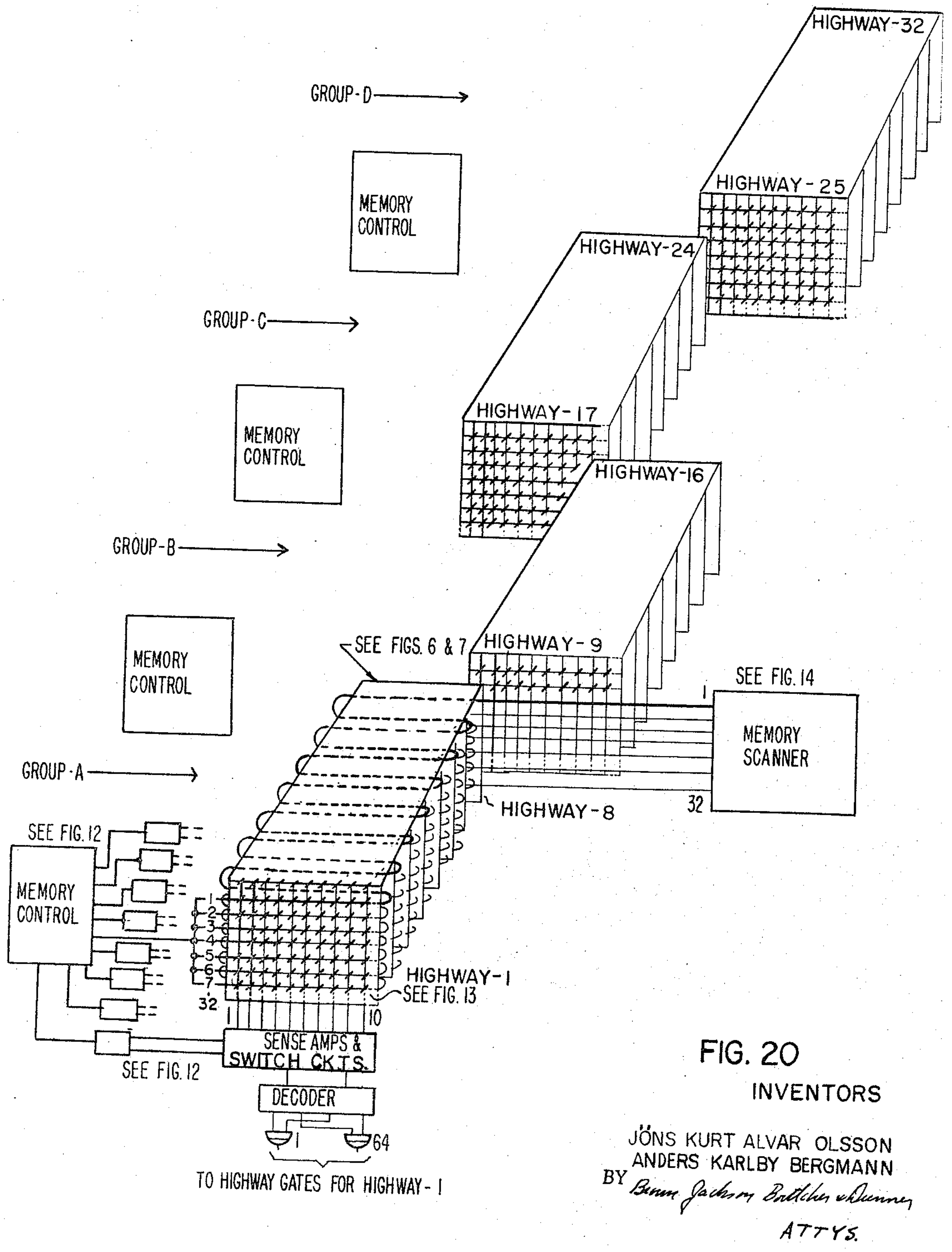

The foregoing objects, advantages and features of the invention will be apparent with the consideration of the following description and drawings which disclose the embodiments of the invention, and in which:

FIGURE 1 is a block diagram of the system, the legends thereon referencing the other figures which include the detailed circuitry of the blocks;

FIGURES 2–11 comprise a logic diagram of the portion of the system which contains a memory buffer of magnetic cores and associated circuitry;

FIGURES 12–19 comprise a logic diagram of the portion of the system which contains memory planes of magnetic cores, line gate controls and associated circuitry;

FIGURE 20 comprises a three dimensional schematic representation of certain electrical connections and relations between the buffer, memory planes and associated circuitry.

Figure 26:
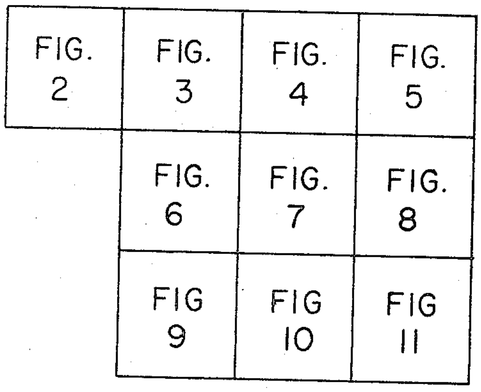
Figure 27:
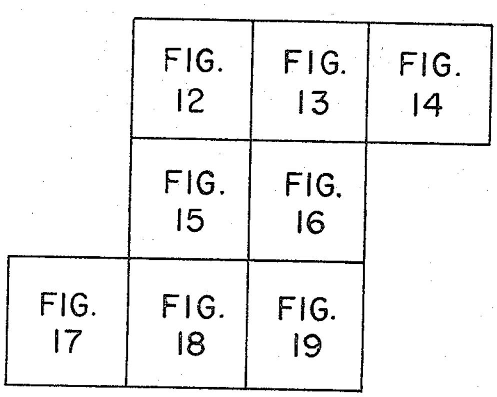
Figure 21:
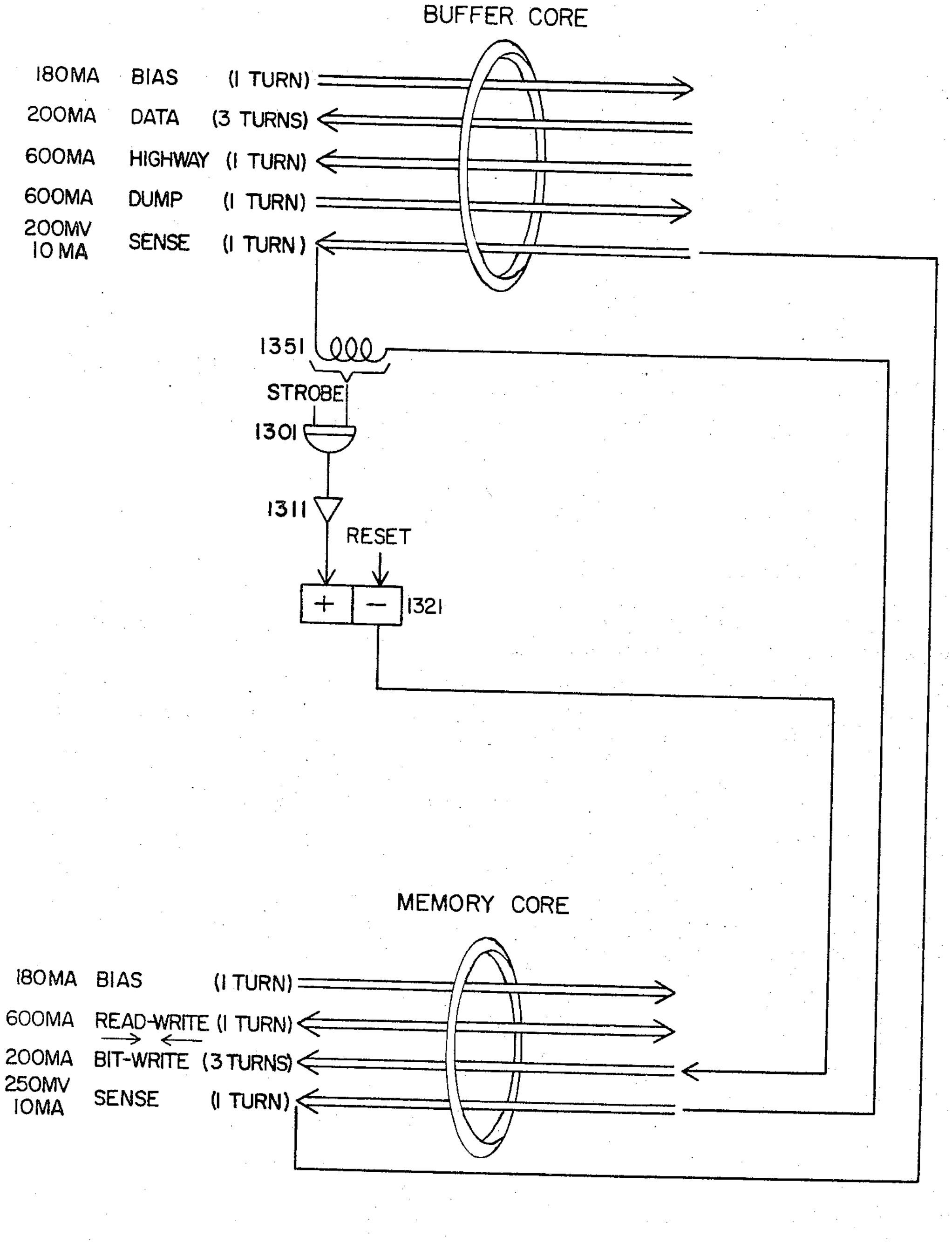
Figure 22:
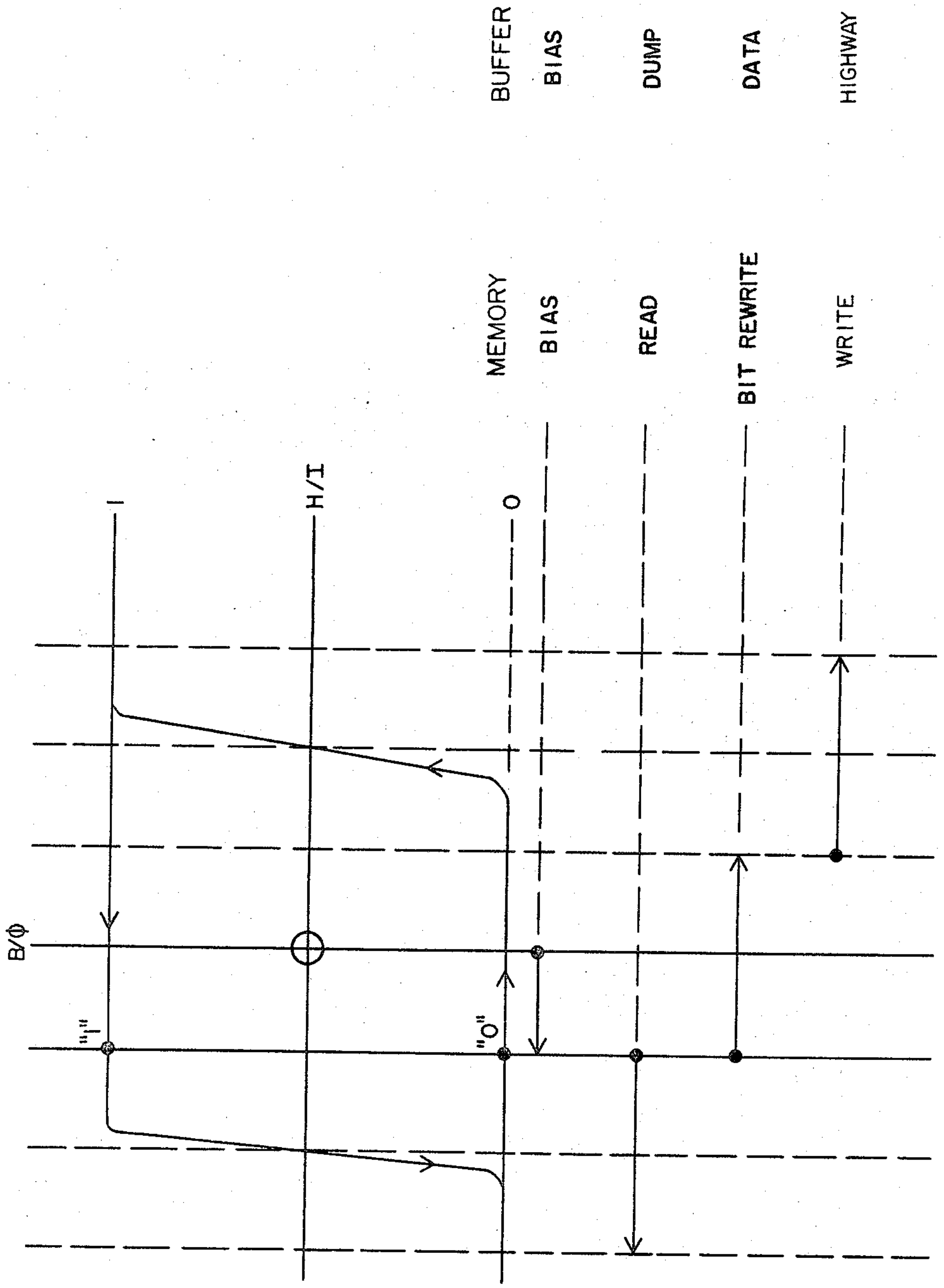
Figure 23:
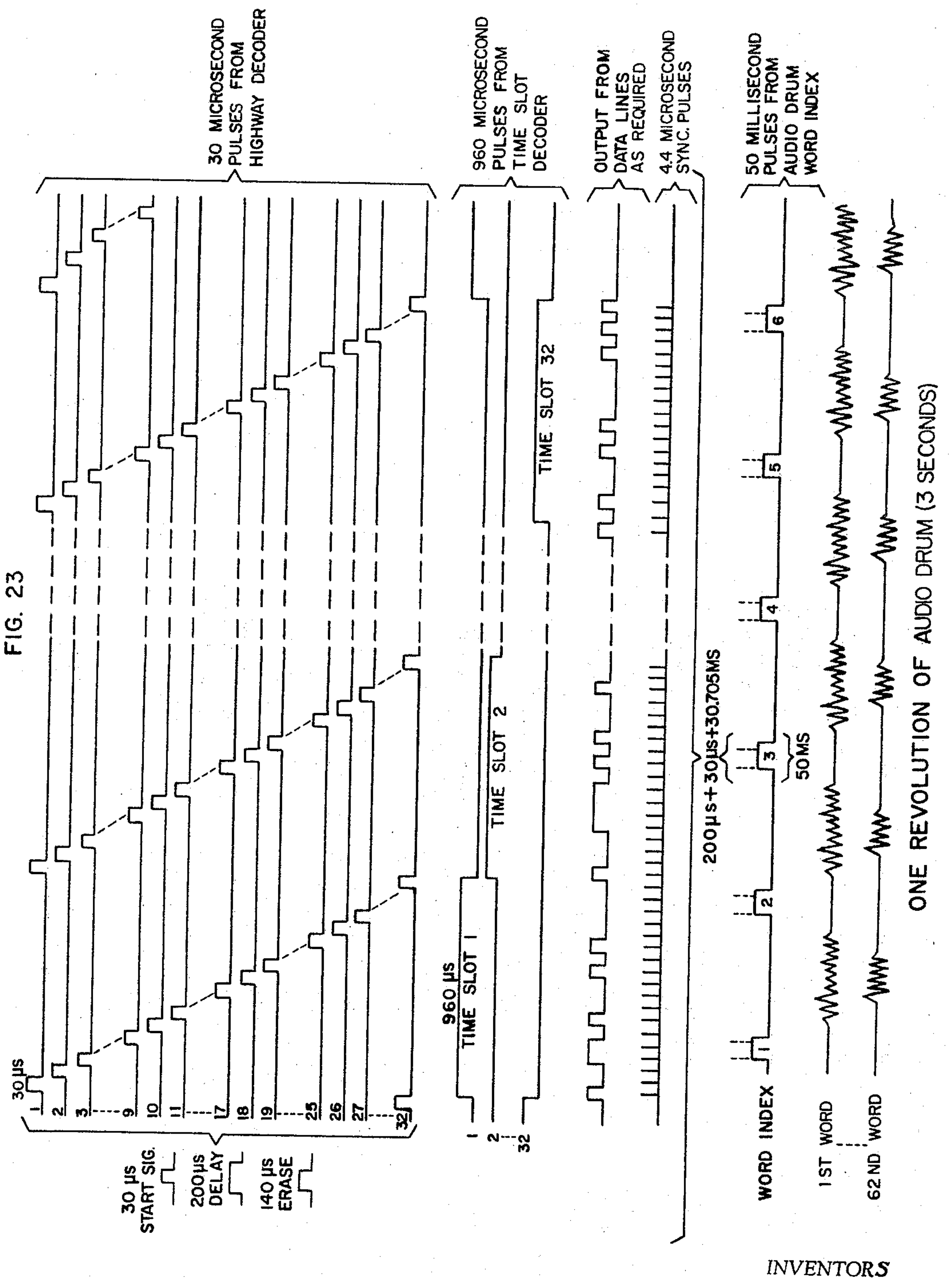
Figure 24:
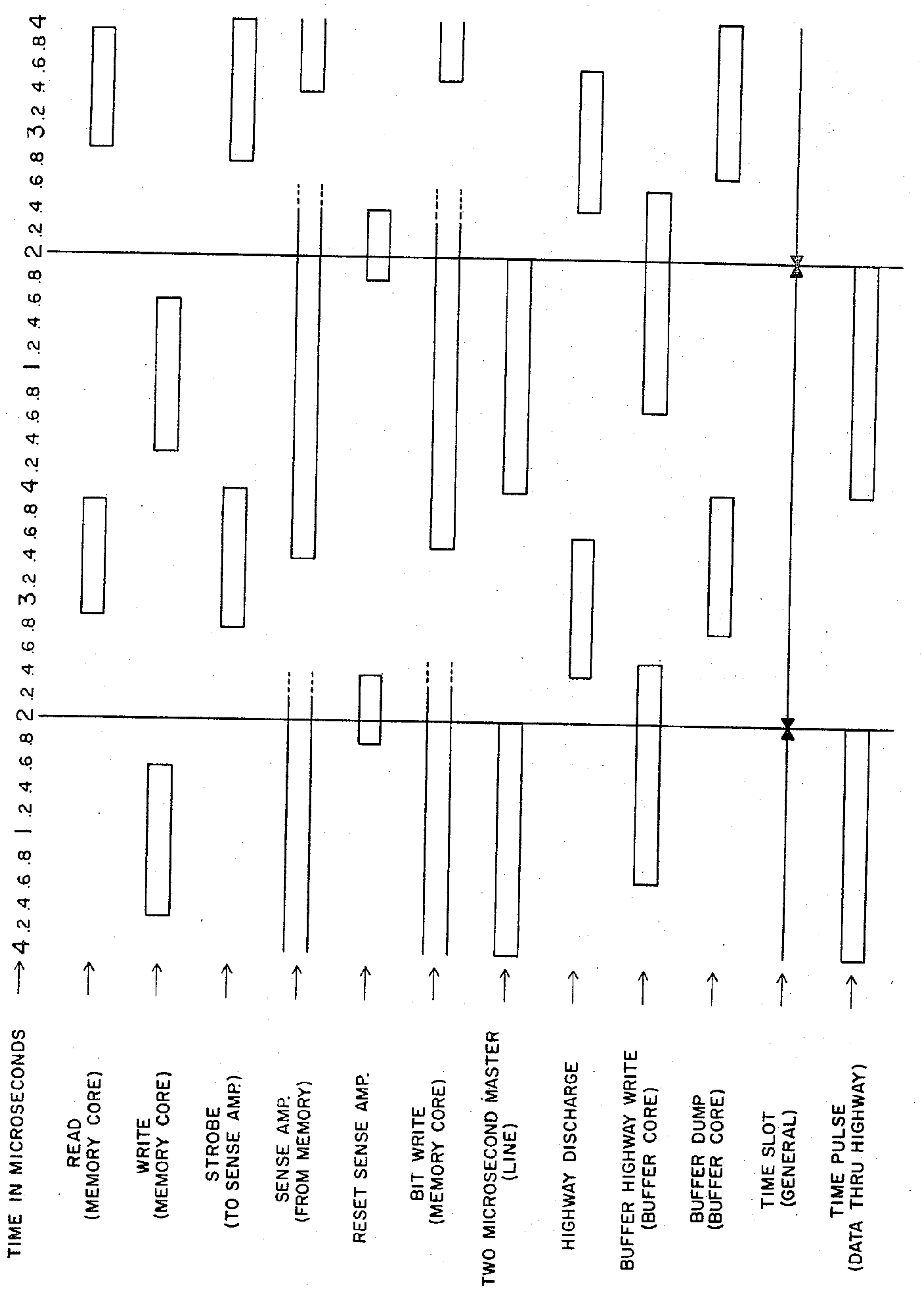
Figure 25:
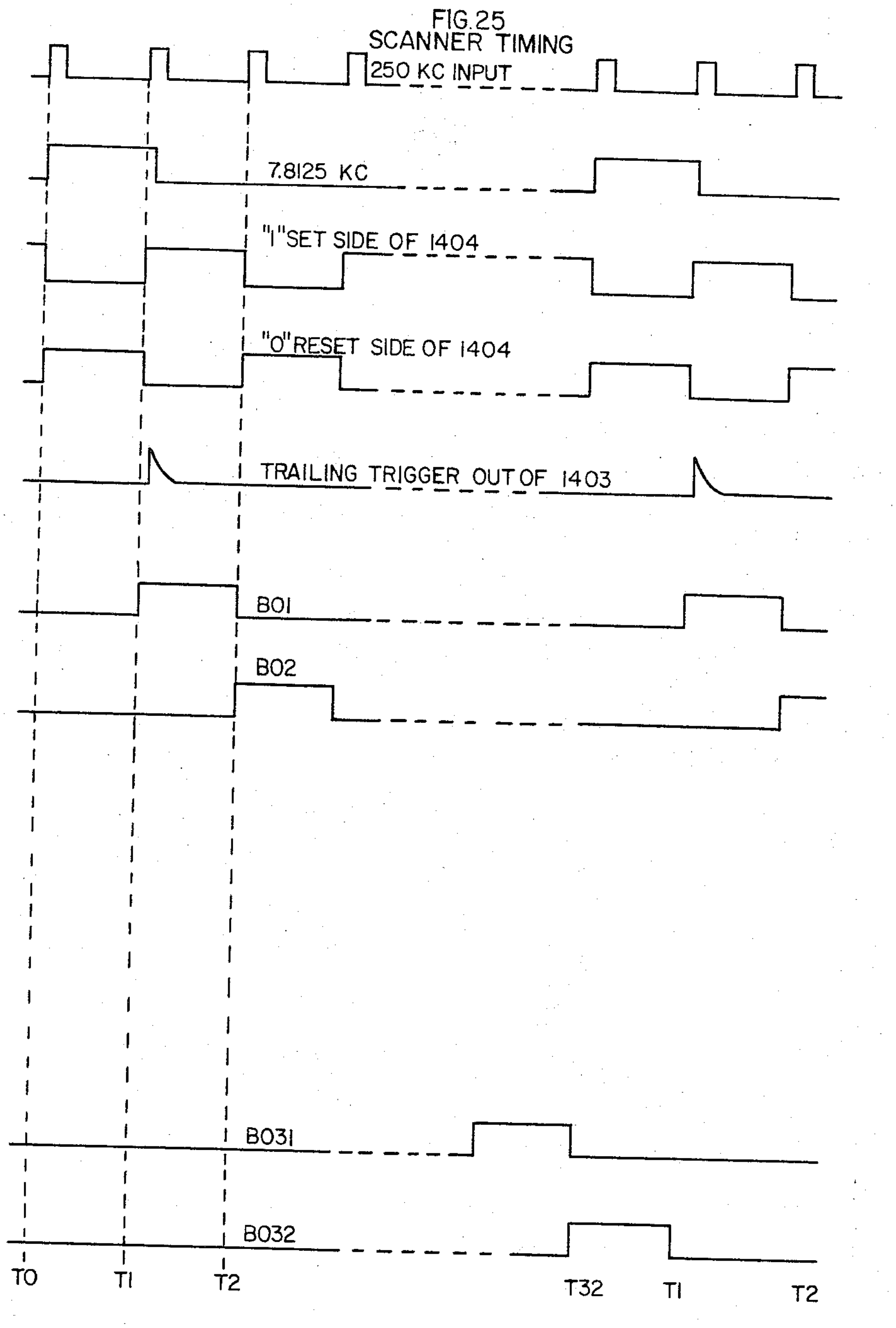

FIGURE 21 is a schematic showing of a magnetic core in the buffer memory, a magnetic core in the memory planes proper and certain connections which extend therebetween;

FIGURE 22 sets forth the hysteresis curve associated with the square loop material of the magnetic cores, and certain operational details thereof;

FIGURES 23 and 24 set forth timing charts for certain identified equipment in the system;

FIGURE 25 sets forth a timing chart for the scanner equipment in the system; and FIGURES 26 and 27 indicate the manner of arrangement of FIGURES 2–11 and 12–19 relative to each other.

BLOCK DIAGRAM DESCRIPTION OF SYSTEM

Referring now to the block diagram of FIGURE 1, a telephone set 100, such as located at a broker's office A in the system, is connected over a two-conductor line 101 through left hand windings 103*a*, *b*, of transformer 103 and the windings of relay 104 to positive and negative potential in associated telephone company central equipment represented by the block 102.

Upon lifting the handset (not shown) of the telephone set 100, the line loop is closed operating line relay 104 which operates and closes its contacts 105 to establish a loop over conductors 106 to Translator Equipment represented by block 107, which is equipment manufactured by The Teleregister Corporation, Stamford, Conn., for the purpose of marking the identity of the calling line thereon. It is to be understood that a large number of lines, such as illustrated line 106, extend to register equipment 107 from brokers' offices, such as illustrated broker office A, although only line 106 is illustrated in FIGURE 1.

Signals are extended over leads 109, 110, 111, and 112 between the Translator Equipment 107 and the Digital Audio Equipment 114 to mark equipment 114 as to the identity of the calling telephone set, and to indicate the requirement for the projection of dial tone over conductors 137 from the equipment 114 to the right hand windings of transformer 103 associated with the calling telephone set 100, as shown, and the telephone substation set 100 of the calling broker.

Upon receiving dial tone from the message generating equipment 114, the broker operates the dial of telephone set 100 to transmit the three digits which identify the stock for which a quotation is desired. As these digits are dialed, contacts 105 of relay 104 open and close, relaying the three digits over conductors 106 to the Translator Equipment 107 in accordance with known pulse transmitting techniques.

The Translator Equipment 107 over leads 109, 110, 111, and 112, marks the identity of the calling telephone set 100 in equipment 114 and further identifies the message to be projected over conductors 137 to the calling set 100.

In the disclosed embodiment, one thousand and twenty-four such telephone sets are connected to be extended, as used, to the message generating equipment 114. As will be shown, the switching equipment in message generating equipment 114 must be capable of connecting each of the one thousand and twenty-four lines to a rotating magnetic drum 161 for the purpose of receiving synthetic messages therefrom, to Dial Tone Source 167 and to "ground for silence" located just below the Dial Tone Source.

Drum 161 has sixty-two words magnetically recorded on sixty-two tracks, the first of which tracks is indicated by 163A and the last by 163B. Each track has one word magnetically recorded thereon six times, the recordings being evenly spaced around the circumference of the drum with equal spacings between words (see also the bottom of FIGURE 23). Each track has an associated pick-up head, such as illustrated pick-up head 165, 166 for tracks 163A and 163B, respectively.

In order to minimize the number of conductors necessary to interconnect the one thousand and twenty-four incoming lines with the sixty-two pick-up heads, the Dial Tone Source 167 and the ground for Silence (in other words, the connection of one thousand and twenty-four lines to sixty-four sources) a time division multiplex system comprising thirty-two conductors called "highways" is used, highway 1 being labeled 145 and highway 32 being labeled 146.

Each highway at the left end is connected via thirty-two gates to thirty-two different incoming lines respectively. Highway 1, for example, is connected to thirty-two gates, the first gate 1 leading to line 1 of group 1–32 being labeled 141, and the last gate leading to line 32 of group 1–32 being labeled 142. The thirty-second highway 146 is connected to the last group or set of thirty-two gates, the first gate 143 of group 993–1024 leading to line 993 and the last gate of group 993–1024 leading to line 1024.

Each highway 1–32 is connected via sixty-four gates to the common sixty-four sources of words, dial tone and silence. The first highway 145, for example, is connected to the sixty-four sources via sixty-four gates; the first gate being labeled 147; the sixty-second gate being labeled 148; the sixty-third gate being labeled 149; and the sixty-four gate being lobeled 150. In a similar manner, the thirty-second highway is connected to the same sixty-four sources via sixty-four different gates, such as 151, 152, 153, 154.

As the audio speech range is from 100 to 3000 cycles per second in accordance with established time division principles, the interconnecting gates, such as 141, must be pulsed selectively at approximately twice such frequency. In the present embodiment gates, such as 141, are pulsed selectively at 7.8125 kc. to place a line in communication with a play-back head. In extending a connection from Line 1 to play-back 165, gates 141 and 147 are pulsed simultaneously at a 7.8125 kc. rate. To place Line 1 in communication with Dial Tone Source 167, gates 141 and 149 are pulsed simultaneously at such rate. Line 1 is connected to the ground designated Silence so that no message is placed on the line by pulse gates 141 and 150 simultaneously at such rate.

Each line, such as 1, and its associated gate, such as 141, is assigned a time slot of the highway, such as highway 145, each time slot in the present example as will be shown, being four microseconds in duration and a complete cycle of each gate connected to a line requiring 128 microseconds. In the present example, Line 1 and gate 141 are assigned time slot 1 of the first highway 145. Line 32 and associated gate 142 connected to the first highway 145 are assigned time slot 32. Line 993 (being the first line connected to the thirty-second highway 146) and associated gate 143 are assigned time slot 1. Line 1024 (being the last line connected to the thirty-second highway 146) and its associated gate 144 are assigned time slot 32.

The gates at the left of the highways associated with the lines are constantly being pulsed in a fixed cyclic manner by the Line Gate Control Circuit 130 in the following pattern.

The first gate (such as 141 and 143) on all thirty-two highways is pulsed during time slot 1.

The second gate (not shown) on all thirty-two highways is pulsed during time slot 2.

The thirty-second gate (such as 142 and 144 on all thirty-two highways is pulsed during time slot 32.

The Line Gate Control Circuit 130 is controlled in its operation conjointly by the Timing Control Circuit 129 and the Line Scanner 131. The Timing Control Circuit 129 is controlled by the Delay Line 128 which is controlled by the Master 250 kc. oscillator circuit.

The Line Scanner 131 is controlled conjointly by a Delay Line 127 and a Frequency Divider 126 which provides a signal output of 7.8125 kc. to the line scanner. The Delay Line 127 and the Frequency Divider 126 are both controlled by the Master 256 kc. oscillator circuit.

As will be shown, the 7.8125 kc. signal output of frequency device 126 enables the delayed 250 kc. signal to start the Line Scanner in the provision of each scan cycle at the proper time, thus keeping line scanning in synchronism with both the memory scanning and the operation of the gates 147, etc., as will be shown.

In that there are thirty-two time slots per highway, each gate, such as 141, on a highway, such as 145, is operated by a different one of the thirty-two 250 kc. pulses in each cycle, and as a result will operate at 7.8125 pulses per second.

The gates, such as 147, at the right of the highways 1–32 are being pulsed selectively during the thirty-two time slots in synchronism with the gates, such as 141, at the left of the highways, the gates to be pulsed being determined by the words to be provided over the highways. The term "word" as used herein includes any of the sixty-two words on the drum, Dial Tone, and Silence.

By way of brief example, during time slot 1, each of the time slot #1 gates, such as 141 and 143, conducts. While gate 141 is conducting, one of the sixty-four gates of the group 147–150 associated with highway 145 is also conducting, the particular gate which is operating being determined by the one of the words which is to be applied to line 1. During the same cycle in which gates 141, 143 are conducting, one of the sixty-four gates of the group 151–154 associated with highway 32 is conducting as required to extend the word to line 993 required for the information requested. Such word may be the same word from the same source or a different word from a different source. Since gates 141, 143 have the same time slot, the word will be extended over the several highways at the same time in each cycle.

It should be observed that each of the word sources are available in multiple to each of the various highways through the thirty-two sets of sixty-four gates (147, 150 . . . 151–154) each of which sets is connected to a different one of the thirty-two highways 145 . . . 146. Thus, the thirty-two line gates conduct in succession during the thirty-two time slot scan cycle one at a time. During the period that a gate is conducting, one of the sixty-four gates 147–150 is rendered conductive with such gate (depending on the word to be transmitted over such highway) the latter gates conducting not in regular succession, but selectively. For example, during time slot 1 for a given word selection, the sixty-second gate 149 conducts. During time slot 2 for a different word selection, the first gate 147 conducts. During time slot 3, the sixty-fourth gate 150 might conduct, etc. In order to effect a further understanding of how the word gates at the right of the highways are selectively enabled to conduct a further consideration of the circuitry of FIGURE 1 is necessary.

As previously noted, drum 161 is continuously rotating in a clockwise direction as viewed from the top end of the drum. A portion 163 of the outer circumference of drum 161 has sixty-two voice tracks thereon, and a word start control wheel 162 which revolves on the same shaft in synchronism with portion 163. Magnetic plugs in wheel 162 cause recording head 164 to pick up a short voltage pulse as each plug passes beneath the head 164 at the end of each word, the pulse occurring during the interval between each pair of words.

As the voltage pulse enters Erase Circuit 121, it causes an erase signal of 140 microseconds duration to be sent to the Memory Control Circuit 132, the Data Transfer Control Circuit 119, and to the Group Control Circuit 118, which operate to erase the previous word on the buffer circuit 117 as will now be shown.

The voltage pulse also activates a Delay Circuit 122 which, after 200 microseconds, causes the Start Pulse Circuit 122A to send a thirty microsecond pulse start over conductor 113 to the Translator Equipment 107.

Referring to the bottom of FIGURE 23, it will be appreciated that the voltage pulse begins at the fifty millisecond interval midway between each pair of words. As will be shown, during only a portion of this fifty millisecond interval the following occurs: (a) a two hundred microsecond delay; (b) a thirty microsecond start signal to the Translator Equipment 107; and (c) an interval of 30,705 milliseconds during which the Translator Equipment 107 loads the memory circuit 133 via the Buffer Circuit 117 in preparation for the next word with a comfortable margin of time to spare.

More specifically, the Translator Equipment 107 continually extends time slot address signals over the leads 109, highway address signals over leads 110 and word data signals over leads 111 to the Digital Audio Equipment 114, but such transmissions only become effective when the sync signal appears on lead 112 as a result of a start signal transmitted over lead 113.

The short sync pulses of approximately 4.4 microseconds width appearing on sync lead 112 to the Timing Control Circuit 120 every thirty microseconds transfer the information from the Translator Equipment 107 to the Buffer Memory 117. The Buffer Memory 117 basically consists of a magnetic core matrix. Highway data received over leads 110 is decoded by the Decoder Circuit 116 and programmed to one coordinate group of the buffer matrix. Word data received over leads 111 is programmed via the Group Control Circuit 118 into the second coordinate group of the buffer matrix 117.

The highway address is marked in the Decoder Circuit 116 by signals on one, two, three, four or five of the five leads of the group of leads 110 which extend thereto from the Translator Equipment 107, and the Decoder is conditioned to place a signal selectively on one of thirty-two highway leads to the Buffer Circuit 117 ($2^5=32$).

The word data information is transmitted by the Group Control Circuit 118 to Buffer Circuit 117 by marking ten leads comprising two groups of five leads, two leads of each group being marked in a two-out-of-five code (a potential marking of $10\times10=100$) although only sixty-four markings are required for the sixty-four words provided in the present embodiment.

Cores in the Buffer Circuit 117 located at the intersections of the coordinates which receive both coordinate signals are switched as the highway data and the word data are coupled thereto to provide the highway address and the data information for a particular highway. Such transfer is made effective by the sync pulse.

With the receipt of the next sync pulse, the Translator Equipment 107 provides the highway address and the data information for another highway, and in this manner the Translator Equipment 107 successively loads the Buffer 117 for the 1024 lines.

Time slot address information is transmitted by the Translator Equipment 107 over leads 109 in combinations of one, two, three, four and five leads at a time to decoder 115 to enable the decoder to selectively place a signal on a particular lead out of thirty-two leads to the Data Transfer Control Circuit 110 ($2^5=32$) to indicate a particular time slot. At certain stages prior to loading of the Buffer Circuit 117, coincidence of the time slot signal in the Data Transfer Control Circuit together with a signal from Delay Line 124 controlled by the 250-kc. oscillator circuit, and a time slot signal from the memory scanner 135 (plus certain other conditions to be described) enables the Data Transfer Control Circuit 119 to condition the Buffer Core Matrix to dump stored information into magnetic cores of a matrix in Memory Circuit 133. The details and purpose of such operation are set forth in detail hereinafter.

The Memory Circuit 133 is controlled in a scanning operation conjointly by the Memory Control Circuit 132 and the Memory Scanner Circuit 134. The Memory Control Circuit 132 is controlled by the 250-kc. oscillator circuit 123 and Delay Line 125. The Memory Scanner 134 is controlled conjointly by the 250-kc. oscillator circuit 123 and delay line 125, and also by the 7.8125-kc. signal from the Frequency Division Circuit 126 which is driven by the 250-kc. oscillator circuit.

As the Memory Circuit 133 is scanned in synchronism with the Line Gate Control Circuit 130, both being controlled by the 250-kc. oscillator and the 7.8125-kc. signal, the memory operates the Decoder 136 via the Scene Amplifier and Flip-Flop Circuits 135. The Decoder utilizes the necessary ones of the 100 markings to selectively enable the predetermined one of the sixty-four gates of the group 147–154 in each of the highways. If, for example, the calling broker is the broker having substation 100, and the information desired is on track 163B, the decoder circuit 136 effects operation of gate 148 (the sixty-second gate) during time slot 1. Gate 141 is also closed during such time slot and a path is completed over line 1 to the telephone substation set 100 many times for the period that the drum provides such word (i.e., approximately one-half second). If a second word is to be transmitted in such message (as for example the word on track 163A) at such time as the drum rotates to a further step, the second word of the desired information will be commutated to the broker substation 100. In this manner, a synthesized message comprised of many words may be transmitted to the broker. (As will be shown, an average message comprises approximately fifty words, although it may be much larger).

With reference to FIGURE 1, the transmission path from the first word source to Line 1 can be traced from ground through pick-up head 165 through preamplifier 159 to ground. From this ground a circuit can be traced through power amplifier 159' to ground. A circuit can then be traced from ground through large capacity condenser 157 to ground, providing an essentially zero impedance output to the highway gates. Accordingly, the charge on condenser 157 is continually representative of the intelligence of the first word on track 163A of drum 161. When gates 141 and 147 are both caused to conduct simultaneously during the scanning process, a path can be traced from ground through condenser 157, gate 147, highway 145 (#1), gate 141, inductor 140, condenser 139' shown in low pass filter 139 to ground.

The LC determined by the value of inductor 140 and the condenser shown in the associated low pass filter 139 is such that a half cycle at the resonant frequency determined by LC is the length of the time slot during which gate 141 conducts thereby effecting a resonant transfer to optimize transmission.

When the calling broker has received the desired information (a typical message in the present example being approximately fifty words) he restores his handset to the line loop of the Translator Equipment 107 which responsively changes its data on the Word Address leads to the word Silence.

From such time until the time of receipt of the next erase pulse from Erase Circuit 121, the transmission path from telephone set 100 extends to one of the pickup heads associated with the last word received. When the next erase pulse is generated by Erase Circuit 121 (between this word and the next word on the drum path), the information for the call on the Buffer, Memory, Group Control, and Memory Control Circuit is erased.

On the next transfer of information from the Translator Equipment 107 to the Digital Audio Equipment 114, the word data associated with Telephone Set 100 is "Silence" and as a result, during the subsequent scanning, Line 1 is connected over gates 141 and 150 to ground.

Between words, each highway is connected through an associated Highway Discharge gate, such as 155, to ground whereby all the residue of any signals on the Highway is drained for the purpose of minimizing noise which might interfere with communication.

In summary, as the drum 161 continually rotates, the leading edge of a signal received by pick-up head 164 (due to the passage of a plug on drum portion 162) causes the previous word to be erased and signals the Translator Equipment 107 to load the Memory 133 via the Buffer 117 with information relative to the next word so that upon the subsequent scanning of line and word gates, the next word will be presented to the ones of the lines requesting such information, such process repeating for each successive word.

If the calling party does not hang up after receiving his message, he may or may not be allowed to receive repetitions of the message as determined by the programming of the Translator Equipment 107.

GENERAL ORGANIZATION OF THE SYSTEM

Prior to describing the details of the switching operation, reference is made to the structure of the Buffer Circuit 117 as shown in FIGURE 20. As there illustrated, the buffer comprises the top or upper horizontal plane of cores in Groups A, B, C and D. The horizontal plane of Group A, which is shown in more detail, includes eight rows of cores, each row extending from left to right and comprising ten cores in each row. The row depicted as closest to the observer represents highawy 1, the next row highway 2 and the last row highway 8. The rows of cores in the horizontal plane of Group B represent highways 9–16, the rows of cores in the horizontal plane of Group C represent highways 17–24, and the rows of cores in the horizontal plane of Group D represent highways 25–32.

Figure 5:
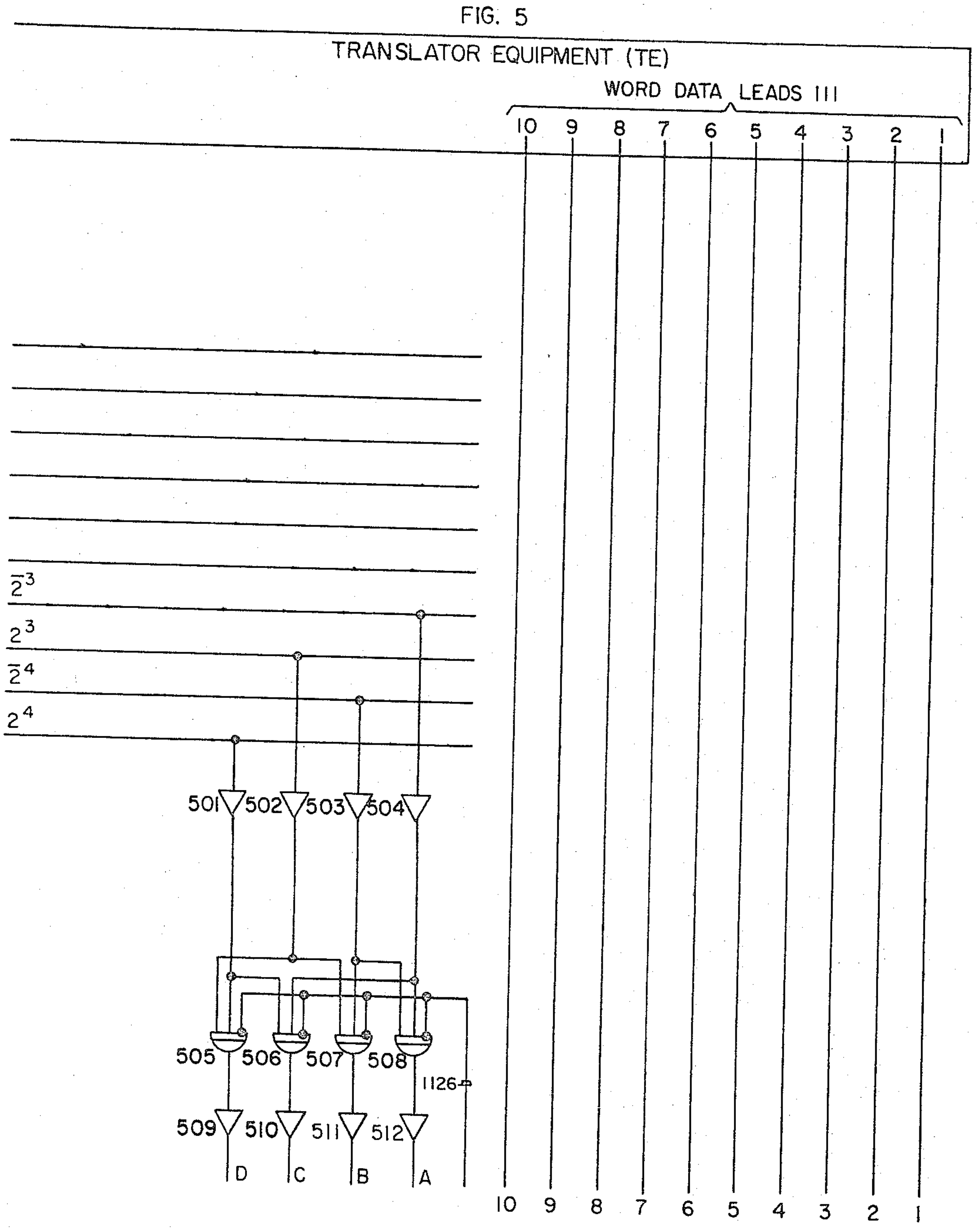
Figure 6:
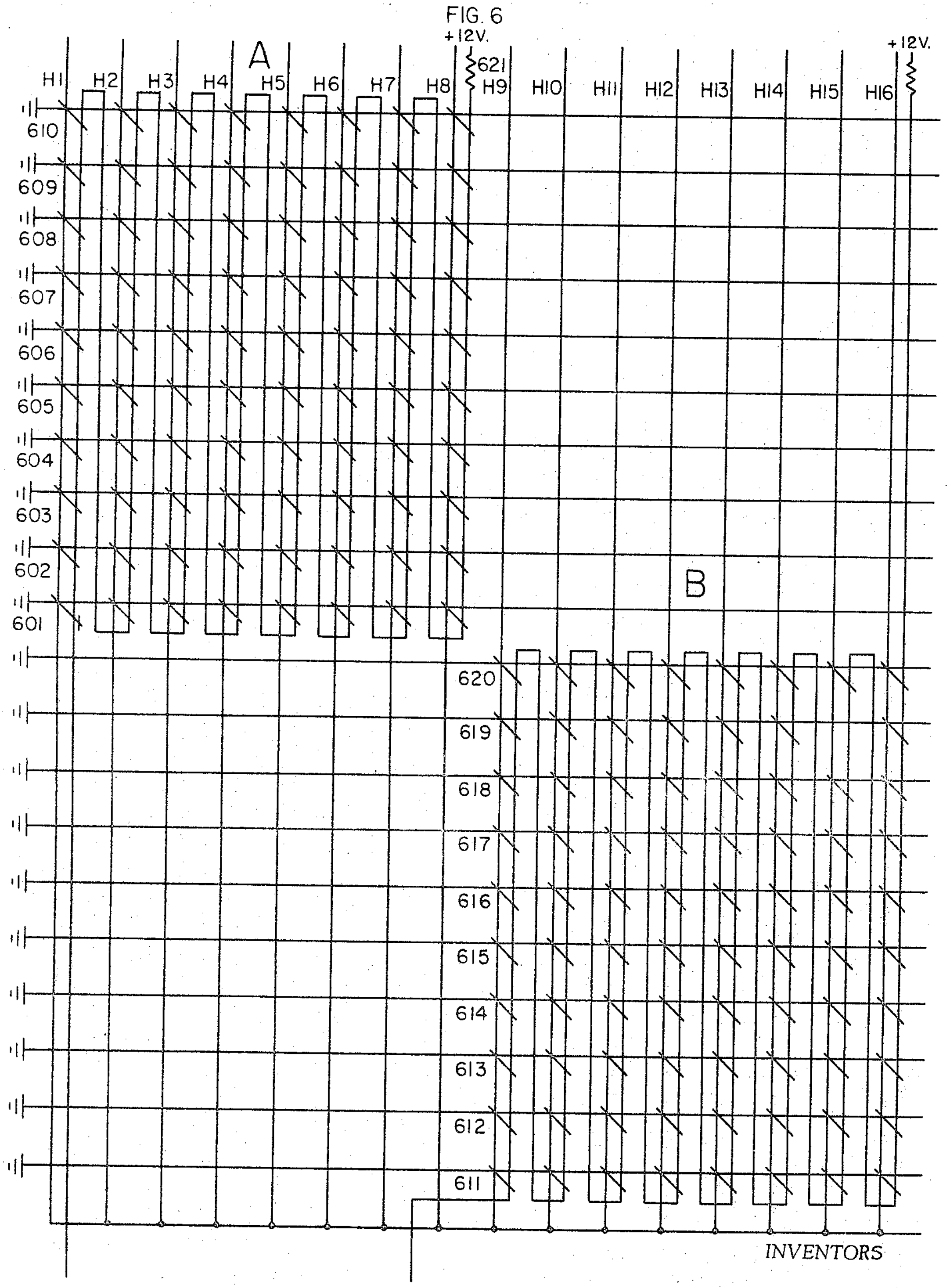
Figure 7:
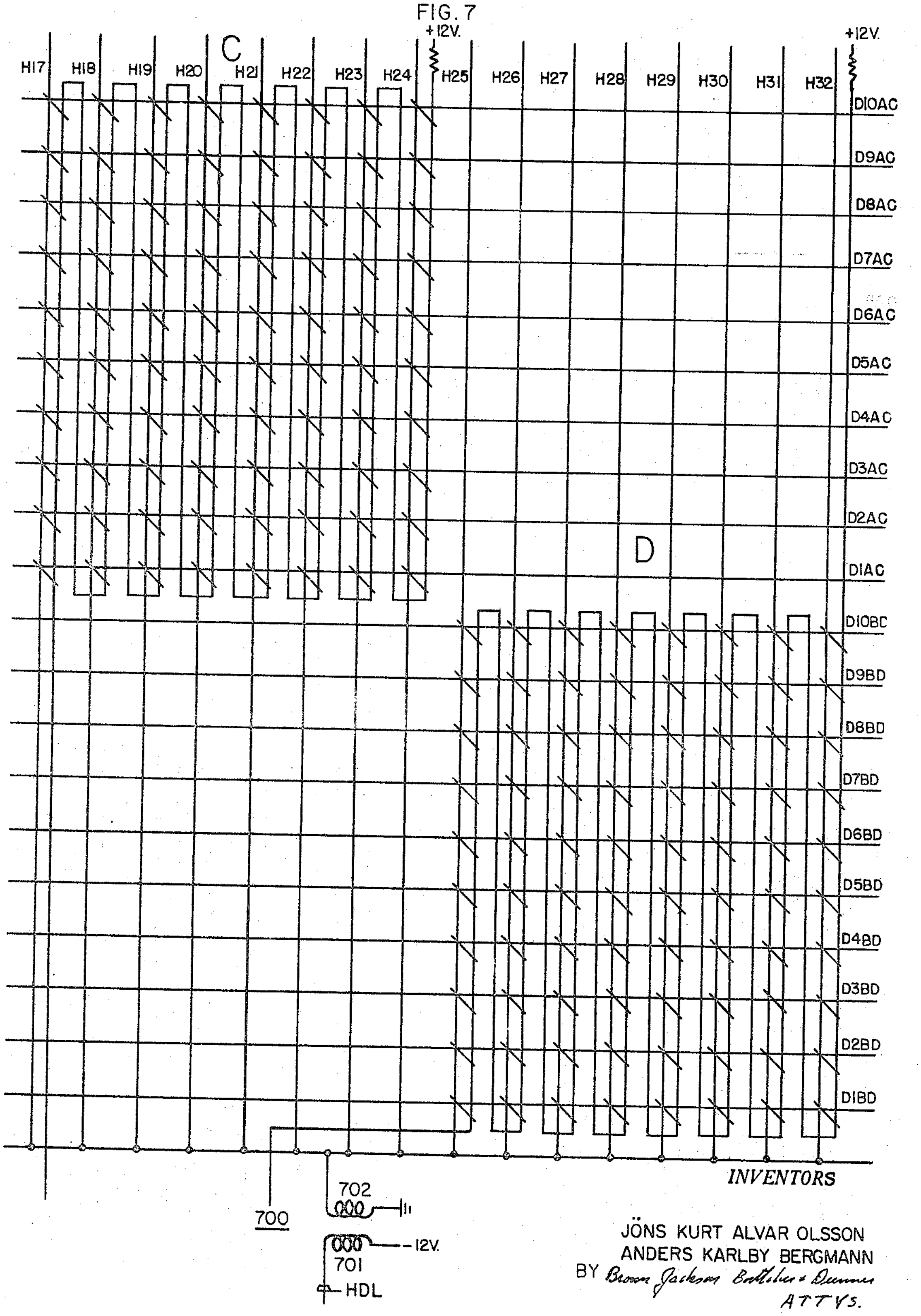
Figure 8:
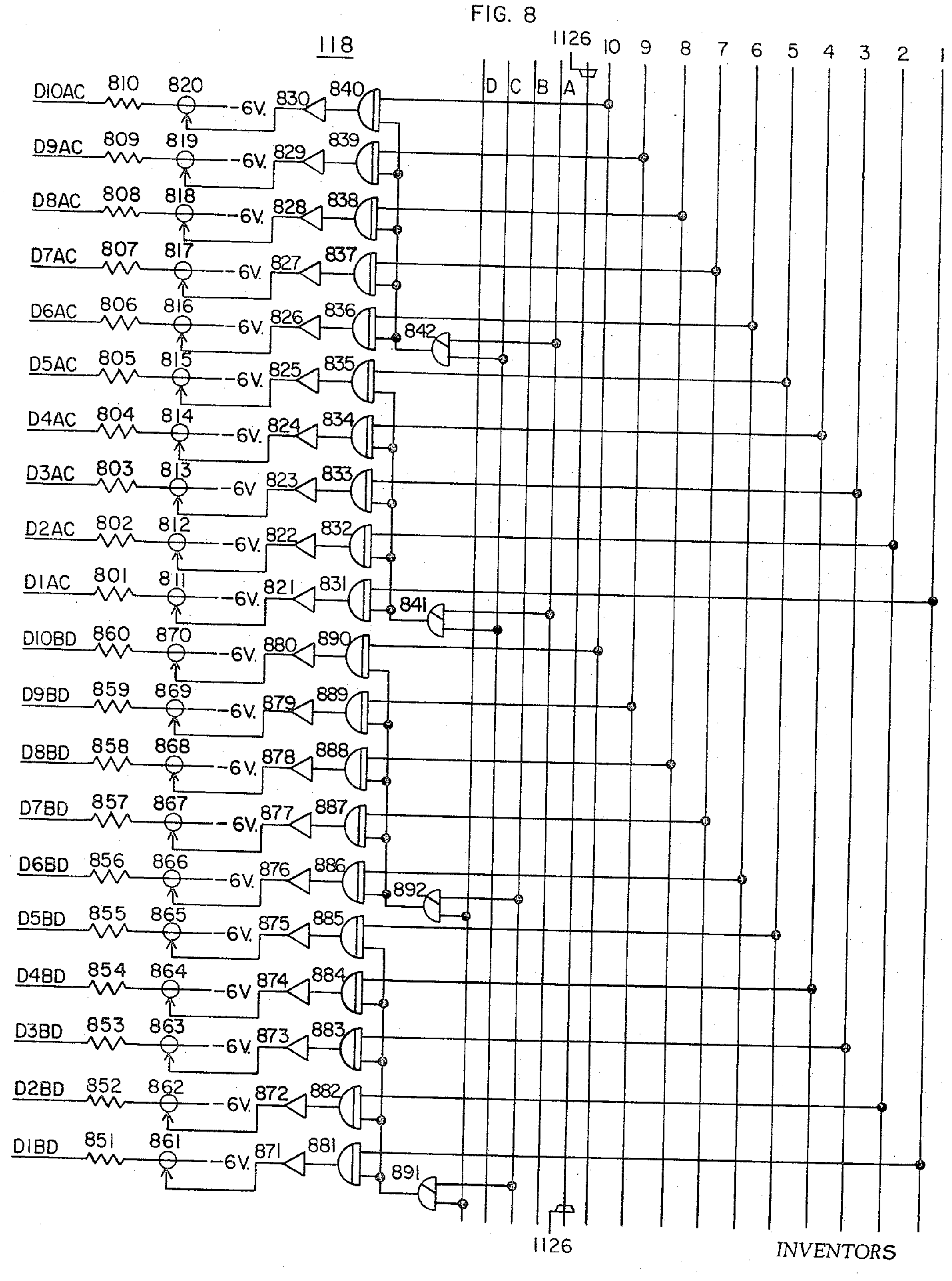

As shown in FIGURE 20, the Buffer planes of Groups A and C are in line with each other; and the planes of Groups B and D are in line with each other, but offset from the planes of Groups A and C. A more detailed view of the Buffer cores of Groups A, B, C and D will be found in FIGURES 6 and 7, which is a view looking down at the cores. As seen in FIGURES 6 and 7, the cores are threaded by thirty-two highway leads H1–H32. The cores of Groups A and C are also threaded by ten Data Leads D1AC–D10AC from the Group Control Circuit (FIGURES 5 and 8), and the cores of Groups B and D are threaded by ten Data Leads D1BD–D10BD from the Group Control Circuit (FIGURES 5 and 8).

Referring again to FIGURE 20, beneath each of the rows of cores in the top plane which represents the highways in Groups A, B, C, and D, is depicted a vertical highway memory plane comprising a matrix of cores, ten cores wide and thirty-two cores long. As shown, each core in the buffer (top) plane is threaded with the vertical columns of cores in the memory plane located below the buffer plane. Thus there are thirty-two vertical highway planes below the thirty-two rows of cores which represent the highways in the Buffer. In FIGURE 6 the core in the lower left corner of Group A has a threading wire 601 indicated which links the row of thirty-two cores in the memory plane below it. Similar threading wires extend through the remaining cores in FIGURES 6 and 7, but are not shown for purposes of clarity.

Figure 13:
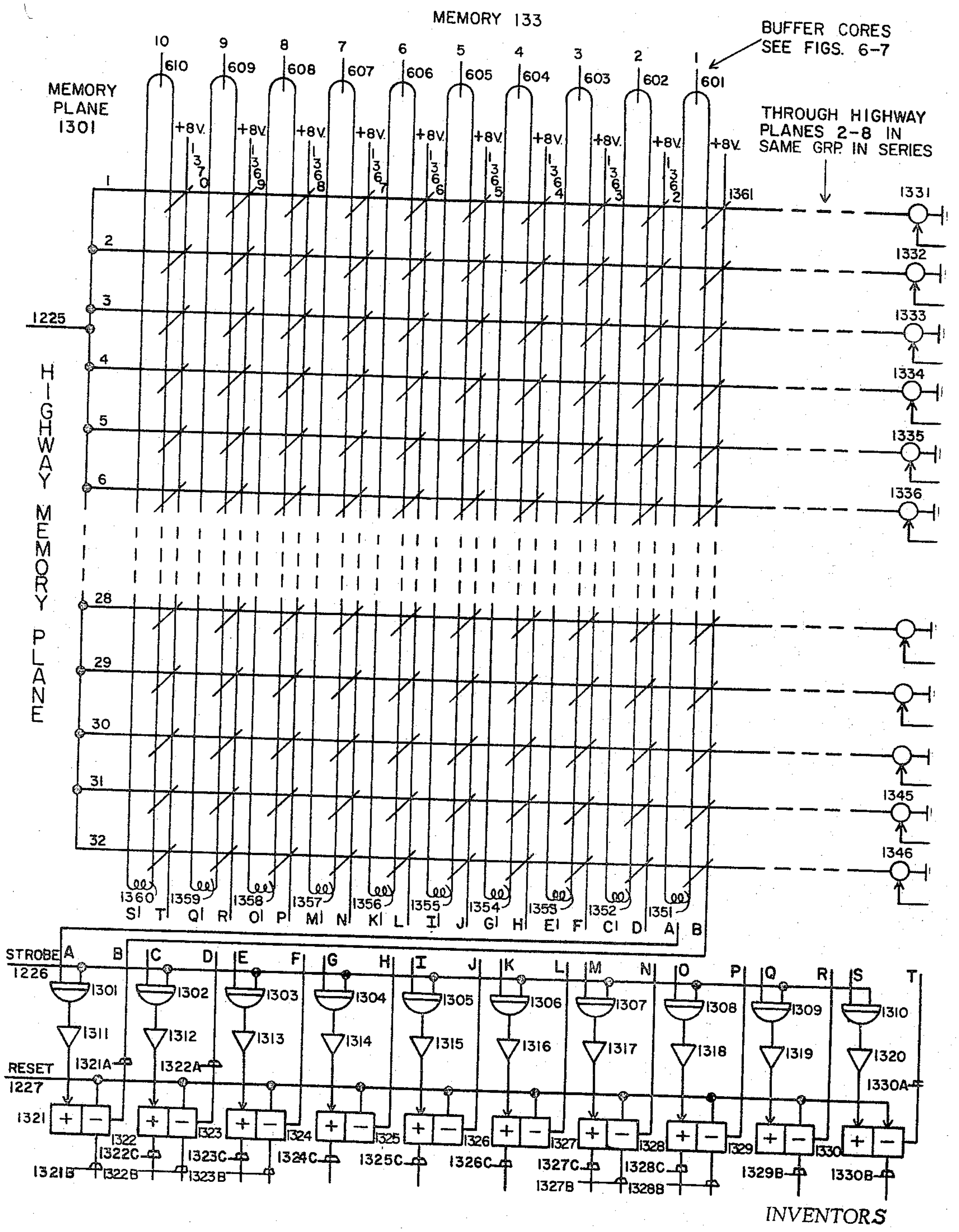

Referring now to FIGURE 13, the top row includes the ten buffer cores for highway 1 and the associated highway memory planes are shown below the cores. As shown in FIGURE 20, FIGURE 13 should be viewed at right angles to the showing of FIGURE 6 and as extending downwardly at the left end thereof. The reference numeral 601 illustrates best the manner in which the Buffer core and the associated memory cores are interconnected.

Figure 16:
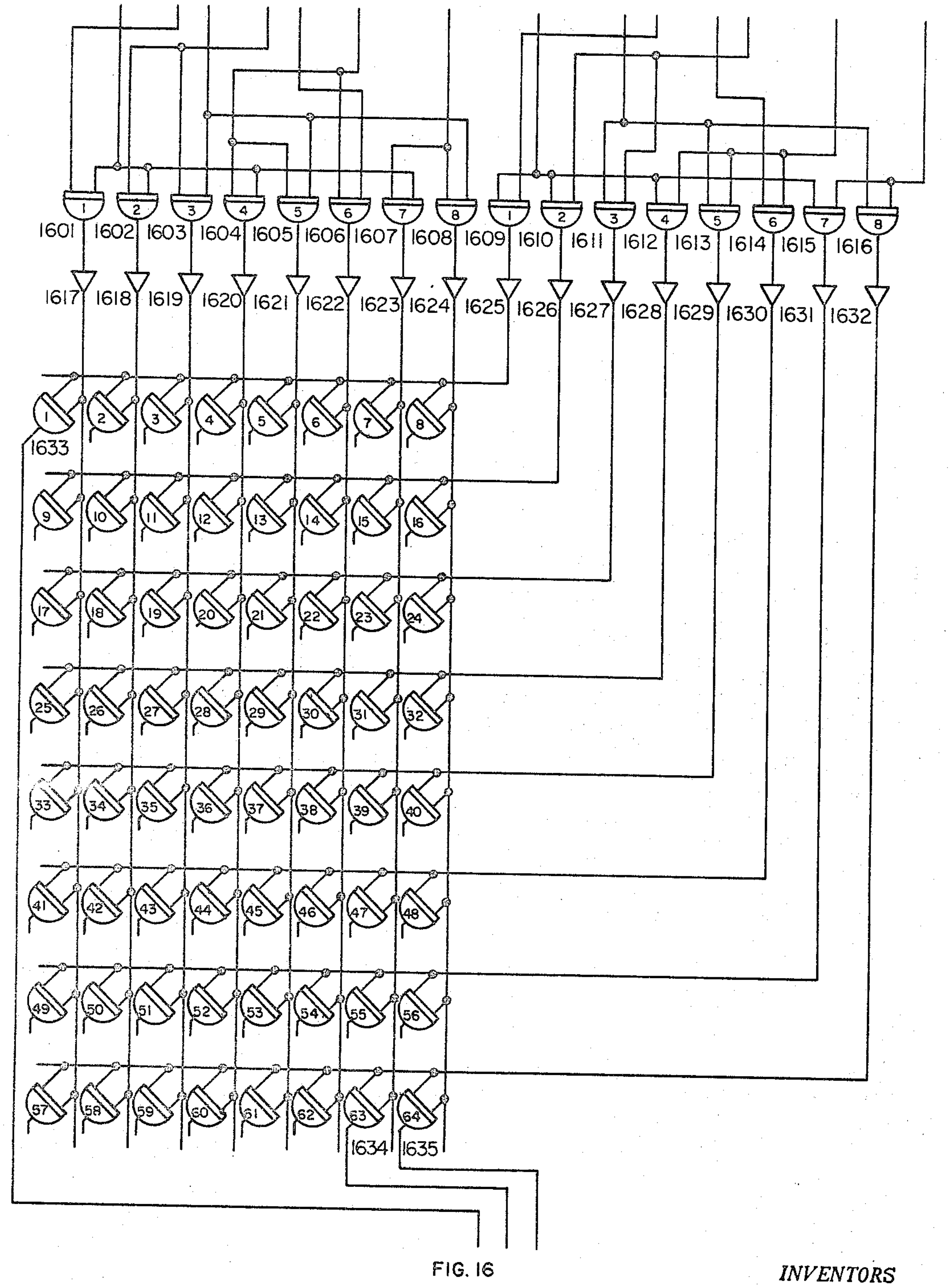
Figure 17:
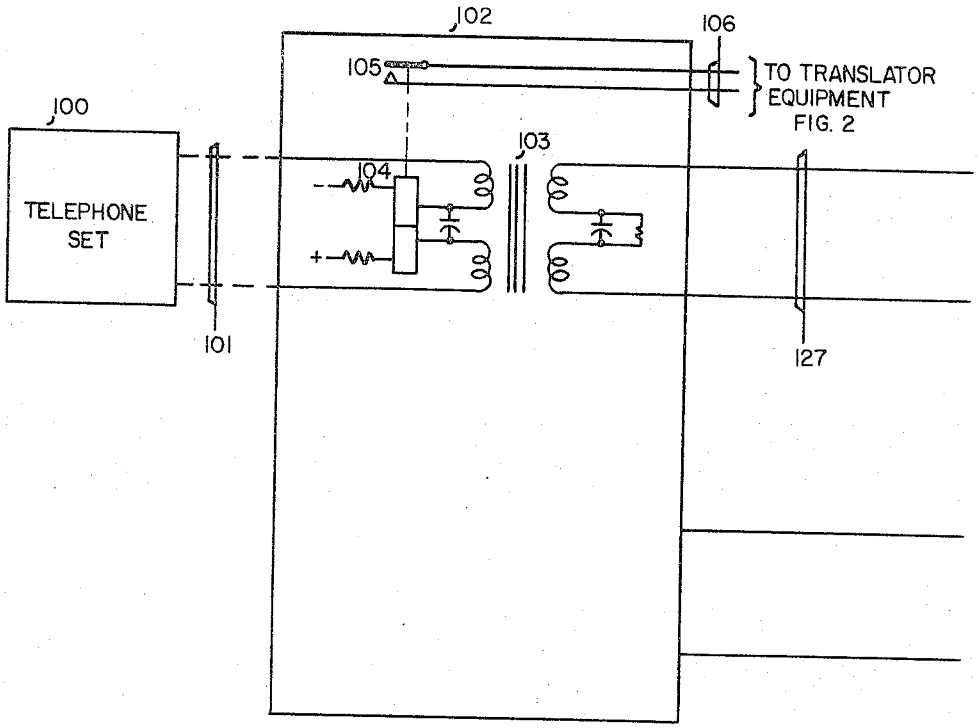
Figure 18:
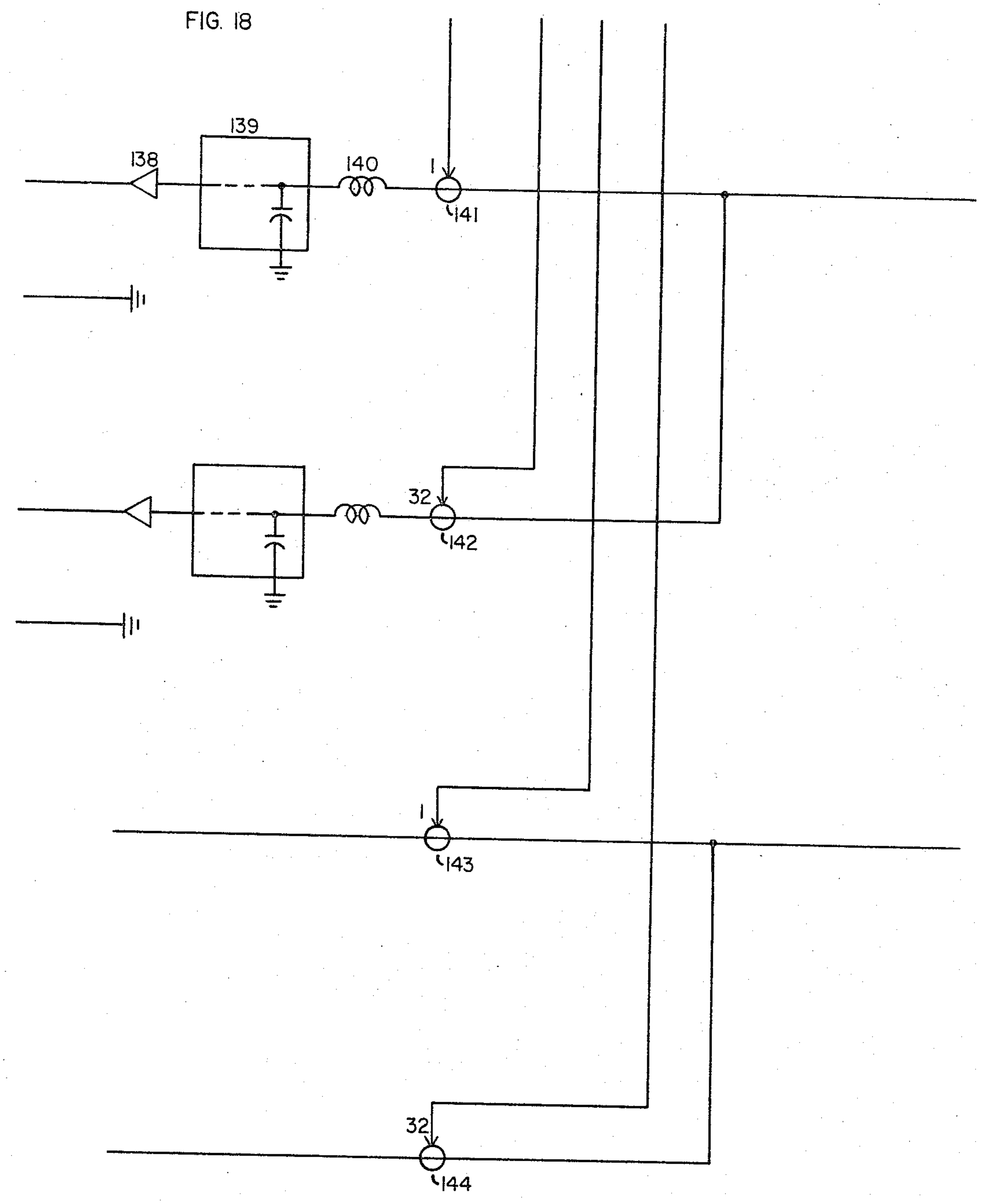
Figure 19:
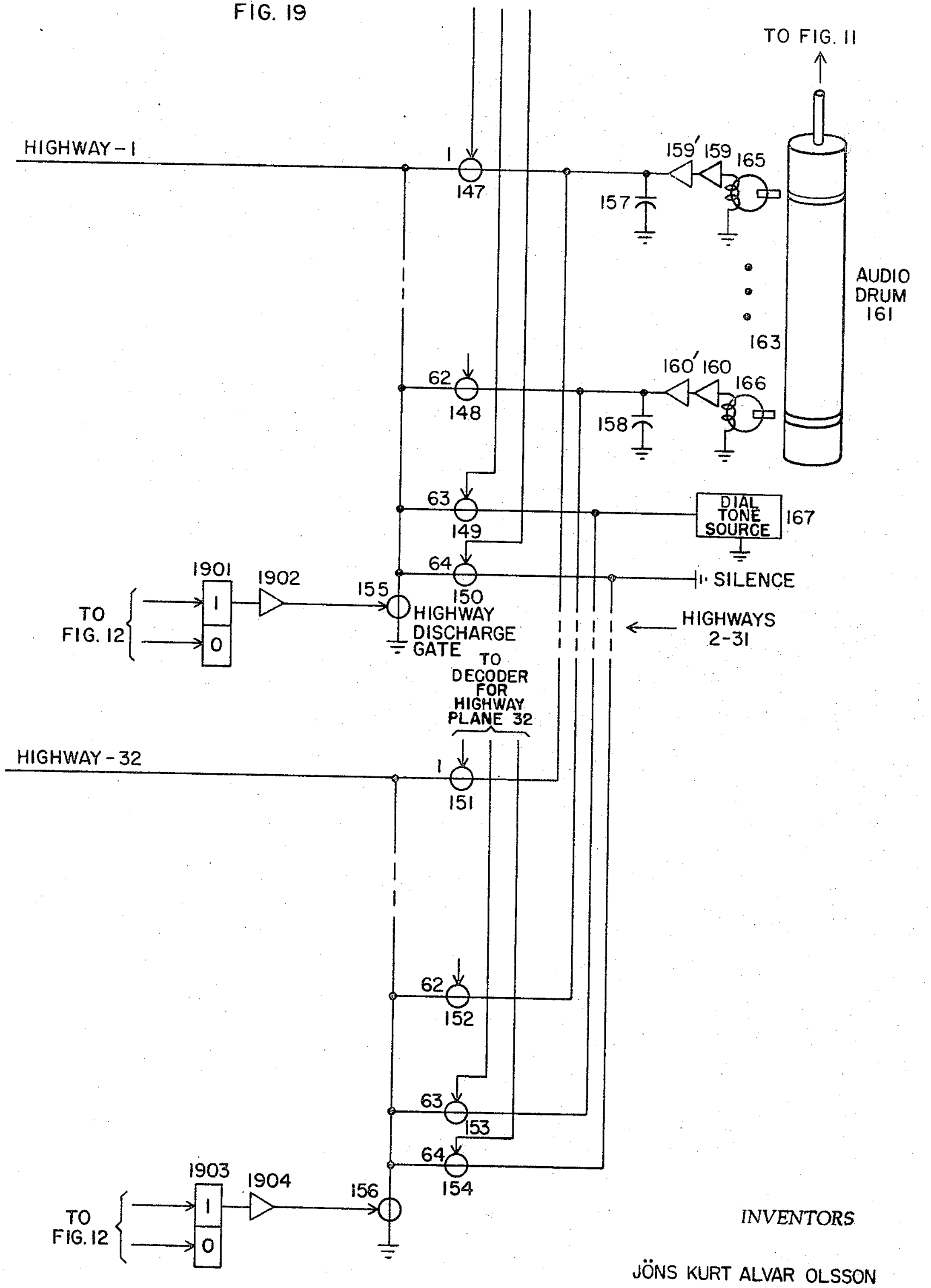

As shown in FIGURE 20, the threading of the vertical plane with a wire such as 601, extends to Sense Amplifiers and Flip-Flops (such as 1301, 1311, 1321) which are shown in more detail in the lower portion of FIGURE 13. Also as shown in FIGURE 20, the sense amplifiers are connetced over conductor 1321B, etc., to an associated Decoder Circuit 136 which is shown in FIGURE 16. The sixty-four outputs from the Decoder Circuit 136 are connected to the sixty-four gates of highway 1 as shown in FIGURE 19.

Figure 12:
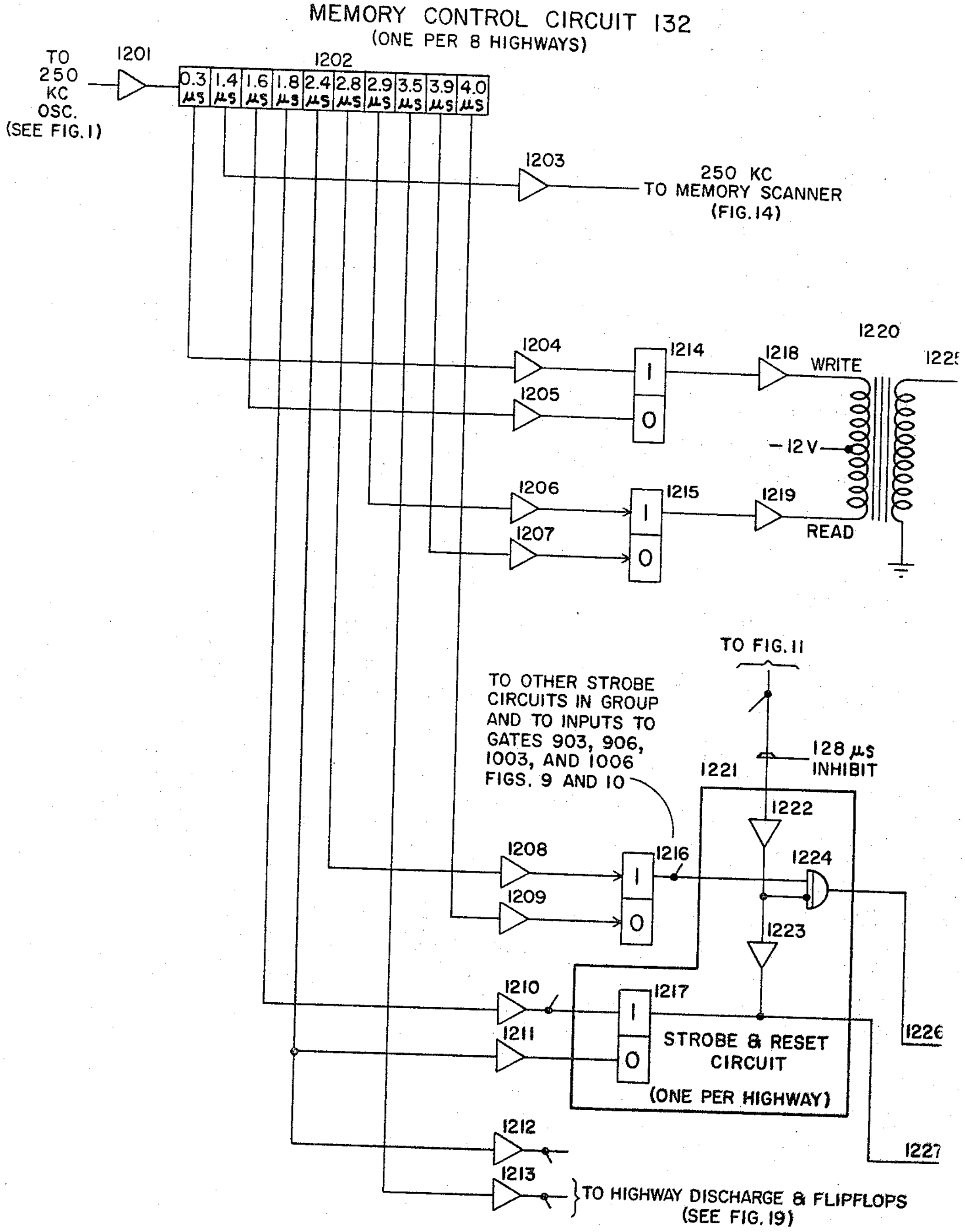
Figure 14:
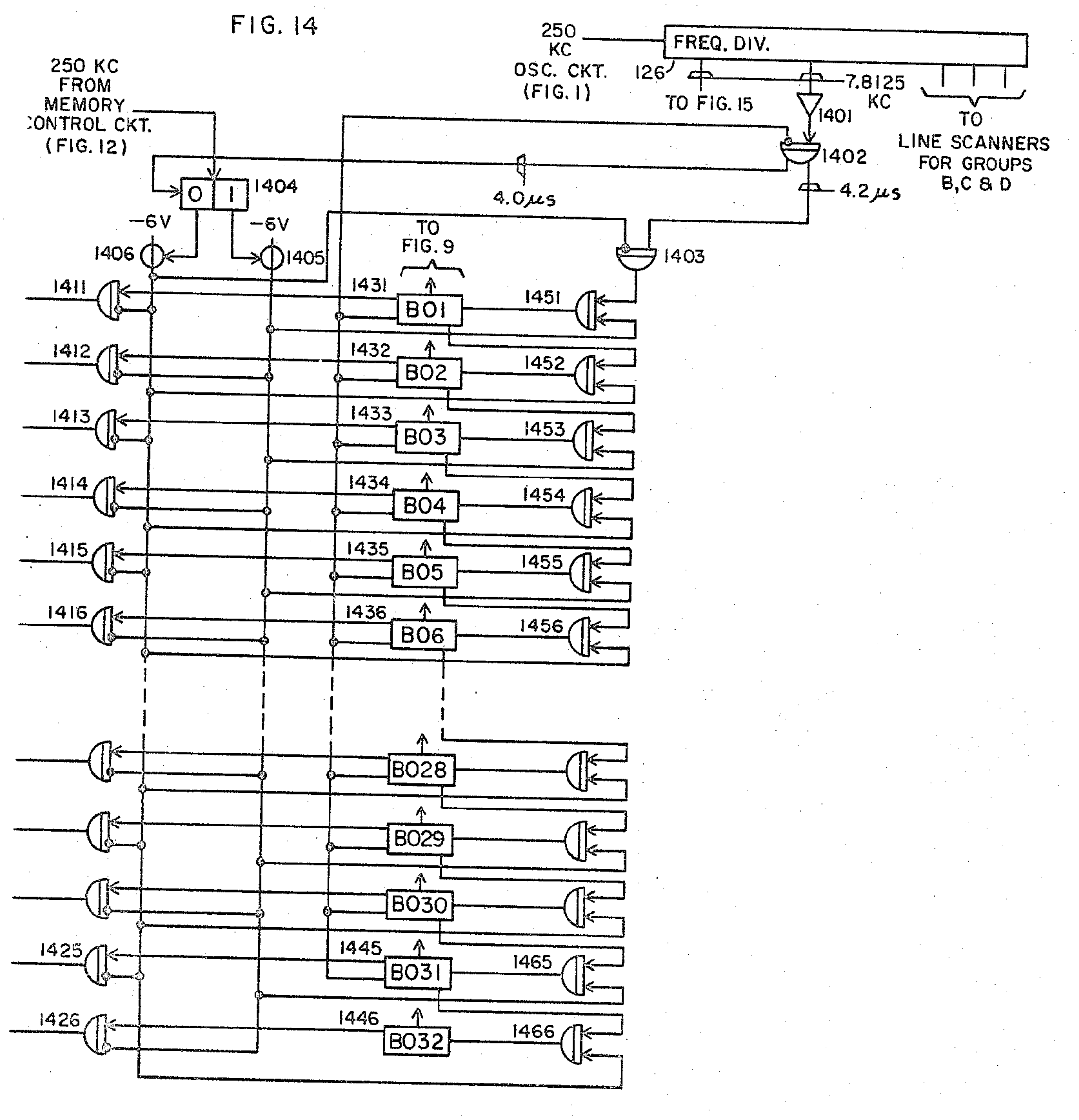

With reference once more to FIGURE 20, and as seen in more detail in FIGURES 12 and 13, the horizontal threading leads of the rows of cores in the memory plane for highway 1 are connected together to a common lead 1225 which extends to the memory control circuit 132. As shown in three dimensions in FIGURE 20, and as indicated by dotted lines in FIGURE 13, each horizontal threading lead, such as 1, threads the corresponding horizontal row of cores in each memory plane 1–8 in Group A in series, thirty-two such leads extending from memory plane 8 to a Memory Scanner 134 (FIGURE 14). Thus the Memory Control 132 and Memory Scanner 134 are common to Group A.

Also as shown generally in FIGURE 20, and in more detail in FIGURE 12, each of the eight Sense Amplifier and Flip-Flop Circuits 136 associated with vertical memory planes 1–8 has connectors to associated Strobe and Reset Circuit 136′, each of which is connected to the Memory Control 132.

Thus Group A comprises eight buffer highway rows of cores with associated eight vertical memory planes, each plane of which has its associated Strobe and Reset Circuit 136, Sense Amplifier and Flip-Flop Circuit 135, Decoder 136 and associated sixty-four highway gates. A common Memory Control 132 and Memory Scanner 134 serve Group A.

Group B associated with highways 9–16, Group C associated with highways 17–24, and Group D associated with highways 25–32 are similarly organized and equipped.

As shown in FIGURE 19 (and FIGURE 1) the gates 1–64 of highway 32 would be connected to the decoder for highway 32 of Group D. The gates of the other highways are connected in a like manner. A buffer core and an associated memory core with schematic indication of leads threaded therethrough including the interconnections between the buffer and memory cores is shown in detail in FIGURE 21.

It will be seen that the buffer core, such as BC1, has a bais lead (one turn), a data lead (three turns), a highway lead (one turn), a dump lead (one turn), and a sense lead (one turn). Values of current which flow in these leads are indicated on FIGURE 21. It should be noted that current flow in the bias and dump leads is in one direction, whereas current flow in the data, highway and sense leads is in the opposite direction. It might also be observed that 600 ma. through one turn (in the highway lead, for example) produces the same magnetic flux effect as the passage of 200 ma. through three turns in the data lead.

The Memory core MC1 has a bias lead (one turn), a read-write lead (one turn), a bit rewrite lead (three turns) and a sense lead (one turn). The read-write lead first has current in read direction therein as shown by the arrow aimed to the right; and then current in the write direction therein as shown by the arrow aimed to the left. Bias and read currents are in one direction; whereas write, bit rewrite and sense currents are in the opposite direction.

Although the bias leads have been left out of the other drawings (in an effort to simplify the drawings) bias leads thread each of the magnetic cores.

Referring to FIGURE 20, a single bias lead carrying a direct current to produce 180 ma. threads all the cores of the two memory planes for highways 1 and 2 and the associated buffer cores. Another bias lead threads all the cores of the next two memory planes for highways 3 and 4 and the associated buffer cores. The remaining cores in each successive group of two highway memory planes and their associated buffer cores are connected in a similar manner.

The nature of the signals coupled to the buffer and memory cores, and operation of the cores in response thereto is now set forth. The hysteresis loop for the square loop material core which is used in both the buffer and memory is shown in FIGURE 22. The Bias current of 180 ma. causes the "0" logic condition, shown at the bottom of the loop, to be moved left of center on the loop for biasing purposes.

With the core in the "0" logic condition, read current in the memory core, or dump current in the buffer core, causes the core to magnetically move from the bias position toward the left to the end of the arrow which represents read or dump. After the read or dump current is removed, the core magnetically moves back to the right to the normal biased position, with no effect.

Referring to the buffer core, if current flows in the data lead, the core moves magnetically to the right to the position indicated at the end of the arrow. At the end of the current in the data lead, the core moves back magnetically to the logic "0" position.

If current flows in the highway lead (and not the data lead), the core would move magnetically the same distance to the right, and would return to the "0" position at the end of current flow.

If dump and data current flow at the same time they cancel each other as can be seen by the direction of the arrows.

If data and highway currents flow simultaneously as they would in a selected core in the buffer matrix, the core moves magnetically to the right over the knee of the curve and up to the position marked by the dotted vertical line which rises at the end of the arrow marked highway. When current ceases in the data and highway leads, the core moves to the position indicated as logic "1" at the top of the curve.

With the buffer core in the logic "1" position, subsequent flow of dump current causes the buffer core to move magnetically from the logic "1" position to the left and down the curve to the position indicated by the end of the arrow associated with dump current. When dump current ceases, the core moves magnetically back to the logic "0" position.

When the core moves magnetically from the logic "0" position to the logic "1" position, current flow in the sense lead through winding 2101 is in the wrong direction to constitute an input to AND gate 1310. However, when the core moves magnetically from the logic "1" position to the logic "0" position, current flow in the sense lead is in the right direction to constitute an input to the AND gate 1310. When this occurs simultaneously with a strobe input to AND gate 1310, an output signal via amplifier 1320 causes flip-flop 1330 to change condition placing a logic "1" signal on the bit write lead through the memory core.

Referring now to the memory core of FIGURE 21 and to FIGURE 22, write current alone is insufficient to cause the memory core to move magnetically from the logic "0" position over the knee of the curve. However, if write current and bit write current flow simultaneously, the memory core moves magnetically from the logic "0" position over the knee of the curve and up to the position defined by the vertical dotted line at the end of the arrow designated "write." When these currents cease, the core moves magnetically to the position designated logic "1."

Shortly after the dump current in the buffer core has resulted in the setting of the memory core to the logic "1" position, a reset signal to flip-flop 1330 resets this flip-flop to the original position changing the output of the right side thereof to back the logic "0" position, removing the bit write current.

If either write current, or both write and bit write current, flow with the memory core in the logic "1" position, the core moves magnetically to the right but does not go to the logic "0" position. When the current ceases, the core moves magnetically back leftward to the logic "1" position.

If read current flows with the memory core in the logic "1" position, the core moves magnetically from the logic "1" position over the knee of the curve to the left and down the curve to the position defined by the vertical dotted line at the end of the arrow designated "Read." When the read current ceases, the core moves to the right to the logic "0" position.

As a consequence of the memory core moving from the logic "1" position to the left down over the knee of the curve as just described above, a current is induced in the sense lead in the right direction to constitute an input to the AND gate 1310. With the Strobe signal present as an input, the AND gate 1310 gives an output via amplifier 1320 to flip-flop 1330 which changes condition, giving out a logic "1" from the right portion thereof which constitutes a bit write current through the memory core.

As write current appears simultaneously with the bit write current, the memory core moves from the logic "0" position to the right up over the knee of the curve. When write and bit write current cease, the core moves magnetically to the logic "1" position. Thus readout of the memory core is of the destructive memory type, but the same information is immediately placed back or restored in the memory core. By reference to FIGURE 13, it can be seen that another output signal from the right side of flip-flop 1330 extends to the Decoder during readout.

It should be observed in passing that during the 128-microsecond erase pulse, the strobe pulse to gates, such as 1310 is removed so that the dumping of buffer cores does not result in setting memory cores. Also when the next scanning occurs with the strobe pulses absent, the memory cores by destructive readout are reset to the logis "0" state and rewrite does not occur, whereby "reset" is accomplished.

*Typical message*

With reference to the general description of operation of the signals which are supplied to the buffer and memory cores, and the manner of operation of the cores in response thereto, the disclosure now sets forth the manner in which a message is synthesized and transmitted to a broker's office in response to the receipt of a request for information concerning a particular stock.

A typical message which may be illustrated below in Chart 1 comprises a plurality of items of information, each of which may comprise one or a plurality of words. Items of information are separated from each other by a word or words "Silence." In some instances portions of an item are separated by a word "Silence."

Equipment continually programs these leads, in combination, independent and regardless of the receipt of a start signal from the Digital Audio Equipment 114 to indicate particular highways in the following manner.

CHART 1.—TYPICAL MESSAGE

Word Word Word Word Word Word Word Word Word Word Word Word Word Word Word Word Word Word Word

R A ACTIVE LAST OFFER 8 1 ⅝ LAST BID 7 9 ½

Word Word Word Word Word Word Word Word Word Word Word Word Word Word Word Word

VOLUME 2 0 OPEN 7 9 HIGH 8 1 ⅜

Word Word Word Word Word Word Word Word Word Word

LOW 7 8 CLOSE 8 0 ½

Such message as transmitted to and heard by the calling broker may be interpreted as follows: The first item "RA" defines the particular stock in abbreviated form, and would be heard as two words R and A. The various stocks have published abbreviations comprising two or three letters, each letter of which comprises a word so that many combinations of two or three letters are available for designating stock, and as a result each stock does not require a unique word.

The second item "ACTIVE" would be heard as a single word and would indicate that the stock having the designation "RA" has had at least one sale that day.

The third item "LAST OFFER 81⅝" comprises words "Last," "offer," "8," "1," and "⅝" (and certain words "Silence") and signifies the value of the last offer placed on the ticker tape that day.

The fourth item "LAST BID 79½" signifies the value of the last bid placed on the ticker tape that day.

The fifth item "VOLUME 20" indicates in hundreds of shares the amount of stock sold the previous day.

The sixth item "OPEN 79" indicates the value of the first transaction the previous day.

The seventh item "HIGH 81⅜" indicates the highest value stock was sold at the previous day.

The eighth item "LOW 78" indicates the lowest value stock was sold at the previous day.

The ninth item "CLOSE 80½" indicates the value of the last transaction the previous day.

Such message is, of course, exemplary of the messages which might be transmitted, and is in no way to be considered as limiting of the system operation.

*Logic diagram description*

The programming of signals by the Translator Equipment 107 on the time slot address leads 109, the highway address leads 110 and the word data leads 111 are set forth hereat, and thereafter, a description of the response of the Translator Equipment 107 responsive to the receipt of the start signal.

Referring first to the highway address group of leads 110 comprising leads $2^4$, $2^3$, $2^2$, $2^1$, and $2^0$, the Translator Equipment continually programs these leads, in combination, independent and regardless of the receipt of a start signal from the Digital Audio Equipment 114 to indicate particular highways in the following manner.

CHART 2.—LEADS ENERGIZED

| Highway Number | $2^4$ (16) | $2^3$ (8) | $2^2$ (4) | $2^1$ (2) | $2^0$ (1) |
|---|---|---|---|---|---|
| 1 | | | | | |
| 2 | | | | | X |
| 3 | | | | X | |
| 4 | | | | X | X |
| 5 | | | X | | |
| 6 | | | X | | X |
| 7 | | | X | X | |
| 8 | | | X | X | X |
| 9 | | X | | | |
| 10 | | X | | | X |
| 11 | | X | | X | |
| 12 | | X | | X | X |
| 13 | | X | X | | |
| 14 | | X | X | | X |
| 15 | | X | X | X | |
| 16 | | X | X | X | X |
| 17 | X | | | | |
| 18 | X | | | | X |
| 19 | X | | | X | |
| 20 | X | | | X | X |
| 21 | X | | X | | |
| 22 | X | | X | | X |
| 23 | X | | X | X | |
| 24 | X | | X | X | X |
| 25 | X | X | | | |
| 26 | X | X | | | X |
| 27 | X | X | | X | |
| 28 | X | X | | X | X |
| 29 | X | X | X | | |
| 30 | X | X | X | | X |
| 31 | X | X | X | X | |
| 32 | X | X | X | X | X |

The Translator Equipment 107 continually programs the time slot address group of leads 109 comprising leads $2^4$, $2^3$, $2^2$, $2^1$, and $2^0$, in combination, regardless and independent of any start signal from the Digital Audio Equipment in the same manner to indicate particular time slots.

Referring now to the center portion of FIGURE 23, it can be seen that the time slot 1 signal on leads 109 (i.e., no leads energized) which corresponds to the signal on lead 1 from the Time Slot Decoder 115 in 960 microseconds in length; that the time slot 2 signal on leads 109 is 960 microseconds; and similarly for the other of the thirty-two time slots.

Referring to the top portion of FIGURE 23 it can be seen that during the time slot 1 signal, successively there are thirty-two signals of thirty microseconds duration which correspond to the successive signals on leads 1 to 32 from the highway address decoder 116. During time slot 2 signal, successively there is a repetition of thirty-two signals of thirty microseconds duration.

During each of the thitry microsecond intervals of a time slot, the Translator Equipment energizes the word data leads 111, in combination, to indicate the particular word which applies to the particular highway during the particular time slot. These ten leads are divided into two groups, one group comprising leads 1–5 and the other group, leads 6–10. Leads 1–5 are energized in the two-out-of-five code to give ten possibilities. Leads 6–10 are also energized in the two-out-of-five code to give ten possibilities. Using the two groups simultaneously gives 10×10 or 100 possible combinations. As there are only sixty-four words, not all combinations are used.

Following is a representative list of the various combinations to indicate words:

CHART 3.—WORD DATA LEADS OF GROUP III ENERGIZED

| Word Number | Word | Upper Group | Lower Group |
|---|---|---|---|
| 1 | Active | 7, 6 | 2, 1 |
| 2 | And | 7, 6 | 3, 1 |
| 3 | Bid | 7, 6 | 3, 2 |
| 4 | Close | 7, 6 | 4, 1 |
| 5 | Error | 7, 6 | 4, 2 |
| 6 | High | 7, 6 | 4, 3 |
| 7 | Last | 7, 6 | 5, 1 |
| 8 | Low | 7, 6 | 5, 2 |
| 9 | None | 8, 6 | 2, 1 |
| 10 | Offer | 8, 6 | 3, 1 |
| 11 | Open | 8, 6 | 3, 2 |
| 12 | Sixteenths | 8, 6 | 4, 1 |
| 13 | Volume | 8, 6 | 4, 2 |
| 14 | Zero | 8, 6 | 4, 3 |
| 15 | | 8, 6 | 5, 1 |
| 16 | A | 8, 6 | 5, 2 |
| 17 | B | 8, 7 | 2, 1 |
| 18 | C | 8, 7 | 3, 1 |
| 19 | D | 8, 7 | 3, 2 |
| 20 | E | 8, 7 | 4, 1 |
| 21 | F | 8, 7 | 4, 2 |
| 22 | G | 8, 7 | 4, 3 |
| 23 | H | 8, 7 | 5, 1 |
| 24 | I | 8, 7 | 5, 2 |
| 25 | J | 9, 6 | 2, 1 |
| 26 | K | 9, 6 | 3, 1 |
| 27 | L | 9, 6 | 3, 2 |
| 28 | M | 9, 6 | 4, 1 |
| 29 | N | 9, 6 | 4, 2 |
| 30 | O | 9, 6 | 4, 3 |
| 31 | P | 9, 6 | 5, 1 |
| 32 | Q | 9, 6 | 5, 2 |
| 33 | R | 9, 7 | 2, 1 |
| 34 | S | 9, 7 | 3, 1 |
| 35 | T | 9, 7 | 3, 2 |
| 36 | U | 9, 7 | 4, 1 |
| 37 | V | 9, 7 | 4, 2 |
| 38 | W | 9, 7 | 5, 1 |
| 39 | X | 9, 7 | 5, 1 |
| 40 | Y | 9, 7 | 5, 2 |
| 41 | Z | 9, 8 | 2, 1 |
| 42 | | 9, 8 | 3, 1 |
| 43 | 1 | 9, 8 | 3, 2 |
| 44 | 2 | 9, 8 | 4, 1 |
| 45 | 3 | 9, 8 | 4, 2 |
| 46 | 4 | 9, 8 | 4, 3 |
| 47 | 5 | 9, 8 | 5, 1 |
| 48 | 6 | 9, 8 | 5, 2 |
| 49 | 7 | 10, 6 | 2, 1 |
| 50 | 8 | 10, 6 | 3, 1 |
| 51 | 9 | 10, 6 | 3, 2 |
| 52 | 11 | 10, 6 | 4, 1 |
| 53 | 13 | 10, 6 | 4, 2 |
| 54 | 15 | 10, 6 | 4, 3 |
| 55 | 1/8 | 10, 6 | 5, 1 |
| 56 | 1/4 | 10, 6 | 5, 2 |
| 57 | 3/8 | 10, 7 | 2, 1 |
| 58 | 1/2 | 10, 7 | 3, 1 |
| 59 | 5/8 | 10, 7 | 3, 2 |
| 60 | 3/4 | 10, 7 | 4, 1 |
| 61 | 7/8 | 10, 7 | 4, 2 |
| 62 | | 10, 7 | 4, 3 |
| 63 | Dial Tone | 10, 7 | 5, 1 |
| 64 | Silence | 10, 7 | 5, 2 |

As will be more fully appreciated in the further description, the Translator Equipment 107 receives a start signal and loads the buffer (which contains thirty-two rows of cores associated with the thirty-two highways) by successively loading the rows of cores during the time slot 1 interval on leads 109 with the information for time slot 1 on each of the highways, which information becomes dumped into the memory as more fully explained hereinafter.

During the time slot 2 interval on leads 109, the Translator Equipment loads the rows of cores successively with the information for time slot 2 on each of the highways. Similarly, the translator effects a similar loading during the remainder of the time slot intervals on leads 109.

As has been seen, one of the words on the drum 161 is "ERROR." Whenever the Buffer is not being loaded the code for such word is placed on the word data leads 111 (FIGURE 5). Although this has no effect on the Buffer, if for any reason, such as malfunction, the Buffer should become responsive to an input, it would be loaded with the word "ERROR."

Normally the highway address leads 110 (FIGURE 3) are being energized combinationally, and with the decoding equipment 116, rotate over the gates in highway leads H1 to H32 (FIGURES 6, 7) of the Buffer Circuit 117. Energization of the decoder 116 of FIGURES 3 and 4 in turn energizes the group start equipment of FIGURES 5 and 8, causing the data for the word "ERROR" to be extended to data leads D1AC–D10AC and D1BD–D10BD of FIGURE 8. However, since the highway drive lead HDS (FIGURE 11) to the primary 701 of transformer 700 is open, highway drive current does not flow in the secondary winding 702 and the cores in the Buffer cannot be set.

Figure 9:
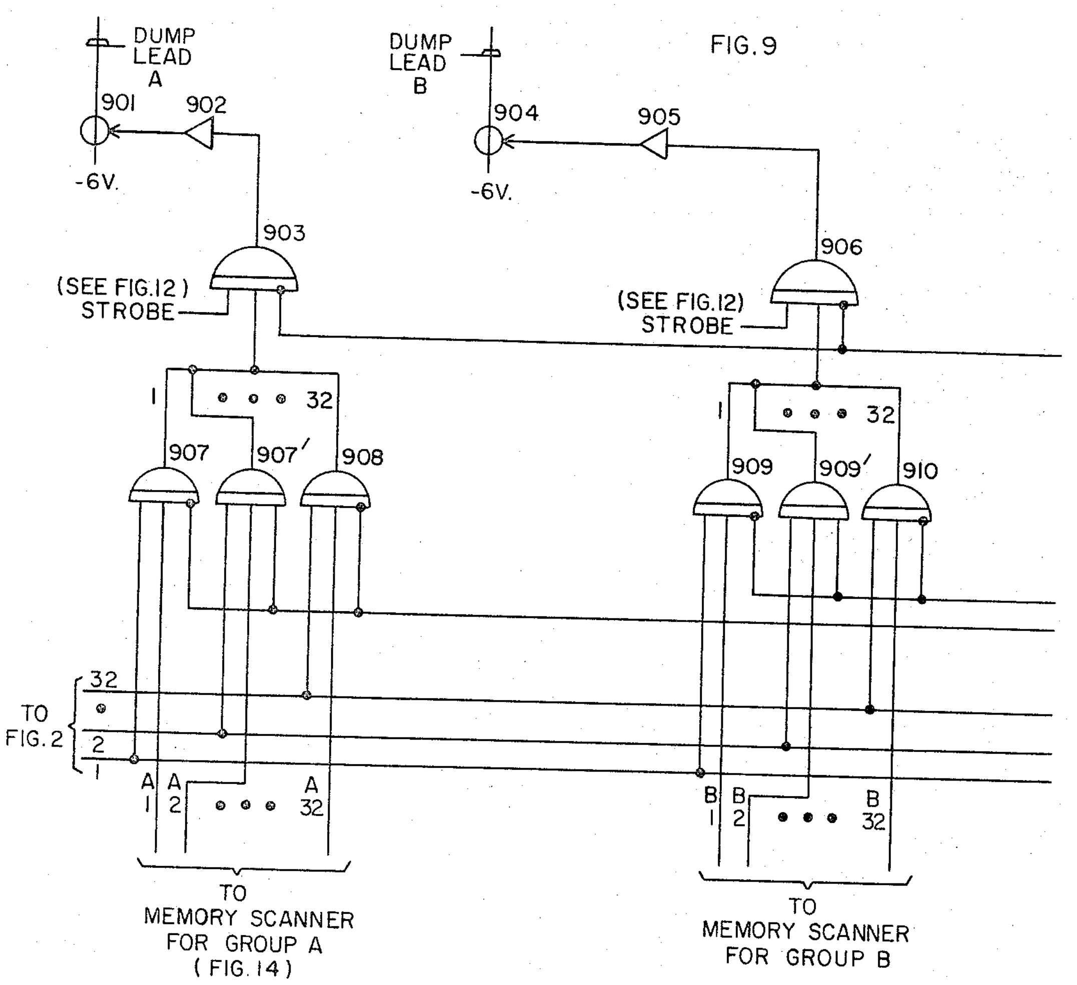
Figure 10:
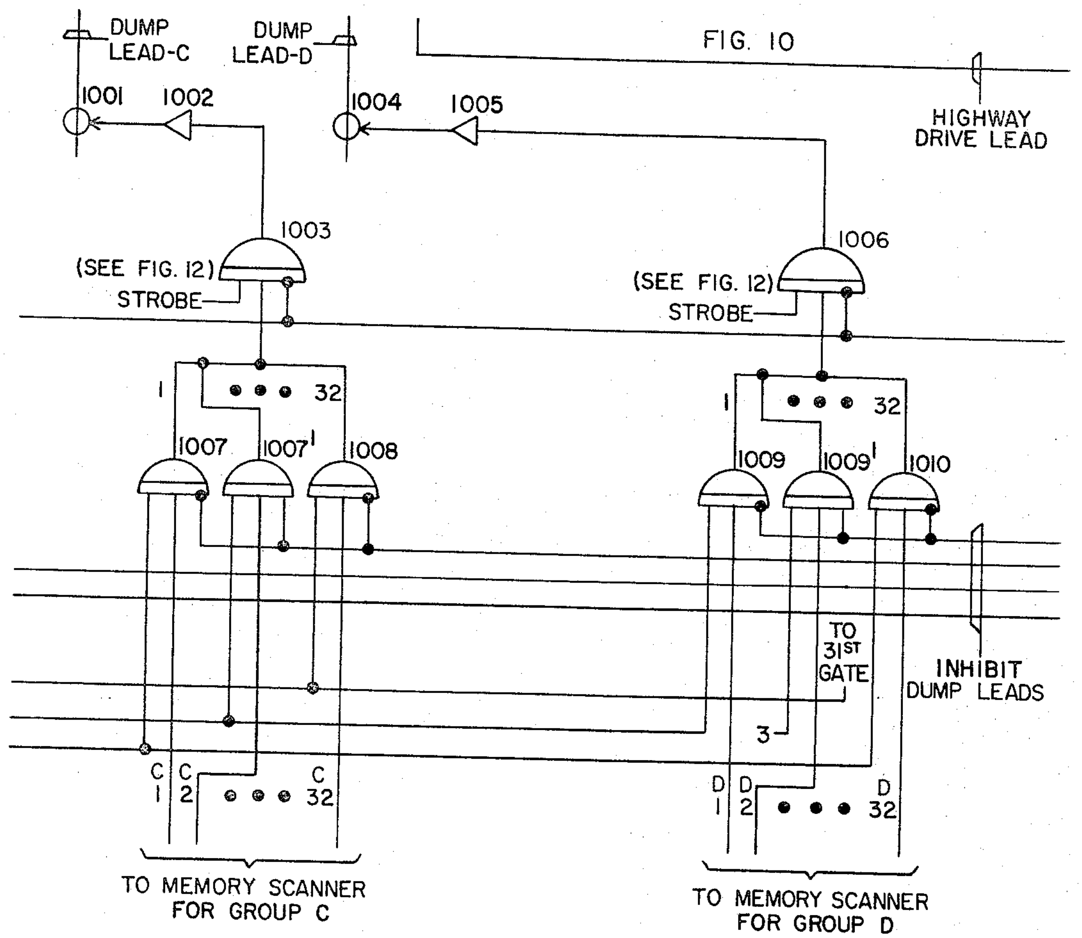

Normally, the time slot address leads 109 (FIGURE 2) are energized, combinationally, so as to cause the decoder 115 to rotate over the thirty-two outlets thereof which are connected to the gates 907–1010 of FIGURES 9 and 10. Conductors A1–A32, B1–B32, C1–C32, D2–D31 connect between gates 907–1010, and the memory scanners for group A–D are also energized in a rotational manner. Gates 907–1010 are also energized by signals from the group control equipment of FIGURES 5 and 8 which are coupled thereto over the inhibit during leads I1–I4.

The output of gates 907–1010 is connected to input on gates 903–1006. Strobe signals are also coupled to inputs of gates 903–1006 to periodically remove the inhibit for gates 903–1006.

Gates 901–1004 are periodically enabled to energize the dump leads A–D of FIGURES 9 and 10. However, it will be recalled that since the highway lead to the transformer 700 was not energized, the Buffer 117 was not loaded, and the empty Buffer carried dump signals into the memory cores of groups A–D.

Referring now to the lower portion of FIGURE 23, the sixty-two magnetically recorded word tracks on the drum 161 are indicated schematically thereat. On each track, the same word is recorded six times at evenly spaced intervals, different tracks having different words. The length of the word may vary, but the maximum length word must leave a space between recordings on the same track of at least fifty milliseconds (assuming the drum to be rotating at a speed of approximately 3 r.p.s.). At this speed, with fifty milliseconds spacing between recordings on the same track, each word can be 450 milliseconds in length. However, words may be shorter in length, if desired. It will be recalled that the control disk 162 (FIGURES 1 and 11) has magnetic plugs positioned so that they rotate past a play-back head 164 as the disk rotates with drum 163, the leading edge of the plug providing a signal to the 140 microsecond erase circuit 121 and to the 200-microsecond delay circuit 122 at the beginning of the 50-microsecond space or interval which exists between a word of maximum allowable length and the subsequent word. For words shorter than the maximum allowable length, the 50-millisecond interval would be considered in the center of the actual interval between words.

As indicated by reference to the word index line of FIGURE 23, the leading edge of the pulse received by the play-back head 164 at the start of the 50-millisecond interval, in consecutive order triggers (a) the 200-microsecond delay of circuit 122, and (b) the 30-microsecond start pulse of circuit 122A for the Translator Equipment 107, and thereafter the buffer 117 loads the memory planes 133. It should be appreciated that all of this occurs in approximately 31 milliseconds which provides an appreciable margin of safety before the expiration of the 50-millisecond interval. The 140-microsecond erase pulse starts at the same time as the 200-microsecond delay period and ends within this period.

The erase circuit 121 puts out a 140-microsecond signal which extends over conductor 1124 to gate 1114 in the Data Transfer Control Circuit 119 over conductor 1125 to the strobe and reset circuit 1221 (FIGURE 12) and over conductor 1126 to the group control circuit (FIGURE 5).

The signal extended over conductor 1126 to group control circuit prevents signals from the word data leads 111 (FIGURE 5) from reaching the Buffer Circuit 117. The signal to gate 1114 effects complete dumping of the Buffer and the signal extended over conductor 1221 to the Strobe and Reset Circuits (FIGURE 12) prevents the dumping of the Buffer from affecting the memory plane cores, and allows the memory to be reset by inhibiting bit write, as will be shown hereinafter.

It is now assumed that the 140-microsecond interval has elapsed, and that the buffer and memory circuits are erased, and that all of the cores are set to the logic "0" state. Subsequently, after the 200-microsecond interval has elapsed (which interval includes a margin of safety insuring that the buffer and memory are reset before the start signal is given to the Translator Equipment 107), delay circuit 122 triggers start pulse circuit 122A which sends a 30-microsecond start pulse to the Translator Equipment 107, the leading edge of which signals the Translator Equipment 107 that the next word may be sent.

As a result of receipt of this leading edge of the start signal, the Translator Equipment 107 removes the signals on the word data leads 111 which represent the word "ERROR." Thereupon the Translator Equipment 107 programs the various leads (time slot 109, highway 110, word data 111) to the Digital Audio Equipment 114 with successive signals to load the memory circuit 133 via the buffer circuit 117 with the next required word for each time slot on each highway (i.e., for each line on each highway).

More specifically, although the Translator Equipment 107 may begin loading the Buffer at any point, for ease of description we shall assume that the loading begins for time slot 1 on highway 1 (line 1 on highway 1).

At such time the programming by the Translator Equipment 107 will have advanced to the stage in which none of the time slot address leads 109 (FIGURE 2) are energized, and lead 1 of the time slot leads from the decoder 211 will be energized as input to gates 907, 909, 1007, and 1010 in FIGURES 9 and 10.

Also none of the highway address leads 110 (FIGURE 3) will be energized. With lead $2^0$ of the group 110 non-energized (logic "0" condition), inverting amplifier 305 will give out the logic "1" signal on lead $\overline{2}^0$. This logic "1" signal to inverter 310 will result in the logic "0" signal output therefrom on signal lead $2^0$. In a similar manner, $\overline{2}^1$, $\overline{2}^2$, $\overline{2}^5$, $\overline{2}^4$, will have logic "1" signal thereon.

With the logic "1" signal on buses $\overline{2}^4$, $\overline{2}^3$, $\overline{2}^2$, $\overline{2}^1$, $\overline{2}^0$, the AND gate 312, which has its input circuit connected to such buses (and only circuit 312 is thus connected) gate 312 provides logic "1" signal to the input for gate 1113 (FIGURE 11) and to amplifier 328 (FIGURE 3) which provides an amplified logic "1" signal to enable gate 344.

With gate 344 conducting, a path can be traced from ground, through gate 344, over lead H1 which represents highway 1, through the ten Buffer cores of Buffer group A (FIGURE 6) and secondary 702 (FIGURE 7) of transformer 700 to ground.

The logic "1" signal on bus $\overline{2}^3$ input to amplifier 504 (FIGURE 5) causes this amplifier to give out the logic "1" signal as input to one input circuit of AND gate 508. Also the logic "1" signal on bus $\overline{2}^4$ input to amplifier 503 causes this amplifier to give out the logic "1" signal as input also to AND gate 508. As the inhibit to AND gate 508 from the 140 microsecond erase circuit 121 has been removed, gate 508 gives out the logic "1" signal to amplifier 512 which gives out the logic "1" signal on lead A as inputs to OR gates 842 and 841 causing these gates both to give out the logic "1" signal as input to AND gates 831–835 (Buffer group A); and gate 842 gives out the logic "1" signal as input to AND gates 836–840 (Buffer group C).

Assuming that line 1 on highway 1 is to receive Dial Tone, it will be seen with reference to Chart 3 (col. 13) that Dial Tone which is the sixty-third word, is represented on word data leads 111 (FIGURE 5) by the transmission of logic "1" signal over leads 10 and 7 in the upper group, and leads 5 and 1 in the lower group.

The logic "1" signal on lead 10 (FIGURE 5) as input to AND gate 840 (FIGURE 8) in conjunction with the aforementioned input from gate 842 enables gate 840 to give out the logic "1" signal to amplifier 830 which in response thereto gives out the logic "1" signal to gate 820 to enable conduction by gate 820. With gate 820 conducting, a path can be traced from −6 v. through gate 820, resistor 810, lead D10AC, through eight cores of group C and eight cores of group A to ground.

In a similar manner, logic "1" signal on lead 7 (FIGURE 5) of the word data group 111 as input to gate 837 (FIGURE 8) results in conduction by gate 837 and energization of lead D7AC which threads eight other cores of group C and eight other cores of group A. The logic "1" signal on word data leads 5 and 1 (FIGURE 5) results in the energization of leads D5AC and D1AC each of which threads cores of groups A and C.

It should be observed that the only cores of the Buffer which have circuits prepared therethrough as the result of the signal over the Word Data Lead 111 indicating "Dial Tone" for time slot 1 (line 1) on highway 1, are the cores at the intersection of leads H1, D10AC, D7AC, D5AC, and D1AC, i.e., cores designated 610, 607, 605, and 601.

Referring to FIGURE 23, it can be appreciated that these simultaneous coordinate signals (highway and data) are 30 microseconds in length. Referring to the SYNC pulses (FIGURE 23) it should be observed that SYNC pulses (4.4 microseconds in length) occur during the highway and data pulses during loading of the Buffer Circuit 117 only.

Accordingly, at an appropriate time (which takes into account the delays of the Digital Audio Equipment 114) during the 30-microsecond pulse for highway 1, the Translator Equipment 107 sends a 4.4-microsecond SYNC pulse to amplifier 1102 (FIGURE 11) in the Digital Audio Equipment 114 which (referring to FIGURE 11) is a logic "1" signal to amplifier 1102. As a result thereof, amplifier 1102 gives out a logic "1" signal of 4.4 microseconds duration as an input to AND gate 1105.

The next signal (approximately .6 microsecond in length) from the 2.0 microsecond portion of the delay line 1106 via amplifier 1107 input to gate 1105 (which signal is not longer than 4 microseconds later), causes gate 1105 to conduct and give out the logic "1" signal to flip-flop 1108 causing the "0" part thereof to give out the logic "1" signal to gate 1109. When the delay line 1106 has run up to the end (i.e., to the 4.0-microsecond portion) and repeated to the 0.6-microsecond portion, a logic "1" signal is coupled to amplifier 1111 which gives out a logic "1" signal as the second input to gate 1109.

Gate 1109 gives a logic "1" signal to the "0" portion of flip-flop 1112 which flips 1112, whereupon the "0"

portion gives out a logic "1" to power amplifier 1101.

Power amplifier 1101 gives out a logic "1" signal comprising practically a zero impedance ground to the primary winding 701 of transformer 700 which causes a fast rising current pulse therein, inducing a fast rising current pulse in the secondary 702 and accordingly the interconnected lead H1 to thereby set the ones of the cores which were marked by the word which appeared on the word data leads 111 (cores 601, 605, 607, and 610 in the present example).

When the delay line 1106 reaches the 1.0-microsecond section thereof, the section gives out a logic "1" signal which is coupled via amplifier 1110 to the "1" portion of flip-flop 1108 to reset the flip-flop.

When the delay line reaches the 2.0-microsecond section, this section again gives out a logic "1" which via amplifier 1107 reaches gate 1105. If the SYNC signal still holds an input on gate 1105, gate 1105 incidentally will give out a logic "1" to flip-flop 1108 which will again give out a logic "1" to gate 1109. Absent a second input, gate 1109 does not give an output.

When the delay line reaches the 2.6-microsecond section, this section gives out a logic "1," resetting the flip-flop 1112 which terminates the signal to power amplifier 1101 which in turn terminates the signal through the primary 701 which terminates the 2-microsecond current pulse on highway H1. As will be more fully shown hereinafter, the use of delay line 1106 to time the highway drive signal prevents the setting of Buffer cores from having any influence on the sense amplifiers (FIGURE 13). This will be better appreciated by noting that there is no overlap between the "Buffer Highway Write" and the "Strobe To Sense Amp" (FIGURE 24).

When the delay line runs up to the 4.0-microsecond section and repeats to the 1.0-microsecond portion, the signal therefrom resets flip-flop 1108 (if it has flipped).

In this manner, the cores 601, 605, 607, and 610 in the highway 1 row of group A have been set to prepare for the transmission of dial tone to Telephone Set 100 on line 1 of highway 1.

Referring again to FIGURE 23, it can be seen that with the time slot 1 signal (960 microseconds) persisting on leads 109, the beginning of the next 30-microsecond signal on highway address leads 110 occurs simultaneous with the end of the previous 30-microsecond signal.

As seen by reference to Chart 2 (and FIGURE 23), the second 30-microsecond pulse which indicates highway 2 is placed on highway data leads 110 by the Translator Equipment 107, and such signal consists of logic "1" on highway address lead $2^0$ only. Accordingly, the output from inverting amplifier 305 on bus $\bar{2}^0$ will be logic "0," and the output from inverter 310 on bus $2^0$ will be logic "1." Inspection of the inputs to the various gates 312–427 will reveal that only gate 313 has logic "1" coupled to all of its inputs, and gate 313 accordingly gives out logic "1" which via amplifier 329 enables highway selecting gate 345 (Highway 2). The next set of signals from the Word Data Leads 111 will be routed to the groups A and C of the Buffer since gate 508 (FIGURE 5) alone is conducting of gates 505–508 in the Group Control Circuit because of logic "1" inputs from buses $\bar{2}^3$ and $\bar{2}^4$.

The Translator Equipment 107 removes the word "Dial Tone" from the Word Data Leads 111, and it is assumed that the word for highway 2 in time slot 1 is the thirteenth word "Volume."

Simultaneously with removal of the word "Dial Tone" from the Word Data Leads 111, the Translator Equipment 107 will place the word for "Volume" on these leads in the form of logic "1" signals on leads 8, 6, 4, and 2 (FIGURE 5—also Chart 3) and the input to AND gates 838, 836, 834, and 832 (FIGURE 8) whereby these gates via amplifier 828, 826, 824, and 822 cause gates 818, 816, 814, and 812 to conduct, energizing Buffer conductors D8AC, D6AC, D4AC, and D2AC.

The next SYNC pulse (FIGURE 11) from the Translator Equipment operates the Timing Control Circuit 120 to mark the Highway Drive Lead HD3 in the manner described to thereby provide a 2-microsecond pulse on highway 2 lead H2 via the secondary of transformer 702, setting the ones of the buffer cores which were marked by the word received over Word Data Leads 111 (which are threaded by highway 2 conductor). The second, fourth, sixth, and eighth cores in the highway 2 groups of cores in Buffer Group A were marked in the present example to identify the word "Volume."

The next 30 mcs. signal on Highway Address Leads 110 (i.e., logic "1" on lead $2^1$ only) designates highway 3, and results in conduction of gate 346 of the Highway Selecting Gates 312–427. In the group control circuit (FIGURE 5) only gate 508 is conducting.

The Translator Equipment 107 removes the word "Volume" from Word Data Leads 111, and it is assumed that the word for highway 3 in slot 1 is the forty-sixth word for "4." Translator Equipment 107 places logic "1" on Word Data Leads 9, 8, 4, and 3 to identify such word.

The next SYNC pulse from Translator Equipment 107 enables the Timing Control 120 and the Highway Drive Lead in the manner described to provide a 2-microsecond pulse over the secondary of transformer 702 to Highway 113 to set the third, fourth, eighth, and ninth cores in the Highway 3 set of cores in Buffer group A.

During each of the fourth, fifth, sixth, seventh and eighth transmissions on the Highway Address Lead 110 (eight consecutive 30-microsecond pulses), four cores in each of the sets threaded by leads H4, H5, H6, H7, and H8 are selectively set by data signals on the Word Data Leads 111 to indicate the word for the first word on highways 1–8. With receipt of the ninth 30-microsecond signal over the Highway Address Leads 110, gate 352 in the highway 9 lead H9 conducts. Group Gate 508 (FIGURE 5) will not conduct since logic "1" has been removed from its input $\bar{2}^3$. However with logic "1" on inputs $\bar{2}^3$ and $\bar{2}^4$, group gate 507 conducts, and via amplifier 511, a logic "1" signal is placed on an input of each of the OR gates 891 and 892 (FIGURE 8). OR gate 891 gives out a logic "1" as input to each of the gates 881–885 (Group C). OR gate 892 gives out a logic "1" as input to each of the gates 886–890 (Group D). Accordingly, Buffer groups B and D are prepared for operation rather than groups A and C which were prepared during the first eight pulse transmission.

It is assumed in the present example, that during the ninth 30-microsecond transmission, the signals on the Word Data Leads 111 comprise logic "1" on each of leads 7, 6, 4, and 1 input to gates 887, 886, 884, and 881, whereby such gates give out logic "1" via amplifier 877, 876, 874, and 871 to enable gates 867, 866, 864, and 861 to conduct and energize leads D7BD, D6BD, D4BD, and D1BD which thread cores 617, 616, 614, 611 in group B and corresponding cores in group D.

When the highway drive pulse appears in secondary winding 702 as a result of the operation of timing control 120 by the SYNC pulse from Translator Equipment 107, the cores 617, 616, 614 and 611 respectively threaded by highway lead H9 in group B switch to the logic "1" state. This procedure continues to effect the loading of the remaining Buffer cores for the thirty-two highways.

It should be noted that on the seventeenth 30-microsecond transmission, only gate 506 (FIGURE 5) of the group 505–508 conducts in turn causing OR gates 841 and 842 to conduct to channel the succeeding eight Word Data Signals to Buffer Groups A and C. On the twenty-fifth 30-microsecond transmission, only gate 505 of the Group 505–508 conducts in turn causing OR gates 891 and 892 to conduct to channel the next eight Word Data Signals to Groups B and D.

*Dumping*

As will now be shown, the loaded cores of group A are dumped into associated memory cores in the associated memory planes while cores of group B are being loaded; loaded cores of group B are dumped into associated memory cores while cores of group C are being loaded; loaded cores of group C are dumped while cores of group D are being loaded; and loaded cores of group D are dumped while cores of group A are being loaded.

Figure 2:
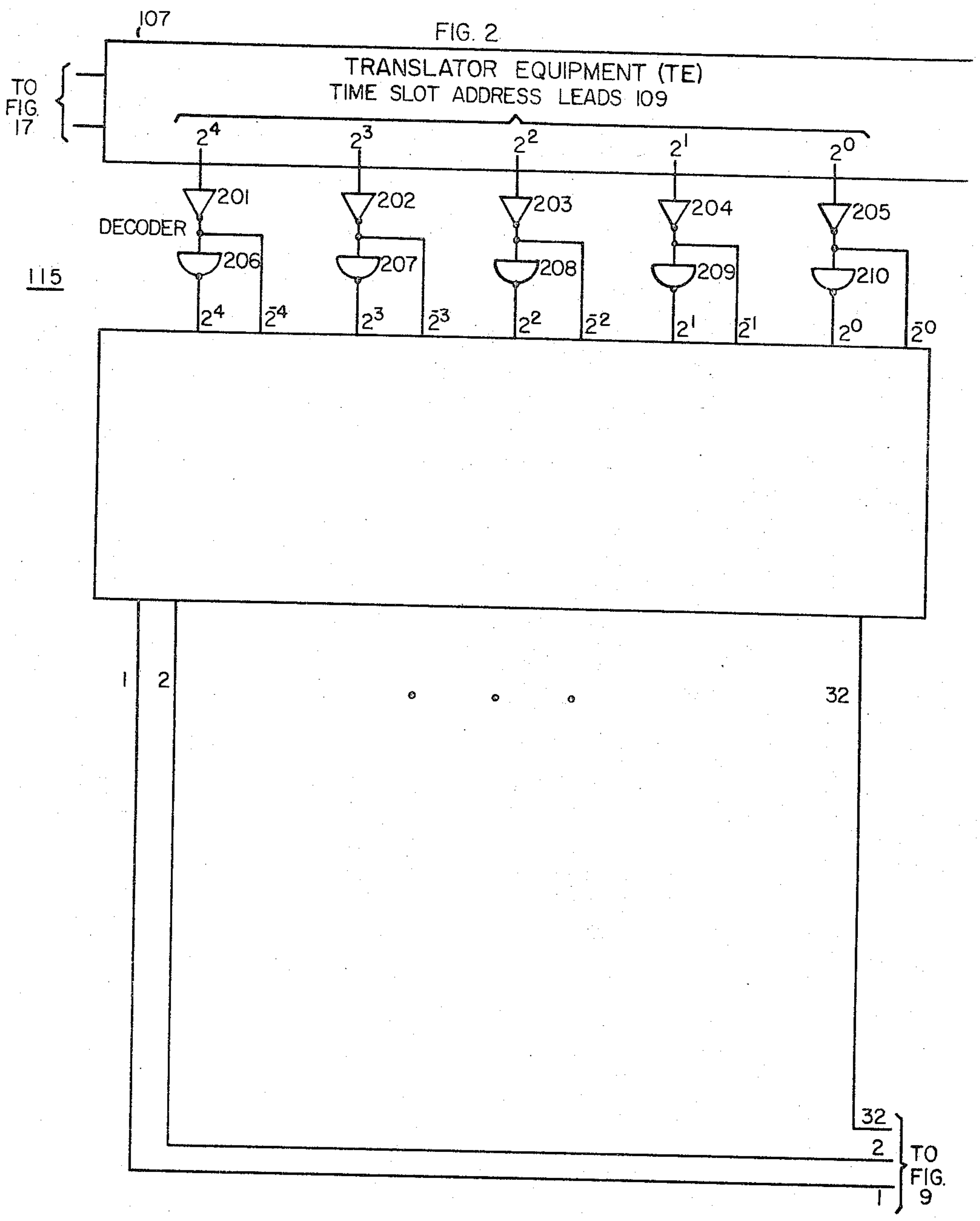
Figure 3:
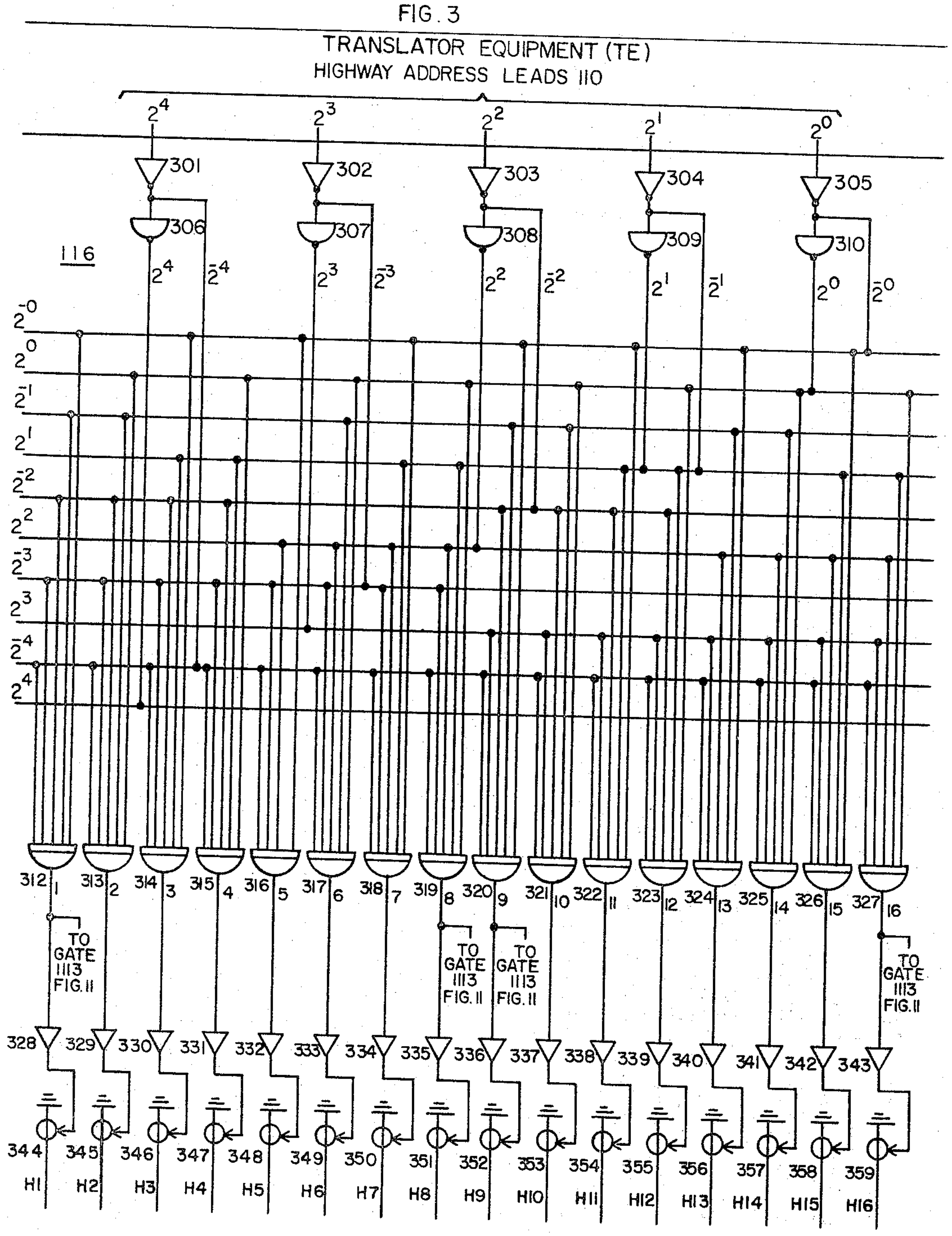
Figure 4:
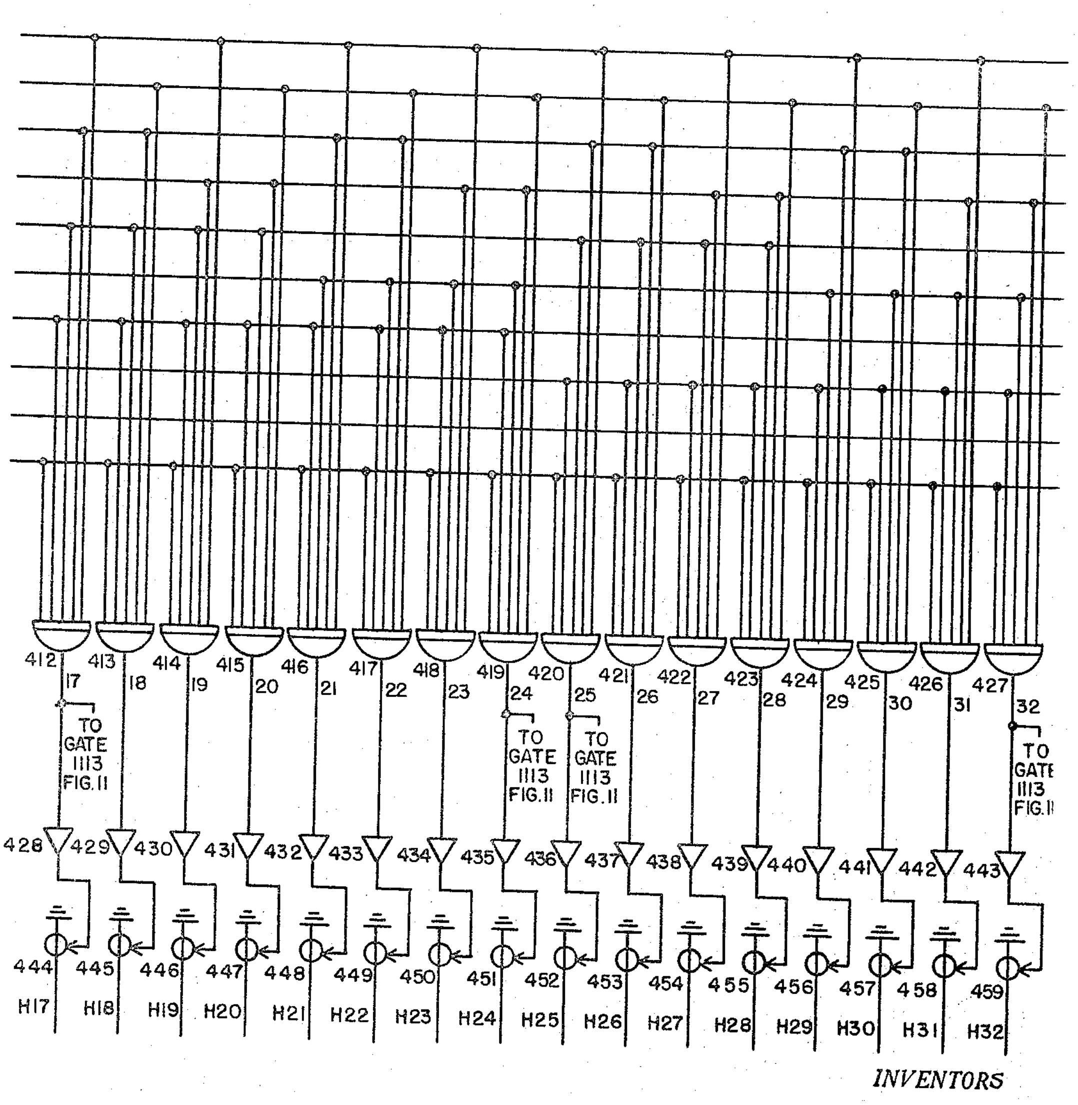
Figure 11:
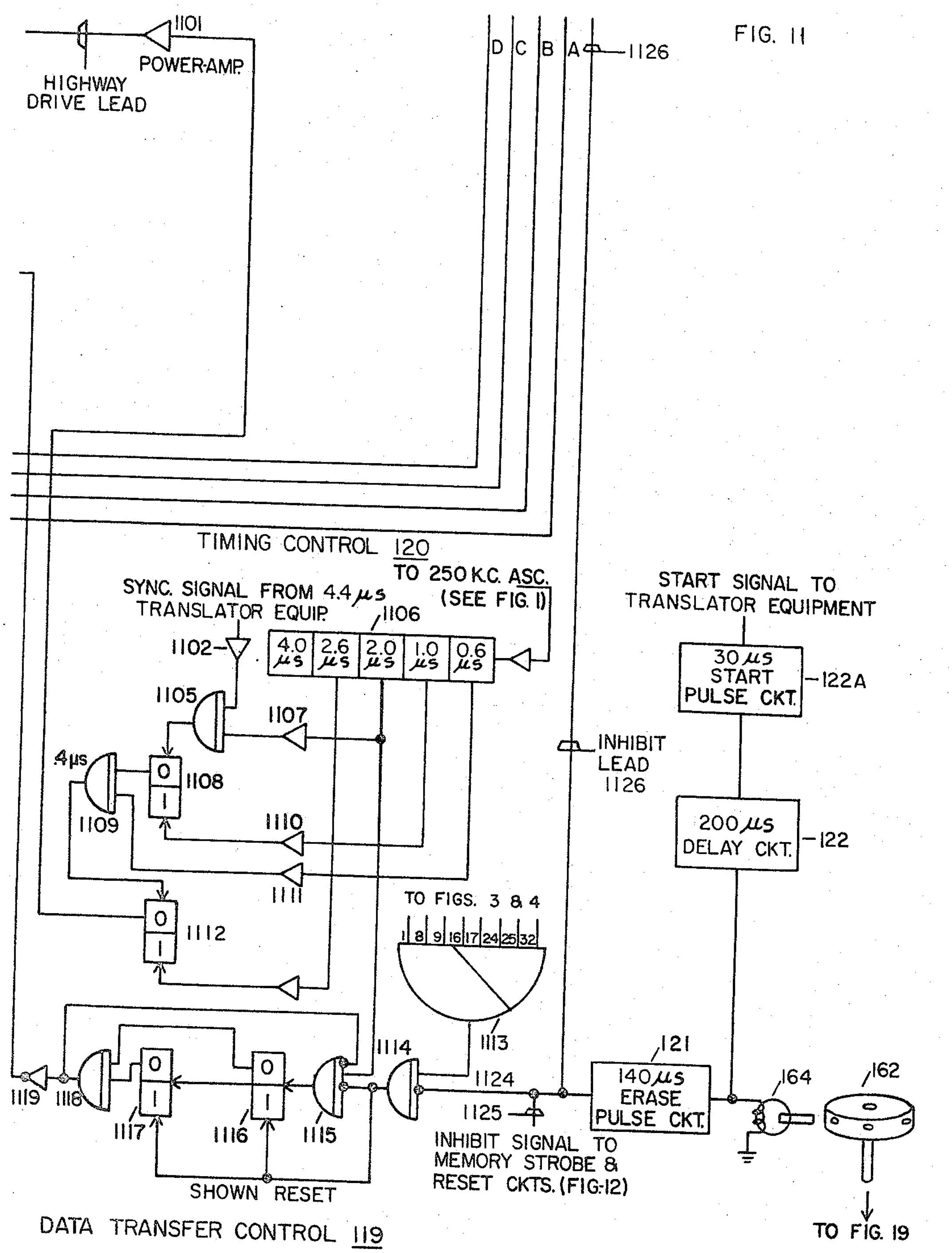

In preparation for such description, it should be observed in FIGURES 3 and 4 that logic "1" outputs from gates 312, 319, 320, 327, 412, 419, 420, and 427 (i.e., the first, eighth, ninth, sixteenth, seventeenth, twenty-fourth, twenty-fifth, and thirty-second gates) of the highway selecting gates are inputs to gate 1113 for the data transfer control circuit (FIGURE 11). It should also be observed that lead 1 from time slot address decoder 115 which extends from FIGURE 2 to FIGURES 9 and 10, connects in multiple to the first of thirty-two gates in each of the three groups of gates associated respectively with Groups A, B, and C, and connects with the last of the thirty-two gates associated with Group D. Lead 2 from decoder 115 extends from FIGURE 2 to FIGURES 9 and 10 and connects in multiple to the second gate of the thirty-two gates in Groups A, B, and C; and connects to the first of the thirty-two gates in Group D. Lead 32 from time slot address decoder 211 extends from FIGURE 2 to FIGURES 9 and 10 and connects in multiple to the last of thirty-two gates in each of the three groups of gates associated with Groups A, B, and C; and connects to the thirty-first gate in Group D as indicated. Leads 3–31 are connected to the thirty-two gates for the different groups in a like manner.

Preliminary to the detailed description, it should also be observed that thirty-two leads 1431, etc., extend from blocking oscillators BO1–BO32 of the Memory Scanner 133 (FIGURE 14) for the memory planes to the inputs for thirty-two gates (FIGURE 9) associated with Buffer Group A, the first gate being identified as 907 and the last as 908. As will be shown, one lead is energized for the period of a time slot, successive ones of the leads being energized during successive time slots of a cycle. In a similar manner, thirty-two leads (not shown) extend from the Memory Scanner for the memory planes to the inputs to thirty-two gates (FIGURE 9) of the Buffer Group B, the first being identified as 909, and the last as 910. In like manner, thirty-two leads extend from the Memory Scanner for the memory planes to the inputs for thirty-two gates associated with Buffer Group C (FIGURE 10), the first gate being identified as 1007, and the last being identified as 1008.

Thirty-two leads from the Memory Scanner for the memory planes extend as inputs to thirty-two gates associated with Buffer Group D (FIGURE 10), the first of which is identified as 1009 and the last of which is identified as 1010.

It should be observed that the inputs to gate 1009, for example, include time slot lead 2 from Decoder 115 and time slot lead D1 from the Memory Scanner. This is necessary because Buffer Group D (FIGURE 7) which contains information to be dumped into time slot 1 cores in the memory is dumped during the loading of Buffer Group A (FIGURE 9) which occurs during the next 960-microsecond time slot interval associated with the Decoder 115 (FIGURE 2).

It should also be observed preliminary to the detailed description that the output of the 1 portion of flip-flop 1216 (FIGURE 12) is connected to the "Strobe" inputs to gate 1224 and also to the "Strobe Inputs" for gates 903, 906, 1003, and 1006 of FIGURES 9 and 10.

Reference is also made to the fact that inverting amplifier 1119 (FIGURE 11) normally gives out a logic "1" signal as an input to gates 903–1006 of FIGURES 9 and 10 which acts as an inhibit to these AND gates.

With reference to the Group Control Circuit (FIGURE 5) it should also be observed that Group Gate 508 (FIGURE 5) associated with Group A, when conducting, gives out a logic "1" via amplifier 512 to the inputs for the thirty-two gates of the group 907–908 (FIGURE 9) to inhibit these gates; gate 507 for Group B (FIGURE 5) when conducting inhibits the thirty-two gates of the group 909–910 for Group B (FIGURE 9); gate 506 for Group C when conducting inhibits the thirty-two gates of the group 1007–1008 for Group C. Lastly, gate 505 for Group D when conducting inhibits the thirty-two gates of the group 1009–1010 for Group D. Stated in another manner, while the cores of Group A are being set, gate 508 inhibits any dumping from the cores of this group.

During the loading of the Buffer described above, when the program advanced to highway lead H9, gate 508 ceased conducting and gate 507 conducted to remove the group inhibit from Group A, and to place an inhibit signal on Group B.

Whenever the programming advances to any one of the highway leads H1, H8, H9, H16, H17, H24, H25, or H32, a logic "1" input to OR gate 1113 (FIGURE 11) in the Data Transfer Control Circuit 119 causes gate 1113 to give out the logic "1" signal to gate 1114 which causes gate 1114 to give out a logic "1" to gate 1115, placing an inhibit on this gate. Accordingly, in the present instance in which the programming was assumed to have advanced to lead H9, gate 1115 was inhibited. Gate 1115 when inhibited prevents the Data Transfer Control Circuit 119 from removing the logic "1" output from amplifier 1119.

When the programming advances to lead H10, however, the logic "1" inputs to OR gate 1113 are removed, and gate 1114 removes the inhibit signal from gate 1115. The same condition holds during the programming over leads H11–H15.

With the inhibit removed from gate 1115 during the programming over leads H10–H15, the first advance of the delay line 1106 thereafter to the 2.0 section results in a .6-microsecond logic "1" pulse therefrom to gate 1115.

Gate 1115 gave out a logic 1 pulse to flip-flop 1116 causing it to be set to the condition in which a logic "1" signal issued from the "0" portion thereof to an input for AND gate 1118, which is without effect at this time.

When, after 4 mcs., the delay line 1106 returned to the same 2.0-microsecond section, a .6 mcs. pulse to AND gate 1115 causes gate 1115 to give out a logic "1" signal to flip-flop 1116 which reverts back to the condition in which logic "0" issued from the "0" portion thereof, thus removing the logic "1" signal from AND gate 1118. As flip-flop 1116 reverts back to the first condition, it causes flip-flop 1117 to be set to the condition in which logic "1" issues from the "0" portion thereof as an input to AND gate 1118.

When, after 4 mcs., the delay line 1106 returns to the same 2.0 mcs. section, a .6 mcs. pulse to AND gate 1115 which gave out a logic "1" signal to flip-flop 1116 again sets it to the condition in which logic "1" issued from the "0" portion as another input to AND gate 1118. With logic "1" on both inputs, AND gate 1118 gave out the logic "1" signal which (1) placed an inhibit on gate 1115, making gate 1115 non-responsive to further cycling of the delay line 1106; and (2) caused amplifier 1119 to give out the logic "0" signal to gates 903, 906, 1003, and 1006, thus removing the inhibit therefrom.

Thus during the tenth highway 30-microsecond signal, the inhibit was removed from gates 903–1006 and was kept removed during the programming of highways H11–H15.

Programming over highway leads H10–H15 takes approximately 6×30 microseconds or 180 microseconds. From the start of the programming of highway lead H10 until gate 1119 removes the inhibit is 8–12 microseconds. Thus the inhibit from gate 1119 to gates 903–1006 is removed at most for 180 microseconds—12 microseconds, or 168 microseconds.

It should be recalled that all four Memory Scanners for Groups A, B, C, and D respectively scan over the thirty-two rows of cores in all highways simultaneously and in synchronized relation. Referring to FIGURES 9 and 10, corresponding leads from memory scanners A, B, C, and D will simultaneously have the logic "1" signal thereon. That is, lead 1 from Memory Scanner A to gate 907, lead 1 from Memory Scanner B to gate 909, lead 1 from Memory Scanner C to gate 1007 and lead 1 from Memory Scanner D to gate 1009 will simultaneously have the logic "1" signal thereon. Thus, when the position of the time slot address Decoder 115 and the position of the Memory Scanners coincide for time slot 1 (i.e., are both on time slot 1), two inputs will exist to each of gates 907, 909, 1007. If at the start of the 168-microsecond interval in which the inhibit is resumed, the Memory Scanners had just passed time slot 1, it may take approximately 32×4 microseconds or 128 microseconds for the inputs to gates 907, 909, 1007, to occur, but this is well within the 168 microseconds. Gate 909 of course is inhibited by gate 507 because the programming in the Buffer is in Group B at this time.

As a result, gates 907 and 1007 give out the logic "1" signal as inputs respectively to AND gates 903 and 1003.

When the next 1.2-microsecond Strobe signal appears (see FIGURE 24) as logic "1" input to gates 903 and 1003, these gates give out the logic "1" signal which via amplifiers 902 and 1002, cause gates 901 and 1001 to conduct. Buffer dump current (represented on FIGURE 24 as "Buffer Dump") flows through the Buffer Dump conductors of the cores in Groups A and C. In the present example, cores have been set in Group A only, and accordingly dumping is effected at this time from Group A only. The dump circuit for Group A can be traced from −6 v. through gate 901, dump lead A through the ten cores 601–610 associated with lead H1, through the ten cores associated with leads H2, H3, H4, H5, H6, H7, and H8, through resistor 621 to +12 v.

When the programming advances to lead H16, the logic "1" input to OR gate 1113 causes this gate to give out logic "1" to gate 1114 which provides logic "1" to gate 1115 as an inhibit thereto. This logic "1" from gate 1114 also resets flip-flops 1116 and 1117, whereby the inputs to gate 1118 are removed. Gate 1118 removes its logic "1" signal from inverting amplifier 1119 and places logic "0" input thereto. Amplifier 119 thereupon gives out logic "1" to gates 903–1006 inhibiting these gates to prevent dumping.

When the programming advances to lead H17, the logic "1" input to OR gate 1113 acts in the same manner to maintain the inhibit on gates 903–1006.

When the programming advances to lead H18, no input exists for OR gate 1113 and the delay line again steps the Data Transfer Control 1119, causing amplifier 1119 to remove the inhibit to gates 903–1006, the Data Transfer Control remaining locked up during programming over leads H18–H23. During this interval, gate 506 inhibits gates 1007–1008 so that dumping cannot take place in Group C. After amplifier 1119 removes its inhibit from gates 903–1006, and the Memory Scanners return to time slot 1, the logic "1" signal is again the input to gates 907, 909, 1007, and 1009 resulting in logic "1" outputs from gates 907 and 909 to gates 903 and 906. When thereafter the Strobe pulse occurs, gates 903 and 906 are enabled and via amplifiers 902 and 905 cause gates 901 and 904 to conduct, causing dump current to flow in the dump conductors A and B to thereby dump the cores in Group B.

When the programming advances to lead H24, the logic "1" input to OR gate 1113 causes this gate to give out logic "1" to gate 1114 which gives out logic "1" to gate 1115 as an inhibit thereto. Logic "1" from gate 1114 resets flip-flops 1116 and 1117, whereby the inputs to gate 1118 are removed. Gate 1118 removes its logic "1" signal from inverting amplifier 119 and places logic "0" input thereto. Amplifier 1119 thereupon gave out logic "1" to gates 903–1006, inhibiting these gates to prevent dumping.

When the programming advances to lead H25, the logic "1" input to OR gate 1113 acts in the same way to keep the inhibit on gates 903–1006.

When the programming advances to lead H26, no input exists to OR gate 1113 and the delay line again steps the Data Transfer Control 119, causing amplifier 1119 to remove the inhibit to gates 903–1006, the Data Transfer control remaining locked up during programming over leads H26–H31. During this interval gate 505 inhibits gates 1009–1010 so that dumping cannot take place in Group D. After amplifier 1119 removes its inhibit from gates 903–1006, and the memory scanners return to time slot 1, the logic "1" signal is again coupled to the input to gates 907, 909, 1007 and 1009 resulting in logic "1" outputs from gates 907, 909, and 1007 to gates 903, 906, and 1003. When thereafter the Strobe pulse occurs, gates 903, 906, and 1003 via amplifiers 902, 905, and 1002 causes gates 901, 904, and 1001 to conduct, causing dump current to flow in the dump conductors A, B, and C, and dumping the cores in group C.

When the programming advances to lead H32, the logic "1" input to OR gate 1113 causes this gate to give out the logic "1" signal, resulting in gates 903, 1006 again being inhibited to prevent dumping.

It should be recalled that at the termination of the thirty-second transmission on the highway address leads 110, Translator Equipment 107 again places the logic "0" signal on all leads 110 to indicate highway 1 again. At the same time, the Translator Equipment 107 placed the logic "1" signal on lead $2^0$ of the time slot address leads 109 indicating time slot 2. Again the Translator Equipment 107 programs the signals on leads 110 to advance the Buffer storage over leads H1–H32 but this time with the logic "1" signal on lead 2 from Decoder 211 (to indicate the second time slot) as input to the second gate (FIGURES 9 and 10 indicated but not shown) of each of the groups 907–908, 909–910, 1007–1008, and to the first gate of the group 1009–1010. With the programming on lead H1 again, the logic "1" input to gate 1113 results in gates 903–1006 being inhibited to prevent dumping.

When the programming advances over leads H2–H7, no logic "1" input to gate 1113 exists. Gate 1113 gives out logic "0" to gate 1114 which gives out logic "0" to gate 1115, whereby the inhibit is removed therefrom, allowing the delay line to step the Data Transfer Control to cause amplifier 1119 to remove the inhibit on gates 903–1006. Gate 508 during such period will conduct to inhibit gates of the group 907–908.

It should be observed that whereas lead 2 from Decoder 115 is connected to the second gate of the gates 907–908, 909–910, 1007–1008 for Groups A–C; lead 2 is connected to the first gate 1009 of the gates 1009–1010 for Group D.

Accordingly, with logic "1" on lead 2 from decoder 115, designating time slot 2, the next occurrence of the 4-microsecond logic "1" signal on time slot 1 lead from the Memory Scanner D results in gate 1009 conducting and giving out the logic "1" signal to gate 1006. When the 1.2-microsecond strobe pulse occurs during this 4-microsecond signal, gate 1006 conducts, giving out logic "1" which via amplifier 1004 causes gate 1004 to conduct, causing Group D to dump.

Stated in another manner, Group D cores dump into core for time slot 1 in the memory while the 960-microsecond time slot signal from Decoder 115 obtains in that Group D dumps during the loading of Group A for time slot 2. This procedure continues as the Buffer is loaded thirty-two times and dumped into the memory plane cores.

After all 1024 rows of cores in the memory have been loaded and dumped in this manner, the Translator Equipment 107 terminates transmission of the SYNC signals and setting of Buffer cores ceases, although the Translator Equipment 107 continues programming the leads 109, 110, and 111. Input signals to gate 1113 occur and the dump program continues but there is nothing to dump. As Buffer cores are dumped, pulses are generated in the sense leads threading the cores. Core 601 (FIGURE 6) has been illustrated with a sense lead threading the core, and it is to be understood that the other Buffer Cores have sense leads, although they are not shown in FIGURES 6 and 7.

*Loading the memory plane cores*

Referring now to FIGURE 13, the top row of cores 601–610 shown therein are the same cores 601–610 shown in FIGURE 6, and are illustrated to clarify the relation of the components.

It should be recalled that this row of cores was loaded in the present example to represent "Dial Tone" for line 1 on highway 1 by setting cores 601, 605, 607, and 610. Accordingly during the dumping process described above (which occurred during time slots H10–H15 of the programming of Group B for time slot 1) these cores dump into the first, fifth, seventh and tenth cores of the row of cores just below (i.e., into the row for time slot 1 in memory plane 1, which is the memory plane for highway 1).

More specifically, when core 601 dumps, a 250-mv., 10-ma., fast rising pulse flows in the sense conductor over a path which may be traced from the Buffer core 601 to the left and down, through winding 1351, back through all the memory cores in column 1 to Buffer core 601. As indicated, this current flow in winding 1351 may be considered as a logic "1" input signal to AND gate 1301. At this point, the operation of circuitry found in FIGURES 12 and 14 is considered briefly.

At the upper left of FIGURE 12, an input circuit from the 250-kc. clock 123 shown in FIGURE 1 couples pulses over amplifier 1201 to delay line 1202. Pulses from the clock occur at the 250-kc. rate (i.e., every four microseconds, the width of the pulses being approximately .6 microsecond). The length of the delay line 1202 is such that a pulse enters the delay line at the left and travels through the delay line in 4 microseconds, whereupon the next pulse from the clock enters the delay line. The delay line has taps every .1 microsecond for outputs therefrom.

Every time the pulse traveling through the delay line reaches the 1.4-microsecond point, an output pulse therefrom passes via amplifier 1203 to the flip-flop 1404 in the upper part of FIGURE 14 as shown. The 250-kc. clock 123 also drives a frequency divider 126 (FIGURE 14) which gives out a pulse triggered by the leading edge of every thirty-second one of the 250-kc. pulses. The width of this pulse is such as to overlap the first part of the very next pulse of the 250-kc. series.

The single Frequency Divider Circuit 126 has one output 140' extended to the line switch scanner (FIGURE 15) and other separate outlets to each of the four memory group scanners, including that of Group A shown in FIGURE 14. This keeps all of the memory group scanners in step by beginning each rotation over thirty-two steps at the same time.

For the purpose of explanation, it is assumed that the power has just been turned on, and that the scanner is not yet running.

As shown in the timing diagram of FIGURE 25, both the 250-kc. pulse and the sync pulse are present at time T0. The illustrated 250-kc. pulse is identified as the 250-kc. pulse 0 and the illustrated SYNC pulse is identified as SYNC pulse 1. The 250-kc. is applied to flip-flop 1404 and the 7.8125 kc. is applied via amplifier 1401 to gate 1402. In that none of the blocking oscillators are running, as yet, logic "0" is applied to the inhibit input of gate 1402. The resulting logic "1" output of gate 1402 is applied to the reset side of flip-flop 1404 and to the gate 1403. Flip-flop 1404 is so designed that with the presence of both inputs, the reset signal from gate 1402 controls, and the flip-flop is reset so that side 1 gives out logic "0" to gate 1405, and side 0 gives out logic "1" to gate 1406, which conducts and places a logic "1" inhibit on gates 1403 and 1411. Nothing more happens for the duration of the SYNC pulse.

At time T1, the next 250-kc. pulse which we shall call pulse 1 sets the flip-flop so that side 1 gives out logic "1" and side 0 gives out logic "0." With side 1 of flip-flop 1404 giving out logic "1," gate 1405 is caused to conduct. Also, with side 0 of 1404 giving out logic "0," gate 1406 is caused to be non-conductive.

With gate 1405 conducting, —6 v. extends through gate 1405 as a logic "1" input to AND gate 1451. Also, with gate 1406 non-conducting, the circuit through gate 1401 presents a logic "0" input to AND gate 1411 and gate 1403, thus removing the inhibit on these gates.

It should be observed that the 7.8125-kc. SYNC pulse persists beyond the leading edge of the second 250-kc. pulse so that this SYNC pulse is still present as input to gate 1403 when the inhibit is removed therefrom, so that the trailing edge of this 7.8125-kc. SYNC pulse constitutes a trailing trigger which constitutes the second input to gate 1451 which consequently gives out logic "1" to trigger blocking oscillator BO1 (1431). Blocking oscillator BO1 immediately is triggered and blocks even when the SYNC pulse disappears giving out logic "1" to AND gate 1411, logic "1" to gate 1402 and inhibit thereto, and logic "1" to the lead 1 input to gate 907 (FIGURE 9) referred to hereinbefore in the description of Group A.

As gate 1406 removes the inhibit for gate 1411, logic "1" is coupled to gate 1331 (FIGURE 13) causing this gate to conduct. With gate 1331 conducting, ground is connected to conductor 1 threading the row of cores which represent time slot 1 (i.e., line 1) on highway 1. The memory plane 1301 which represents highway 1 has thirty-two horizontal lines representing thirty-two subscriber lines on highway 1.

The time of connection of ground to conductor 1 is shown in FIGURE 25 as approximately the initial operating point of BO1 at time T1. In FIGURE 24, this time would be represented by the beginning of the time slot (general) as 2 microseconds. Gate 1331 remains closed until time T2. At time T2, the next 250-kc. pulse resets flip-flop 1404 so that side 1 gives out logic "0," and side 0 gives out logic "1."

Logic "1" from side 0 inhibits gate 1411 which gives out logic "1," causing gate 1331 to cease conducting, whereby ground is removed from conductor 1 of memory plane 133. Logic "1" from side 0 also extends as an input to AND gate 1452. This corresponds to time T2 (FIGURE 25) and to the end of the time slot (general) shown as the next 2-microsecond point in FIGURE 24. Logic "0" from side 1 removes the inhibit from gate 1412.

The period of blocking oscillation is somewhat longer than 4 microseconds so that when Blocking Oscillator unblocks, it sends a trailing edge pulse as the second input to gate 1452 causing this gate to conduct, giving out a logic "1" pulse which triggers blocking oscillator BO2. Blocking Oscillator BO2 conducts and blocks even when the trailing edge trigger from BO1 ceases, and gate 1452 becomes non-conduct.

Blocking Oscillator BO2 places a logic "1" as an input to gate 1412 which gives out logic "1" to gate 1332 which conducts applying ground to conductor 2 (FIGURE 13) of memory plane 133, which signal corresponds to the leading edge of the BO2 pulse (FIGURE 25). Blocking Oscillator BO2 also reestablishes the inhibit to gate 1402 before Blocking Oscillator BO1 removes its inhibit, and extends logic "1" over conductor 2 to gate 907[1] (FIGURE 9) to permit loading of Group A during the period.

The next 250-kc. pulse sets flip-flop 1404, so that side 1 gives out logic "1" and side 0 gives out logic "0." With logic "1" from side 1 of gate 1401, gate 1405 conducts placing a logic "1" input to gate 1453. Gate 1412 ceases conduction in turn causing gate 1332 to cease conducting ending time slot 2 on conductor 2. Logic "0" from side 0 of 1401 removes the inhibit from gate 1413.

Shortly thereafter blocking oscillator BO2 unblocks. The trailing edge trigger therefrom constitutes the second input to gate 1453 which conducts, triggering blocking oscillator BO3.

The scanner continues to step through the remaining time slots in the sequence as described above. This results in the action listed as follows:

CHART 4

| Time | 250 kc. | Sync | Gate 1406 | Gate 1405 | Blocking Osc. Triggered | Memory-Gate Con ducting |
|---|---|---|---|---|---|---|
| T0 | | 1 | Conduct | Non-Conduct | | |
| T1 | 1 | | Non-Conduct | Conduct | BO1 | 1331 |
| T2 | 2 | | Conduct | Non-Conduct | BO2 | 1332 |
| T3 | 3 | | Non-Conduct | Conduct | BO3 | 1333 |
| . | | | | | | |
| . | | | | | | |
| . | | | | | | |
| T31 | 31 | | Non-Conduct | Conduct | BO31 | 1345 |
| T32 | 32 | 2 | Conduct | Non-Conduct | BO32 | 1346 |
| T1 | 1 | | Non-Conduct | Conduct | BO1 | 1331 |

During the thirty-second pulse of the 250-kc. pulses, the second 7.8125-sync pulse appears. As a result of the thirty-second of the 250-kc. pulses, gate 1406 will be found conducting and gate 1405 non-conducting. Gate 1406 inhibits gate 1403 and prepares gate 1466. When Blocking Oscillator BO31 unblocks, it triggers Blocking Oscillator 32 through gate 1466 and removes the last inhibit from gate 1402. Gate 1402 immediately conducts, holding flip-flop in its present state.

The next 250-kc. pulse, which is again designated pulse 1, causes flip-flop 1404 to be set so that portion 1 gives out logic "1" and portion 0 gives out logic "0." With side of gate 1404 giving out logic "1," gate 1405 conducts, and with side 0 of 1404 giving out logic "0," gate 1406 is nonconductive.

With gate 1405 conducting, —6 volt extends through gate 1405 as a logic "1" input to AND gate 1451, and with gate 1406 non-conducting, the circuit through this gate presents a logic "0" input to AND gate 1411 and gate 1403, thus removing the inhibit on these gates.

It should be recalled that the 7.8125-kc. SYNC pulse persists beyond the leading edge of the second 250-kc. pulse so that this SYNC pulse is still present as input to gate 1403 when the inhibit is removed therefrom so that the trailing edge of this sync pulse constitutes a trailing trigger which constitutes the second input to gate 1451 which consequently gives out logic "1" to trigger blocking oscillator BO1.

In this fashion the memory scanner of FIGURE 14 keeps rotating over the thirty-two time slot (line) leads of the Memory Scanner for Group A. The Memory Scanners of Groups B, C, and D as well as the line scanner of FIGURE 15 function in similar fashion. All of these scanners run in synchronism being all kept in synchronism by the 7.8125-kc. SYNC signals so that they all energize time slot 1 lead; then time slot 2 lead, etc.

At the end of a scanning cycle all scanners are dependent upon the next sync pulse to start over again.

Referring again to FIGURE 24, the interval designated Time Slot (General) between two successive points on the time scale designated 2 microseconds starts when gate 1331 (FIGURE 13) for line 1 in highways 1–8 begins conducting; and ends when gate 1331 ceases conducting. The difference between the 1.4-microsecond point when gate 1331 begins conducting is accounted for by the delays in the circuitry occasioned by amplifier 1203, flip-flop 1404, etc.

It should be recalled that, during this interval, blocking oscillator BO1 gave out logic "1" as an input to gate 907 (FIGURE 9) as one condition for dumping any cores of the row 601–610 which were found in the logic "1" state. It should also be recalled that the Strobe input to gate 903 (FIGURE 9) effected the actual dumping.

Referring again to FIGURE 12, it can be seen that when the pulse traveling through the delay line reaches the 2.8-microsecond tap, a logic "1" therefrom through amplifier 1208 sets flip-flop 1216 so that the segment 1 thereof gives out logic "1." As indicated by the multiple sign on the output lead therefrom, this logic "1" extends to the Strobe lead to gate 903 (FIGURE 9) as an input thereto. Referring to FIGURE 24 this begins the Buffer Dump pulse at 2.8 microseconds shown therein, during the time slot interval when BO1 is sending its signal to gate 907.

This same logic "1" from segment 1 of gate 1216 extends as an input to gate 1224. As the 128 microsecond inhibit does not extend to gate 1224 at this time, gate 1224 gives out the logic "1" signal as a Strobe input to gates 1301–1310. This is also indicated as occurring at 2.8 microseconds (FIGURE 24) and is indicated as the beginning of the pulse designated Strobe (To Sense Amp).

It should be recalled also that Dial Tone is determined by cores 601, 605, 607, and 610 (see FIGURES 6 and 13) which are found in the logic "1" state when the Strobe pulse occurs. When the Strobe pulse occurs, causing dump current to flow in the Dump Lead A of FIGURES 6 and 9 as described hereinbefore, the 250-microsecond-volt 10-ma. fast rising pulse is induced in each of the sense leads associated with these cores. Accordingly, this pulse will be found in windings 1351, 1355, 1357 and 1360, constituting inputs to AND gates 1301, 1305, 1307, and 1310. It should be observed that the low value of current (10 ma.) through the single threading of each of the cores of columns 1, 5, 7 and 10 of the memory plane in FIGURE 13 produces such a small amount of flux as to be considered negligible and as not affecting these cores.

The Strobe pulse on conductor 1226 provides the second input to each of the gates 1301, 1305, 1307, and 1310, which give out the logic "1" signal via amplifiers 1311, 1315, 1317, and 1320 to cause switching circuits 1321, 1325, 1327, and 1330 to switch. This switching occurs at the beginning of the Sense Amp (from memory pulse in FIGURE 24 at 3.4 microseconds). The difference between the 2.8 start of the Dump and Strobe, and this 3.4 microseconds is occasioned by inherent delay in the circuitry.

At this time the nature of switching circuits 1321–1330 is considered briefly. Each of the switching circuits, such as 1322, for example, when reset normally gives out —2 volts from the + side thereof and +8 volts from the — side thereof. When the circuit switches, the circuit gives out +6 volts from the + side thereof and 0 volts from the — side thereof.

Accordingly, with gates 1321, 1325, 1327, and 1330 switched the — sides thereof have changed from —8 volts to 0 volts, whereby bit write current is caused to flow through leads 1321A, 1325A, 1327A, and 1330A to columns 1, 5, 7, and 10 of the memory and thence to 8 volts potential shown at the top of FIGURE 13 (see also FIGURES 21 and 22), starting the bit write pulse at 3.5 microseconds as shown in FIGURE 24. Also with switching circuits 1321, 1325, 1327, and 1330 conducting, positive and negative potentials therefrom extend downward to the decoding equipment 136 of FIGURE 16.

Gates 1601–1616 (FIGURE 16) each require the left input thereof to be at +6 volts, and the right input to be at 0 volts to conduct. With switching circuit 1321 switched, 0 volts extends from the right side thereof to the right input of gate 1607. With switching circuit 1325 switched, +6 volts extends from the left side thereof to the left side of gate 1607, and gate 1607 conducts to give out +6 volts. It should be noted that gates 1601–1608 give out 0 volts when nonconducting and +6 volts when conducting; and gates 1609–1616 give out +6 volts when non-conducting and 0 volts when conducting.

With switching circuit 1330 switched, 0 volts extends from the right side thereof to the right input of gate 1616. With switching circuit 1327 switched, +6 volts extends from the left side thereof to the left side of gate 1616. Accordingly, gate 1616 will be found giving out 0 volts.

With reference to gates 1–64 of FIGURE 16, the first gate is designated 1633, the sixty-third gate is designated 1634, and the sixty-fourth is designated 1635. Gates 1–64 conduct when the upper left input thereto is connected through an amplifier to 0 volts, and the lower right input thereto is connected through an amplifier to +6 volts; and do not conduct when the upper left input is connected through an amplifier to 6 volts, and the lower right input is connected through an amplifier to 0 volts.

With gate 1607 giving out +6 volts and gate 1616 giving out 0 volts, the inputs to gate 1634 (the sixty-third gate) have the requisite conditions for conduction thereon and gate 1634 gives out the logic "1" signal to the sixty-third gate 149 (FIGURE 19), causing this gate to conduct, and connecting the Dial Tone Source 167 to highway 1.

When the pulse traveling through the delay line 1202 of FIGURE 12 reaches the end of the delay line at the 4.0 microseconds tap, logic "1" therefrom via amplifier 1209 resets flip-flop 1216 so that the 1 portion gives out logic "0" ending the Strobe pulse to the gates of FIGURES 9 and 13, (the timing is shown in FIGURE 24). When the next clock pulse from clock 123 enters the delay line 1202 (FIGURE 12) and reaches the 0.3 microsecond tap, logic "1" output is applied via amplifier 1204 to the "1" segment of flip-flop 1214 to cause this flip-flop to give out logic "1" to amplifier 1218 which creates a pulse in the upper portion of the left-winding of transformer 1220 to —12 volts at the center tap, inducing a write (memory core) pulse in the secondary, the leading edge of which occurs at 4.3 microseconds (FIGURE 24). At such time, a conduction path can be traced from ground through gate 1331 (FIGURE 13) through cores in the topmost row of memory cores in FIGURE 13, conductor 1225, and through the secondary (FIGURE 12) to ground.

From FIGURE 24 it can be seen that this write pulse occurs during the bit-write pulse. By reference to FIGURE 22 it can be seen that write current and bit write current are in the same direction and accordingly cores 601, 605, 607, and 610 which have the bit write current are set to the logic "1" state.

Referring to FIGURE 12, when the pulse traveling through the delay line reaches the 1.6-microsecond tap, logic "1" therefrom via amplifier 1205 resets flip-flop 1214 so that the 1 portion of flip-flop 1214 gives out logic "0" to amplifier 1218 which terminates the write pulse in the transformer 1220.

When the pulse traveling through the delay line 1202 reaches the 1.8-microsecond tap, logic "1" therefrom via gate 1210 to flip-flop 1217 causes flip-flop 1217 to give out logic "1" to the reset lead 1227, resetting switching circuits 1321, 1325, 1327, and 1330, and disconnecting bit write current. As a result, gates 1607 and 1616 (and in turn 1634 and highway 1 gate 149) are switched back to normal to disconnect the Dial Tone Source from highway 1.

When the pulse traveling through the delay line 1202 reaches the 2.4-microsecond tap of the next time slot, logic "1" therefrom via amplifier 1211 resets flip-flop 1217 terminating the reset pulse.

It should be recalled that all the cores in Group A of the Buffer are dumped simultaneously. It should be appreciated that during the same four microsecond time slot just described, the second, fourth, sixth, and eighth cores in the highway 2 set of cores in Buffer Group A are dumped into the second, fourth, sixth, and eighth cores in the uppermost row of memory cores in the highway 2 memory plane. The circuitry operates in the manner described to connect the pick-up head for the word "Volume" to highway 2, (i.e., the message to be transmitted to line 1 on highway 2). However, the drum is between words and no message reaches the highway yet.

Also during this same four microsecond time slot just described, the third, fourth, eighth, and ninth cores in the highway 3 set of cores in Buffer Group A are dumped into the third, fourth, eighth, and ninth cores in the uppermost row of memory cores in the highway 3 memory plane, and the circuitry operates in the manner described to connect the pick-up head for the word "4" to highway 3 (the word to be coupled to line 1 on highway 3).

The memory plane for each of the other highways 4—8 during this same four microsecond time slot are operative in a like manner.

Buffer Group B is dumped into the row 1 memory cores in a similar manner in a corresponding four microsecond interval during the loading of Group C. Buffer Group C is dumped into row 1 memory cores in a corresponding four microsecond interval during the loading of Group D. Buffer Group D is dumped in a similar manner into row 1 memory cores during a four microsecond interval which occurs during the loading of Group A.

Buffer Group A is dumped into row 2 memory cores during a four microsecond interval during the loading of Group B, the beginning of this four microsecond interval being defined by the closure of gate 1332.

This procedure continues until the memory is completely loaded for the next word.

Referring to FIGURE 13, after selected cores of a row have been set (cores 1361, 1365, 1367, 1370 of the uppermost row of memory cores in the memory plane 1, for example), a given operation occurs during every four microsecond closure of the associated gate, such as 1331, by the memory scanner in its cycling. The operation is terminated only when erase occurs. Such operation is now set forth.

Referring to FIGURE 24, as the delay line 1202 pulse reaches tap 2.4, logic "1" therefrom via amplifier 1212 input to the 1 portion of flip-flop 1903 causes this flip-flop to give out logic "1" which via amplifier 1904 causes gate 156 to conduct, grounding the highway to drain off any remaining charge for the purpose of guarding against crosstalk.

As the delay line pulse reaches tap 2.8, logic "1" therefrom via amplifier 1208 sets flip-flop 1216 activating both Strobes aforedescribed. The Strobe to the Buffer means nothing unless Dump is in process. The Strobe on lead 1226 prepares the sense amplifier gates, such as 1301, 1305, 1307, and 1310, for example.

As the delay line pulse reaches tap 2.9, logic "1" therefrom via amplifier 1206 sets flip-flop 1215 which gives a logic "1" signal from the "1" segment thereof which activates amplifier 1219 to create a read pulse of opposite polarity to write pulse via conductor 1225 through cores 1361, 1365, 1367, and 1370. Referring to FIGURE 22, as these cores were set to the logic "1" position magnetically, the read pulse moved the cores magnetically to the left and down, and farther to the left on the hysteresis loop, creating a second input to each of gates 1301, 1305, 1307, and 1310. These gates, via amplifiers 1311, 1315, 1317, and 1320, set the switching circuits 1321, 1325, 1327, and 1330, to effect connection of the Dial Tone Source to highway 1 as described hereinbefore.

The setting of the switching circuits 1321, 1325, 1327, and 1330 sends bit write current through conductors 1321A, 1325A, 1327A, and 1330A as described before. As shown in FIGURE 22, with read and bit write current of opposite polarity nothing happens.

When the pulse on delay line 1220 reaches tap 3.9, logic "1" therefrom via amplifier 1207 resets flip-flop 1215 removing read current. Cores 1361, 1365, 1367, and 1370 magnetically move to the right to the logic "0" state.

After the pulse on delay line 1220 reaches tap 4.0, and the new pulse starts through the delay line and reaches the 0.3 tap, logic "1" therefrom via amplifier 1204 sets write flip-flop 1214 which via amplifier 1218 establishes write current. With both bit write and bit write currents present, cores 1361, 1365, 1367, and 1370 move to the right and up the curve (see FIGURE 22).

When the delay line pulse reaches tap 1.6, logic "1" therefrom via amplifier 1205 resets write flip-flop 1214 removing write current. Thereupon cores 1361, 1365, 1367 and 1370 move to the left to the logic "1" position.

When the delay line pulse reaches tap 1.8, logic "1" therefrom via amplifier 1210 sets flip-flop 1217 which resets switching circuits 1321, 1325, 1327, and 1330. Such action occurs approximately at the end of the time slot 1 to effect the disconnection of the Dial Tone Source from highway 1. As noted above, such action occurs during each time slot "one" until such time as an erase pulse is received for such message.

*Line gate scanning*

Figure 15:
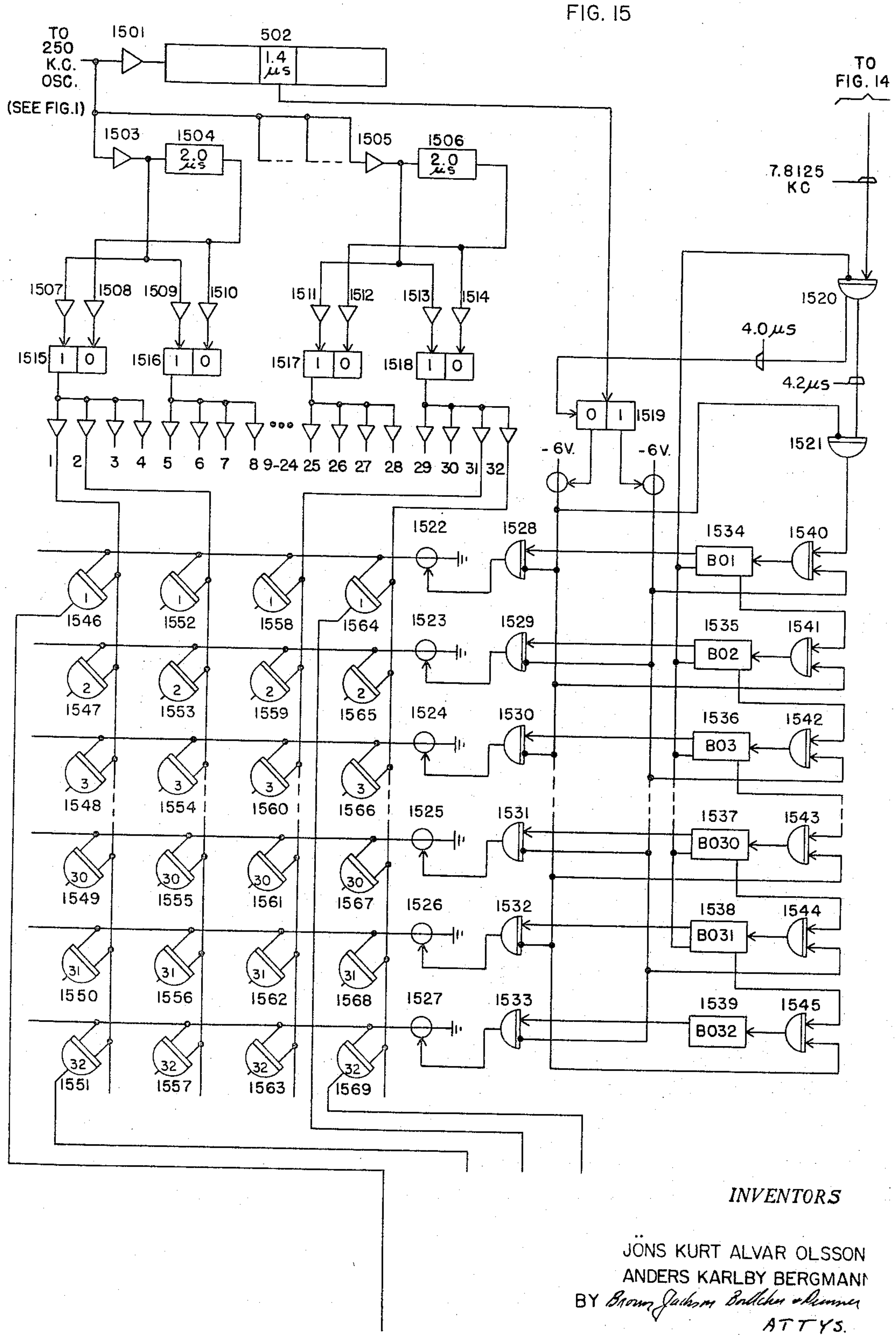

Referring now to FIGURES 15 and 24 and recalling that the same 250-kc. oscillator 123 drives the delay lines 1502, 1504, 1506, etc., of FIGURE 15 in synchronism with delay line, such as 1202 in each memory scanner, it will be seen that the scanning of line gates, such as 141 (FIGURE 18) causes these line gates to conduct during the two microsecond interval designated Two Microsecond Master (Line) or Time Pulse (Data Thru Highway) illustrated in FIGURE 24 during the same four microsecond period that the word source gate, such as 149 (FIGURE 19) is conducting as represented approximately by the interval Sense Amp (FIGURE 24).

More specifically, referring in the upper part of FIGURE 15, pulses from the 250-kc. oscillator circuit of FIGURE 1 via amplifier 1501 enter delay line 1502; via amplifier 1503 enter delay line 1504 (which is the first of four delay lines); and via amplifier 1505 enter delay line 1506, which is the last of four delay lines. It takes four microseconds for a pulse to travel through delay line 1502; two microseconds for a pulse to travel through delay line 1504; and two microseconds for a pulse to travel through delay line 1506.

Every time a pulse traveling through delay line 1502 reaches point 1.4 microseconds tap as indicated, the logic "1" signal is extended via amplifier 1570 to flip-flop 1519 of the line gate scanner shown in the right of FIGURE 15 in a similar manner in which the logic "1" signal from the 1.4-microsecond tap of delay line 1202 (FIGURE 12) via amplifier 1203 extends to flip-flop 1404 (FIGURE 14) of the memory scanner for Group A as described hereinbefore. Also referring to the top of FIGURE 14, it can be seen that a connection 1401 from the Frequency Divider 126 (FIGURE 14 to FIGURE 15) extends via amplifier 1571 as a 7.8125-kc. input to gate 1520 (FIGURE 15) of the line scanner in a similar manner that the 7.8125-kc. signal from Frequency Divider 126 extends via amplifier 1401 to corresponding gate 1402 of the memory scanner for Group A.

As the line scanner of FIGURE 15 functions in the same manner as the memory scanner of FIGURE 14, the description of the operation thereof is not repeated in detail. It is noted, however, that gate 1522 (FIGURE 15) which represents time slot 1 (line 1) on all highways will be conducting at the same time that gate 1331 (FIGURE 13) which represents time slot 1 (line 1) on highways 1–8, (and similar gates of the other memory scanners each of which represent time slot 1 (line 1) on eight highways) are conducting. Gate 1529 will also be conducting at the same time that corresponding gate 1322 (and similar gates) are conducting, etc.

It should be observed that the interval during which gate 1522 is conducting is represented in FIGURE 24 as Time Slot (General), which extends between one 2.0-microsecond point and the next 2.0-microsecond point. Gates 1523, etc., are operative correspondingly during other four microsecond intervals.

After line gates 1522 begins conducting at the 2.0-microsecond point shown in FIGURE 24, two more microseconds elapse while the pulse travels through delay line 1502 to the 4.0-microsecond tap at the end of delay line 1502. Thereupon the next 250-kc. pulse via amplifier 1503 enters the 2-microsecond delay line 1504, and via amplifiers 1507 and 1509 sets flip-flops 1515 and 1516 so that the segments 1 thereof give out the logic "1" signal to associated amplifiers 1–8, as shown, which in turn give out +6 volts. In a similar manner, this same 250-kc. pulse via amplifier 1505 enters the 2 microsecond delay line 1506, and via amplifiers 1511 and 1513 sets flip-flops 1517 and 1518 so that the segments 1 thereof give out the logic "1" signal to associated amplifiers 25–32 as shown, which in turn give out +6 volts. In a similar manner, the other two 2-microsecond delay lines (not shown) control amplifiers 9–24 to give out +6 volts.

Each of the amplifiers gives out 6 volts to the lower right inputs of thirty-two gates in a column, each of which columns represents a highway. For example, the first amplifier connects +6 volts to thirty-two gates 1546–1551; the second amplifier connects +6 volts to thirty-two gates 1552–1557; the thirty-first amplifier connects +6 volts to thirty-two gates 1558–1563; and the thirty-second amplifier connects +6 volts to thirty-two gates 1564–1569. In this matrix, columns represent highways and rows represent time slots, there being 32×32 or 1024 gates. Thus all 1024 gates have +6 volts connected to the lower right inputs at the beginning of the interval designated "Two Microsecond Master (Line)" (FIGURE 24).

As the pulse travels through the four 2 microsecond delay lines (of which 1504 and 1506 are shown, and the other two indicated), the output of the delay lines via amplifiers 1508, 1510, 1512, 1514, etc., resets flip-flops 1515, 1516, 1517, 1518, etc., whereupon the segments "1" thereof give out the logic "0" signal to associated amplifiers which change their output to ground (0 volt). Such output occurs at the end of the "Two Microsecond Master (Line)" pulse (FIGURE 24) at the 2-microsecond point which is the end of the 4-microsecond time slot.

Thus, in the scanning process, and specifically during the last 2 microseconds of the 4-microsecond interval that gate 1522 is conducting, the first top-most row of thirty-two matrix gates 1546–1564 will have +6 volts as the lower left input, and 0 volt as the upper right input, whereby these gates all conduct simultaneously, each giving out the logic "1" signal to a time slot 1 (line 1) gate on the thirty two highways to cause these gates to conduct and connect the associated line to the highway. For example, gate 1546 gives out the logic "1" signal to gate 141 (FIGURE 18) which connects the telephone set 100 on line 1 to highway 1. Gate 1564 gives out the logic "1" signal to gate 143 which connects line 1 associated with highway 32 to highway 32.

During the last two microseconds of the next four microsecond time slot with gate 1523 conducting, the thirty-two gates 1457–1565 connect line 2 of each highway of the thirty-two highways to associated highway H2, etc.

During the two microseconds of the thirty-second four microsecond time slot with gate 1527 conducting, the thirty-two gates 1551–1569 connect line 32 of each highway of the thirty-two highways to the associated highway H32, etc.

Referring to FIGURE 24, with this arrangement, during the first part of each time slot, the highway is discharged. During the last part of each time slot the line gate, such as 141, conducts, connecting the line 1 to its highway 1. The line gate is conducting, connecting the line to the highway at the same time that the word gate, such as 149, is conducting, connecting the word source (dial tone in this example) to highway 1.

Thus each of the various sources which are to be selectively connected to the various highways are sampled at the 7.8125-kc. rate in synchronism with the 7.8125-kc. pulsing of each of the line gates, whereby sources are selectively connected to lines at the sampling rate. It should be observed that the line gates are pulsed in a fixed repetitive pattern continuously which does not stop even during Buffer Loading and Dumping, but that the word gates are pulsed in a selective repetitive pattern only as required, which pattern changes as the Translator Equipment 107 transmits new words for the various lines to the Digital Audio Equipment. It should also be observed that even with a "line-on-hook" condition of any line, the associated gate is pulsed in the fixed repetitive pattern but that no word gate is pulsed to connect the line to a source. The only time a word gate closes to connect a source to a line is when the line is off hook.

Returning to our illustration, telephone set 100 is connected over line 137 through gate 141, highway 1, and gate 149 to the "Dial Tone" Source as a result of the Translator Equipment 107 dumping the word for "Dial Tone" in to the memory, whereby the calling party receives Dial Tone by the 7.8125-kc. sampling of the source by gates 141 and 149.

Also line 1 on highway 2 is connected over an associated line gate and word gate for the word "Volume" to the pick-up head monitoring the track on drum which has the word "Volume" recorded thereon. Until the drum in turning comes to the recording, no message goes out on the line, but when the next recording for "Volume" passes under the pick-up head, the word "Volume" is sampled at the 7.8125-kc. rate and passed to line 1, highway 2.

In a similar manner, the word "4" is transmitted to line 1, highway 3, and the other words required for line 1 on the remaining highways 4–32. Thereafter, the words for line 2 on each of the highways, followed the words for line 3 on each of the highways, are provided until lines 4–31 on each of the highways receive the words representing the desired information, at which time the cycling of line 1 on the highways is repeated. Such operation continues during the passage of the words on drum 161 under the pick-up heads.

As the drum 161 continues to turn there follows a short interval at the end of the words before the next magnetic plug in 162 passes under pick-up head 164 during which time various lines are connected to the pick-up heads, but the pick-up heads are not giving out any message.

As the drum continues to turn, the next plug in member 162 passes under the pick-up head 164, and a leading edge spike is transmitted to erase circuit 121 and delay circuit 122 as before described.

Erase circuit 121 sends an erase signal to the memory control 132, to the Data Transfer Control (Dump Circuit) 119, and to the Group Control Circuit 118.

The signal to the Group Control 118 inhibits Gates 505–508 so that no signals from the Word Data Leads 111 can enter the Buffer as would be understood from previous description herein, and so that all inhibits are removed from gates 907–1010 in preparation for dumping the cores in the Buffer which had not been dumped during loading of the Buffer for the previous word at the time of removal of the SYNC pulses.

The signal to Data Transfer Control 119 inhibits gate 1114 (see FIGURE 11) to prevent any output from gate

1113 from reaching gate 1114, as the Translator Equipment continues cycling over the Highway Address Leads 110.

This allows the input from the 2.0 tap of delay line line 1106 to gate 1115 and drive the count circuit to completion during which period gate 1119 removes its inhibit from gates 903–1006 in preparation for dumping the cores in the Buffer which have not been dumped.

As the memory scanners continue their scanning during the erase pulse, a coincidence of input signals to at least one gate of each of the groups 907–908, 909–910, 1007–1008, and 1009–1010 will occur, whereby each of the gates 903–1006 will have an input therefrom. Each of these gates upon receiving the Strobe signal will operate the associated gate of the group 901–1005, whereby any of the associated Buffer Group cores found set to the logic "1" state will be reset.

The 140 microsecond erase pulse from FIGURE 11 to FIGURE 12 via amplifier 1222 inhibits gate 1224 so that Strobe signals cannot reach gates 1301–1310. With the Strobe signal removed, the ensuing cycling of the memory scanner prevents the switching circuits 1321–1330 from being set on the read pulse of the time slot so that no bit write is present during the write pulse, and to the memory cores reset to erase the cores in the memory planes.

At the expiration of the 200 microsecond delay of circuit 122, circuit 122A is operative to give the next 30 microsecond start pulse to the Translator Equipment 107 and the next word to each of the lines.

If the calling broker at Telephone Set has his handset removed and has not started to dial, his next word will be Dial Tone again. Thus he receives short bursts of Dial Tone on succeeding words until he starts to dial. The next word on each of the other lines will be that appropriate to the situation relative to each line.

When the calling broker at Telephone Set 100 begins to dial, the Translator Equipment is marked to change the succeeding words to telephone set 100 to Silence, i.e., the sixty-fourth word. When the calling broker has dialed the three or four digit number designating the particular stock he wishes to monitor, the Translator Equipment changes the succeeding words to spell out the typical message, for example, of FIGURE 18A, as will be understood from the foregoing description.

At any point during receipt of the message or at the end of receipt of the message (at which time the calling broker hangs up), the Translator Equipment changes the word on the Word Data Leads 111 for time slot 1 (line 1) highway 1 to Silence, i.e., the sixty-fourth word. This word is fed into the Buffer, dumped into the memory and results in gates 141 and 150 pulsing at the 7.8125-kc. rate to connect ground to line 1 over highway 1 during each recurrence of time slot 1 during the last half of each time slot during the "Two Microsecond Master (Line)" interval of FIGURE 24. Of course, the highway is grounded by gate 150 for a longer period during the time slot (i.e., during the "Sense Amp" interval of FIGURE 24).

If the Broker at Telephone Set keeps his handset removed after completion of the message, the Translator Equipment 107 may by alternative design, (1) Repeat the message, or (2) Change the succeeding words to the line to "Silence."

Although only a particular embodiment of the invention has been shown and described, it is apparent that modifications and alterations may be made therein, and it is intended in the appended claims to cover all such modifications and alterations as may fall within the true spirit and scope of the invention.

What is claimed is:

1. In a switching system for synthesizing messages for transmission over subscriber lines, word data input means over which coded signals are received representative of the words to be provided in the synthesized messages, output means including a plurality of highways, each of which highways transmits messages to a plurality of lines, memory means for retaining said coded signals representative of the words to be synthesized including means for identifying the highways and lines to receive such words, source means for providing the words requested, and means for gating the words identified in said memory means from said source means over the identified highways to the identified lines, the different lines on a highway being gated at different time intervals, at least one line on each of a plurality of said highways being gated during the same time interval.

2. In a switching system for synthesizing messages for transmission over subscriber lines, word data input means over which coded signals are received representative of the words to be provided in the synthesized messages, output means including a plurality of highways, each of which highways transmits messages to a plurality of lines, buffer means for receiving said coded signals representative of the words to be synthesized, memory means including means for identifying the highways and lines to receive such words, means for selectively transferring said signals from said buffer means to said memory means, source means for providing the words requested, and means controlled by said memory means to gate the words identified in said memory means from said source means over the identified highways to the identified lines, the lines on a highway being gated at different time intervals, at least one line on each of a plurality of said highways being gated during the same time interval.

3. In a switching system for synthesizing messages for transmission over subscriber lines, word data input means over which coded signals are received representative of the words to be provided in the synthesized messages, output means including a plurality of highways, each of which highways is connected to transmit messages to a plurality of associated lines, memory means for retaining said coded signals representative of the words to be synthesized including means for identifying the highways and lines to receive such words, source means for providing the words requested, and means for gating the word identified on said memory means over the identified highways to the identified lines including line gate means operative in a cyclic manner to connect each line to its associated highway in a predetermined sequence in successive time intervals, said line gate means being operative to connect a line in each of the different highways during the same time interval.

4. A switching system as set forth in claim 3 in which said last means includes a separate group of line gate means for each highway, the line gates in the different groups corresponding with each other, and line scanner means operative to enable the corresponding gates in each highway at the same time interval in said cycling operation.

5. In a switching system for synthesizing messages for transmission over subscriber lines, word data input means over which coded signals are received in a predetermined order to represent the words of the message to be provided for each line, output means including a plurality of highways, each of which highways transmits messages to a plurality of lines associated therewith, certain of which messages are different from other messages, memory means for retaining said coded signals representative of messages to be synthesized including means for identifying the highways and lines to receive such words, source means for providing the words in the synthesized message, and means for gating the word identified on said memory means from said source means over the identified highways to the identified lines including line gate means for gating the lines connected to a highway at successive time intervals, at least one line on each of a plurality of highways being gated during the same time interval, and a plurality of groups of word gate means, each of which gates in a group is connected to transmit a different word to an associated one of said highways.

6. In a switching system for synthesizing messages for transmission over subscriber lines, word data input means over which coded signals are received representative of the words to be provided in the synthesized messages, output means including a plurality of highways, each of which highways transmits messages to a plurality of lines, memory means for retaining said coded signals representative of the messages to be synthesized including means for identifying the highways and lines to receive such words, source means for providing the words requested, and means for gating the words identified in said memory means over the identified highways to the identified lines including a plurality of line gates for each highway, line scanner means operative to cyclically connect each line to its associated highway in a predetermined sequence at different time intervals, and to connect at least one line on each of the different highways to its highway at the same time interval, a plurality of word gate means for each highway, each of which is connected to gate a different word from said source, and means for enabling the one of said word gates which gates the identified word for a line during the time of connection of said line to said highway by its associated line gate.

7. In a switching system for synthesizing messages for transmission over subscriber lines, word data input means over which coded signals are received representative of the words to be provided in the synthesized messages, output means including a plurality of highways, each of which highways transmits messages to a different plurality of lines, memory means for retaining said coded signals representative of the words to be synthesized including means for identifying the highway and line to receive such words, source means for providing the words requested, and means controlled by said memory means to gate the words identified in said memory means over the identified highways to the identified lines including a plurality of line gates for each highway, each of which is operative to connect a different one of the lines to its associated highway, timing means including a first timer means for enabling said line gates for a highway at different successive time slots to time share associated highway means and corresponding line gates in different highways in the same time slots, a plurality of word gate means for each highway, each of which is connected to gate a different word from said source to its associated highway, and a second timer means for enabling the gate for the word identified by the coded signal for a line during the time slot in which the line gate for the line is operated.

8. In a switching system for synthesizing messages for transmission over subscriber lines, word data input means over which coded signals are received representative of the words to be provided in the synthesized messages, output means including a plurality of highways, each of which highways transmits messages to a different plurality of lines, the words of the messages to different lines on a highway being transmitted at different time intervals, buffer means for receiving said coded signals representative of the words to be synthesized including means for identifying the highway to receive each word, said buffer means including a plurality of sets of storage means, each of which sets is connected to mark the word for a different highway during one of said time intervals, gate means operative to control loading of each set of storage means with the identity of the word to be transmitted over its highway, source means for providing the words requested, and means including memory means connected to said buffer means for gating the words identified on a plurality of sets in said buffer means to the identified highways during one of said time intervals.

9. In a switching system for synthesizing messages for transmission over a plurality of subscriber lines, word data input means over which coded signals are received representative of the words to be provided in the synthesized messages, output means including a plurality of highways, each of which highways transmits messages to a different plurality of lines, the words of the messages to different lines on a highway being transmitted at different time intervals, buffer means for receiving said coded signals representative of the words to be synthesized including means for identifying the highway to receive such words, said buffer means including a plurality of groups of storage means, each of which groups includes a plurality of sets, each of which sets is connected to mark the word to be transmitted over a different one of the highways during one of said time intervals, gate means operative to successively load each set with the identity of the word to be transmitted over its highway during each occurrence of said one time interval, source means for providing the words requested, and means for gating the words identified on said buffer means to the identified highways during each occurrence of said one time interval.

10. In a switching system for synthesizing messages for transmission over subscriber lines, word data input means over which coded signals are received representative of the words to be provided in the synthesized messages, output means including a plurality of highways, each of which highways transmits messages to a different plurality of lines, the words of the messages to different lines on a highway being transmitted at different time intervals, buffer means for receiving said coded signals representative of the words to be synthesized including means for identifying the highway to receive such words, said buffer means including a plurality of groups of storage means, each of which groups include a plurality of sets of storage means, each of which sets of storage means is selectively enabled to mark the word for a different highway, memory means comprising a plurality of sets of line storage means for each highway, each set of line storage means being operative to store the word for a different one of said lines on its associated highway, data transfer control means for transferring the word for each highway in said buffer means to the set of line storage means which is connected to store the word for said line on said highway, source means for providing the words requested, and means for gating the words identified in said memory means to the identified lines for each of said highways.

11. A switching system as set forth in claim 10 in which coded signals representative of the words for the corresponding line on each highway are received in sequence over said input means.

12. In a switching system for synthesizing messages for transmission over a plurality of subscriber lines, data input means including a first means over which coded signals are received representative of the words to be provided in the synthesized messages and a second input means over which signals identify the highway for each word as received, output means including a plurality of highways, each of which highways transmits messages to a different plurality of said subscriber lines, the words of the messages to different lines on a highway being transmitted at different time intervals, buffer means for receiving said coded signals representative of the words to be synthesized, said buffer means including a plurality of buffer cores, each core having at least a word data input, a highway address input and a dump input, and means for storing a signal in a core responsive to the simultaneous receipt of a signal over its highway address and word data inputs, and an output circuit for each core enabled responsive to receipt of a signal over said dump input only with a signal stored in said core, memory means connected to the output circuits of said buffer cores to mark the words for each line on each highway, source means for providing the words requested, and means for gating the words identified in said memory means from said source means to the identified lines on the identified highways.

13. In a switching system for synthesizing messages for transmission over a plurality of subscriber lines, highway address input means for identifying the highway for each word, output means including a plurality of highways, each of which highways transmits messages to a different plurality of said subscriber lines, word data input means over which coded signals are received representative of the words to be provided in the synthesized messages, memory means for retaining said coded signals representative of the words to be synthesized including a memory plane for each highway comprising a plurality of sets of cores, each set of cores being connected to identify the word for a different line on its associated highway, memory scanner means operative to sequentially scan the core sets for the lines on a highway in discrete time intervals, the core sets for corresponding lines on different highways being scanned during the same time interval, source means for providing each of the words identified in the successive core sets, and means for gating the word identified in said memory means from the source means in each scan to the identified highways.

14. A switching system as set forth in claim 13 in which said memory means includes a set of sensors for providing coded signals identifying the word for each line in the memory scan, a plurality of gate means, each of which gates selects a different word from said source for connection to said highways, and decoder means controlled by said coded signals to enable the one of the gates for the word identified by said coded signals.

15. A switching system as set forth in claim 13 which includes timer means for providing discrete time slots, and means connected to said timer means for enabling a scan of a different line in said memory means during each successive time slot.

16. A switching system as set forth in claim 13 in which each core of a set comprises an input for receiving bit write signals from associated means to prepare the core for setting, and a write lead for providing signals with said bit write signals to set the memory core.

17. A switching system as set forth in claim 13 in which each core of a group comprises an input for setting the core and a read input for each core for transmitting an operating signal for readout of said core to said last means.

18. In a switching system for synthesizing messages for transmission over a plurality of subscriber lines, output means including a plurality of highways, each of which highways transmits messages to a different plurality of said subscriber lines, word data input means over which coded signals are received representative of the words to be provided in the synthesized messages, highway address input means for identifying the highway for each word, timer means including a first timer control for generating signals defining discrete time slots in a cyclic manner, memory means for retaining said coded signals representative of the words to be synthesized including a plurality of groups of storage cores for each highway, each group of storage cores of said plurality for a highway being connected to identify the word for a different line on its associated highway, memory scanner means controlled by said timer means to prepare the storage means for different lines on a highway during successive time slots in said cycle and for at least certain corresponding lines on different highways during the same time slot, and a second timer control for effecting the generation of readout signals for each set of storage means at a predetermined interval during the time slot for said storage means, source means for providing each of the words identified in the successive groups, and means for gating the word identified on said memory means in each scan to the identified highways.

19. In a switching system for synthesizing messages for transmission over a plurality of subscriber lines, output means including a plurality of highways, each of which highways transmits messages to a different plurality of said subscriber lines, word data input means over which coded signals are received representative of the words to be provided in the synthesized messages, highway address input means for identifying the highway for each word, buffer means comprising a plurality of sets of storage means, each of which sets is connected to mark the word for a different highway, memory means including a memory plane for each highway, each memory plane comprising a plurality of groups of cores, each group of cores for a highway being connected to identify the word for a different line on its associated highway, data transfer means for providing dump signals at given intervals to dump said information from said buffer means to said memory means, memory scanner means operative to sequentially scan the core group for each line on a highway in a given time interval, source means for providing each of the words identified in the successive core groups, and means connected to said memory means to gate the words identified on said memory means in each scan to the identified highways.

20. A switching system as set forth in claim 19 which includes timer means for providing discrete time slots and in which said data transfer means includes means connected to said timer means for selectively providing a dump signal to said buffer circuit.

21. A switching system as set forth in claim 19 which includes timer means for providing discrete time slots and in which said data transfer means includes means connected to said timer means for providing a dump signal to said buffer circuit, and means in said buffer means connected to dump words on said buffer storage means to their associated memory cores responsive to a dump signal.

22. A switching system as set forth in claim 19 which includes timer means for providing discrete time slots and in which said data transfer means includes means connected to said timer means for providing a dump signal to said buffer circuit, erase means periodically controlled by said source means to generate an erase signal, and means operative to effect complete dumping of said buffer means responsive to said erase signal.

23. A switching system as set forth in claim 19 in which time slot address signals are received at discrete time intervals in a cycle, in which said buffer means includes a plurality of gate means for coupling said dump signals to said storage means in said buffer means, each of which gate means includes a control circuit operative responsive to the receipt of signals from said memory scanner and said transfer means simultaneous with said time slot address signals.

24. In a switching system for synthesizing messages for transmission over a plurality of subscriber lines, output means including a plurality of highways, each of which highways transmits messages to a different plurality of said subscriber lines, word data input means over which coded signals are received representative of the words to be provided in the synthesized messages, highway address input means for identifying the highway for each word, timer means including a first timer control for generating signals defining a given number of discrete time slots in a cyclic manner, memory means for retaining said coded signals representative of the words to be synthesized including a plurality of groups of storage cores for each highway, each group of storage cores for a highway being connected to identify the word for a different line on its associated highway, memory scanner means controlled by said timer means including means for effecting the readout of signals from a different set of storage means during successive ones of said time slots, source means for providing each of the words identified in the successive groups, means including word gates controlled by said readout signals for gating the word identified on said memory means in each scan to the identified highways, and means including a line gate for each line on a highway, and line scanner means controlled by said timer means to close different ones of said line gates on a highway during different ones of said time slots in a cycle said line scanner means being operative at times to enable a line gate in a plurality of different highways in the same time slot.

25. A switching system as set forth in claim 24 in which at least one of said scanner means includes a plurality of blocking oscillators each of which is connected to operate during a successive one of said time slots in a cycle, and means controlled by each blocking oscillator in its operation to advance the scanning operation one additional step.

26. In a switching system for synthesizing messages for transmission over subscriber lines, word data input means over which coded signals are received representative of the words to be provided in the synthesized messages, output means including a plurality of highways, each of which highways transmits messages to a plurality of lines, the messages to different lines on a highway being transmitted during different time slots, buffer means for receiving said coded signals representative of the words to be synthesized including means for identifying the highway to receive such words, said buffer means including a plurality of sets of storage means, each of which sets is connected to mark the word for a different highway, a plurality of sets of memory means for each buffer set, each memory set representing a different line in the highway represented by its associated buffer set, means operative to control loading of each buffer set in succession with the coded signals for the word to be transmitted over one of the lines on the associated highway represented by the buffer set, means for dumping the word on each buffer set to the memory set for the corresponding line in the highway associated therewith, and means for thereafter loading a new word into the sets of storage means in said buffer sets for transfer to the memory set for a different corresponding line in each highway.

27. A system as set forth in claim 26 which includes memory scanner means for scanning different memory sets on each highway during different ones of said time slots, and input means for providing different time slot signals during successive loadings of the buffer, and in which said means for dumping is controlled by said time slot signals and signals provided by said memory scanning means.

References Cited

UNITED STATES PATENTS

| | | | |
|---|---|---|---|
| 3,082,402 | 3/1963 | Scantlin | 179—2 X |
| 3,133,268 | 5/1964 | Avakian et al. | 179—2 X |
| 3,209,074 | 9/1965 | French | 340—152 X |
| 3,253,263 | 5/1966 | Lee et al. | 340—154 X |

JOHN W. CALDWELL, *Acting Primary Examiner.*

J. T. STRATMAN, *Assistant Examiner.*